(12) United States Patent
Hirai et al.

(10) Patent No.: US 6,215,870 B1
(45) Date of Patent: Apr. 10, 2001

(54) PHONE HOLDER

(75) Inventors: Hiroki Hirai; Masashi Sugimoto; Tetsuji Tanaka; Shigeki Sakai; Yoshito Sakai; Nori Inoue; Yuichiro Tsutsumi, all of Nagoya (JP)

(73) Assignees: Harness System Technologies Research, Ltd., Nagoya; Sumitomo Wiring Systems, Ltd., Yokkaichi; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/044,027

(22) Filed: Mar. 19, 1998

(30) Foreign Application Priority Data

Mar. 25, 1997 (JP) .................................................... 9-072112
Mar. 31, 1997 (JP) .................................................... 9-080351
Jun. 10, 1997 (JP) .................................................... 9-152223
Jul. 9, 1997 (JP) .................................................... 9-183626

(51) Int. Cl.[7] .................................................. H04M 1/00
(52) U.S. Cl. ............................................. 379/446; 379/455
(58) Field of Search ..................................... 379/446, 455, 379/426, 454; 455/90, 575

(56) References Cited

U.S. PATENT DOCUMENTS 5,535,434 * 7/1996 Siddoway et al. ..................... 455/90

* cited by examiner

Primary Examiner—Jack Chiang
(74) Attorney, Agent, or Firm—Oliff & Berridge, PLC

(57) ABSTRACT

This invention relates to a phone holder. The phone holder includes a holder main body with an outer box, and a holder connector which is connectable with a mobile phone when the mobile phone is inserted in the holder main body. The position of the holder connector along a direction normal to a connecting direction with the mobile phone is adjusted by bolts and nuts (fixing means). Further, the holder connector is selectively set in the holder main body in a state that a top thereof is oriented upward or downward.

15 Claims, 47 Drawing Sheets

PHONE HOLDER

BACKGROUND OF THE INVENTION

1. Field of the Invention

This invention relates to a phone holder which is mounted in a passenger compartment of a vehicle to enable use and holding of a mobile phone.

2. Description of the Background Art

In recent years, as mobile phones become popular, various types of phone holders for use in e.g., a vehicle which enable use and holding of the mobile phone have been developed. One of such phone holders comprises a holder main body such as a base frame capable of holding a mobile phone, and a holder connector mounted on the holder main body or a vehicle body via a curl cord or its equivalent. A mobile phone is held by the phone holder in such a manner that it is connected to the holder connector when the mobile phone is positioned relative to the holder main body and held therein by an engaging means.

In the above phone holder, a connecting operation of the mobile phone with the holder connector and a positioning operation of the mobile phone relative to the holder main body are not feasible when a driver has to perform the above operations while driving. Further, while driving, a holding state of the mobile phone set in the phone holder is unstable due to a shaking of the vehicle and the like. Accordingly, it is possible that the phone may be disconnected from the holder connector or may come out of the holder main body.

To eliminate the above problems, there has been proposed a phone holder in which a holder main body is formed with a hollow portion with a phone insertion opening to insert and eject a mobile phone, and a holder connector is provided in the holder main body to be connectable with a phone connector of the mobile phone in a state that the mobile phone is inserted in the holder main body. However, there are various shapes and sizes of mobile phones on the market, and hence, it is not always the case that the phone connector is smoothly connected with the holder connector. Accordingly, there has been a great demand for phone holders which can hold various types of mobile phones provided with phone connectors at different positions.

Further, even if the arrangement position of the phone connector substantially coincides with the holder connector, there exist two types of mobile phones: one is such that a phone connector has a tapered portion oriented upward (see FIG. 48A, this type of mobile phone is hereafter referred to as an "upward oriented mobile phone" or "type A") when placing the mobile phone with its side of numerical key facing upward; and the other is such that a phone connector has a tapered portion oriented downward when placing the mobile phone with its side of numerical key facing upward (see FIG. 48B, this type of mobile phone is hereafter referred to as a "downward oriented mobile phone" or "type B").

In the phone holder of the prior art, even if the phone holder can hold a mobile phone of one type, the same phone holder cannot hold a mobile phone of the other type. In other words, the conventional phone holder is adaptable only for one type of mobile phones (either upward oriented mobile phones or downward oriented mobile phones).

For example, referring to FIGS. 48A and 48B, if the phone holder is designed in such a manner that a holder connector thereof can be connected with a phone connector TC of the mobile phone of the type A, this holder connector cannot be connected with a phone connector TC of the mobile phone of the type B, or vice versa.

In other words, a common phone holder is not applicable for these two types of mobile phones. Accordingly, two types of phone holders respectively designed for holding the type A mobile phone and the type B mobile phone must be separately produced. This becomes a hindrance against mass production and improvement of usability.

SUMMARY OF THE INVENTION

In view of the above problems residing in the prior art, it is an object of this invention to provide a phone holder that enables holding of various types of mobile phones provided with phone connectors having different arrangement positions and orientations with excellent usability and productivity.

In order to achieve the above objects, the phone holder according to this invention comprises: a holder main body having a hollow portion adapted for inserting a mobile phone; a holder connector provided in the holder main body adapted to be connectable with a phone connector of the mobile phone when the mobile phone is inserted in the hollow portion; and position fixing means for adjusting a relative position of the holder connector to the holder main body in a direction normal to a connecting direction of the mobile phone and fixing the holder connector to the holder main body.

With this arrangement, the position fixing means adjusts the relative position of the holder connector to the holder main body in a direction normal to the connecting direction of the mobile phone, i.e., to such a position as to be connectable with the phone connector of the mobile phone which is inserted in the holder main body. Accordingly, the connecting and disconnecting operation of the phone connector to and from the holder connector can be facilitated by merely inserting and ejecting the mobile phone in and out of the holder main body irrespective of the various positions of the phone connector.

It should be noted that the connecting direction is a direction of the phone connector approaching toward the holder connector.

The above and other objects, features and advantages of the present invention will become more apparent upon a reading of the following detailed description and drawings.

DETAILED DESCRIPTION OF THE PREFERRED EMBODIMENTS OF THE INVENTION

Hereinafter, preferred embodiments of this invention is described with reference to the accompanying drawings. It should be noted that in general throughout the detailed description, a lengthwise direction of a mobile phone 1, a widthwise direction thereof w, and a thickness direction thereof t are respectively defined, but not limited to, as a phone insertion direction, a transverse (widthwise) direction, and a thickness direction (see FIG. 1). However, for the purpose of easy understanding with clear and concise description and figures, one or more of the above defined directionalities may be referred to as different terminology.

First Embodiment

A first embodiment of this invention is described with reference to FIGS. 1 to 19.

Figure 1:
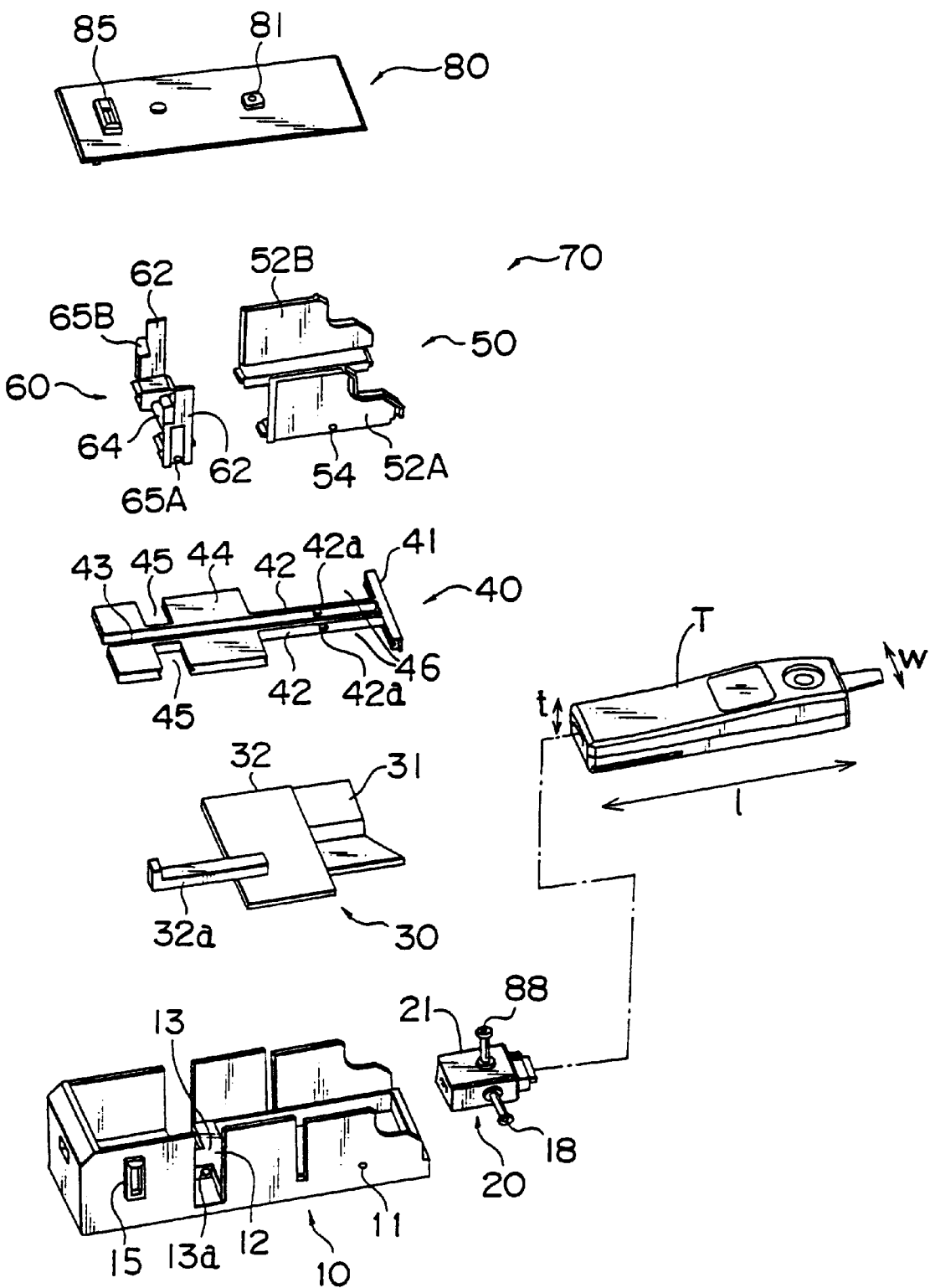
FIG. 1 is an exploded perspective view of a phone holder as a first embodiment according to this invention.
Figure 2:
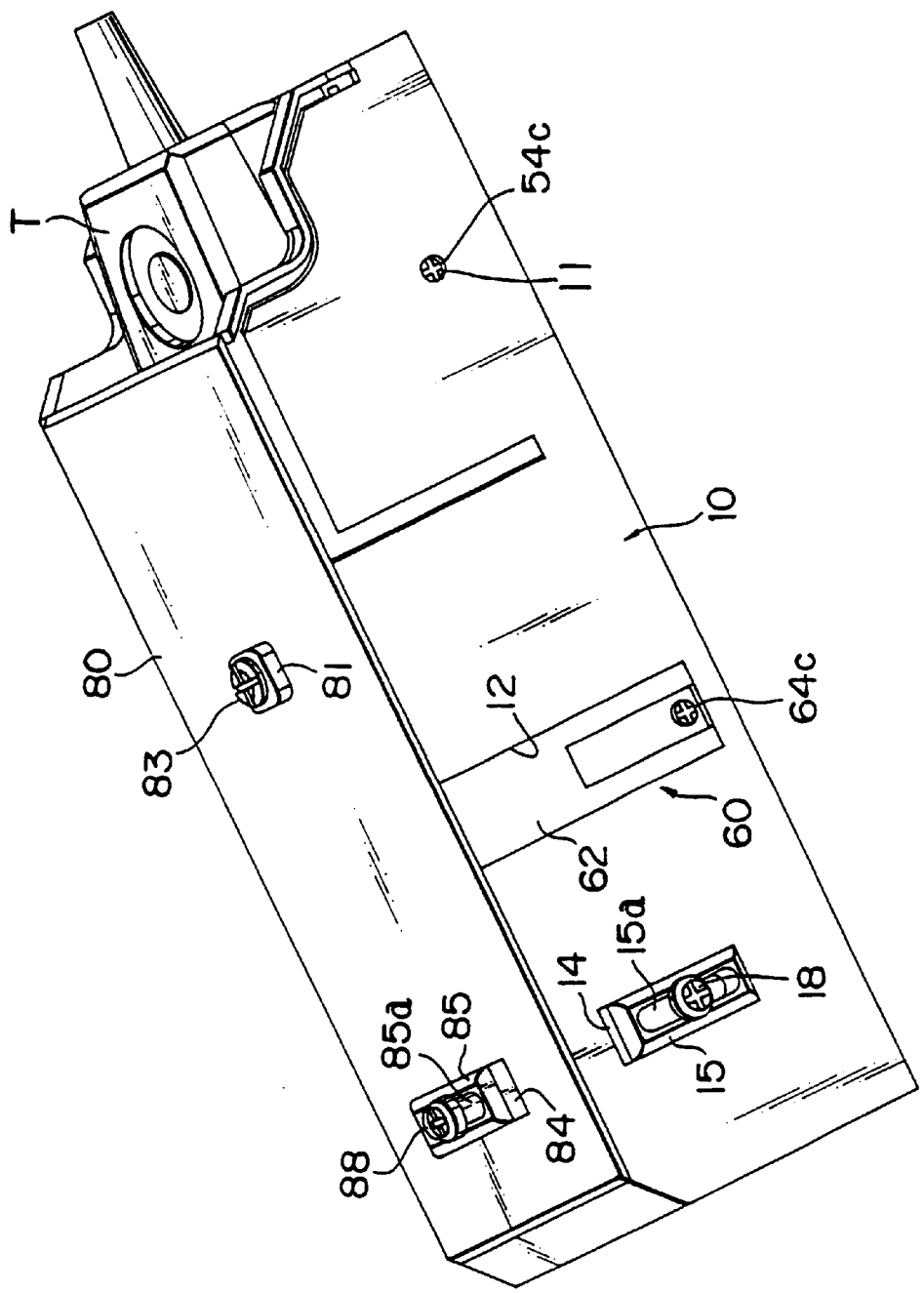
FIG. 2 is a perspective view of the phone holder in an assembled state.
Figure 3:
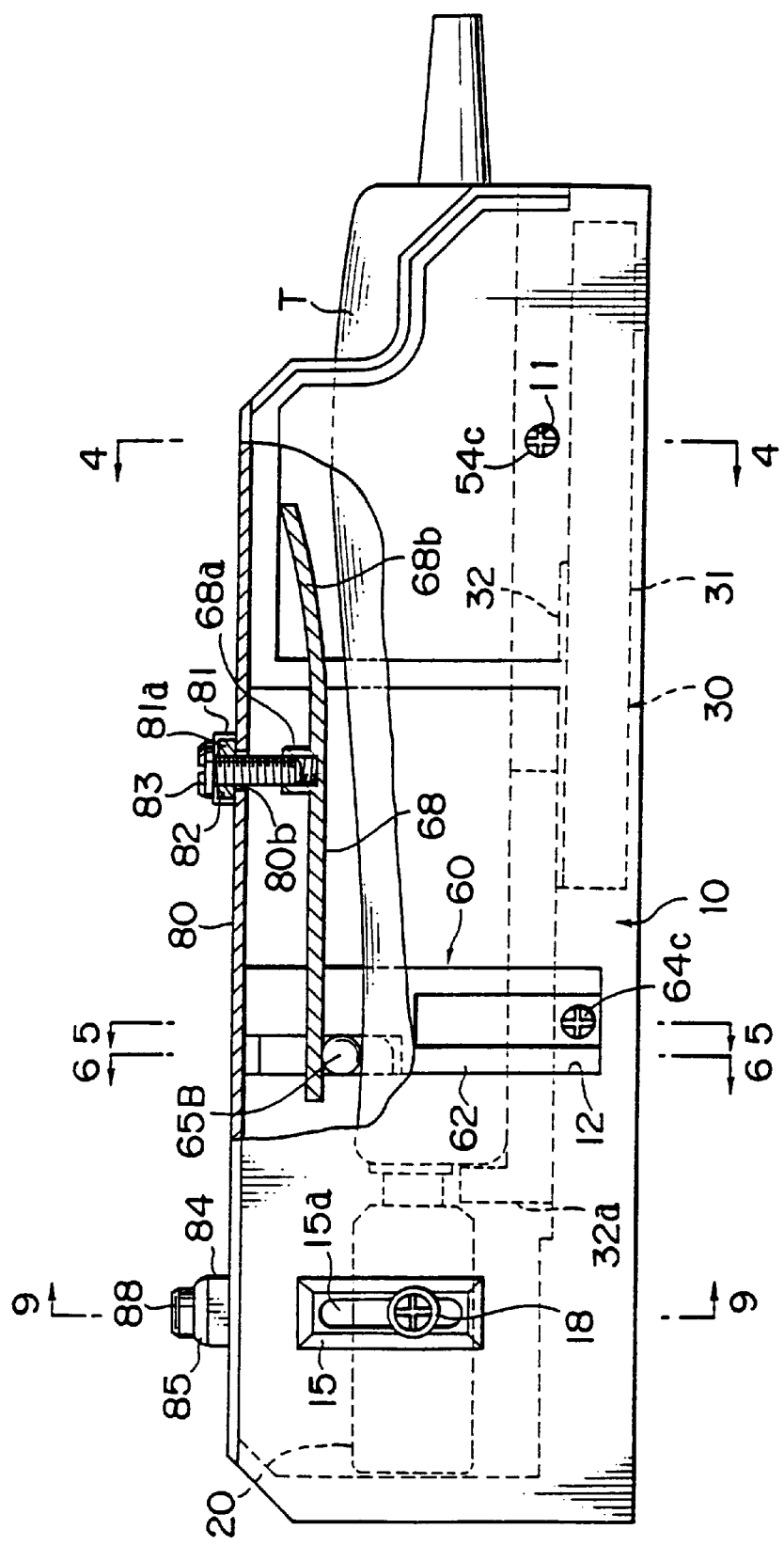
FIG. 3 is a partially cross sectional side view of the phone holder.
Figure 4:
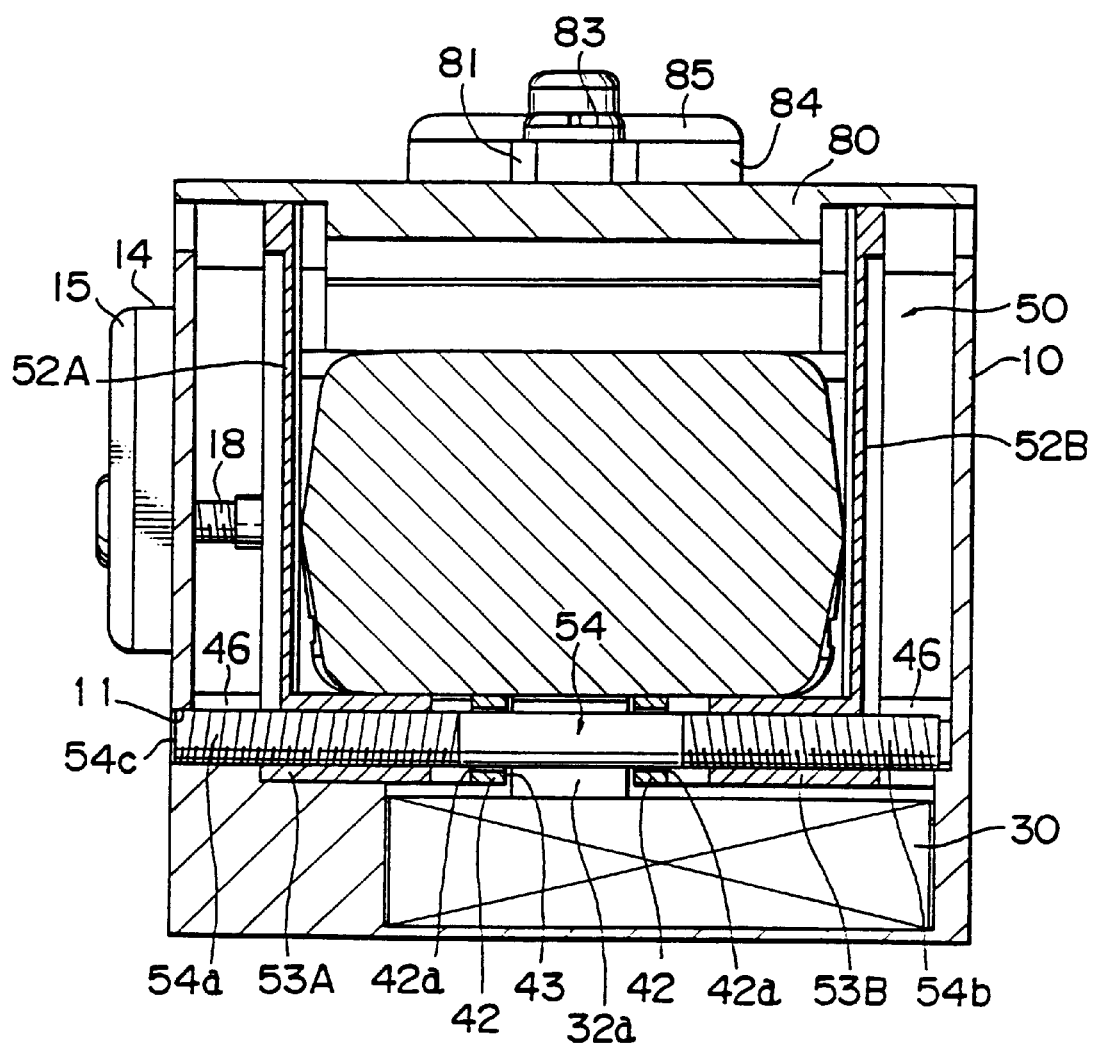
FIG. 4 is a cross sectional view of the phone holder taken along the line 4—4 in FIG. 3.
Figure 5:
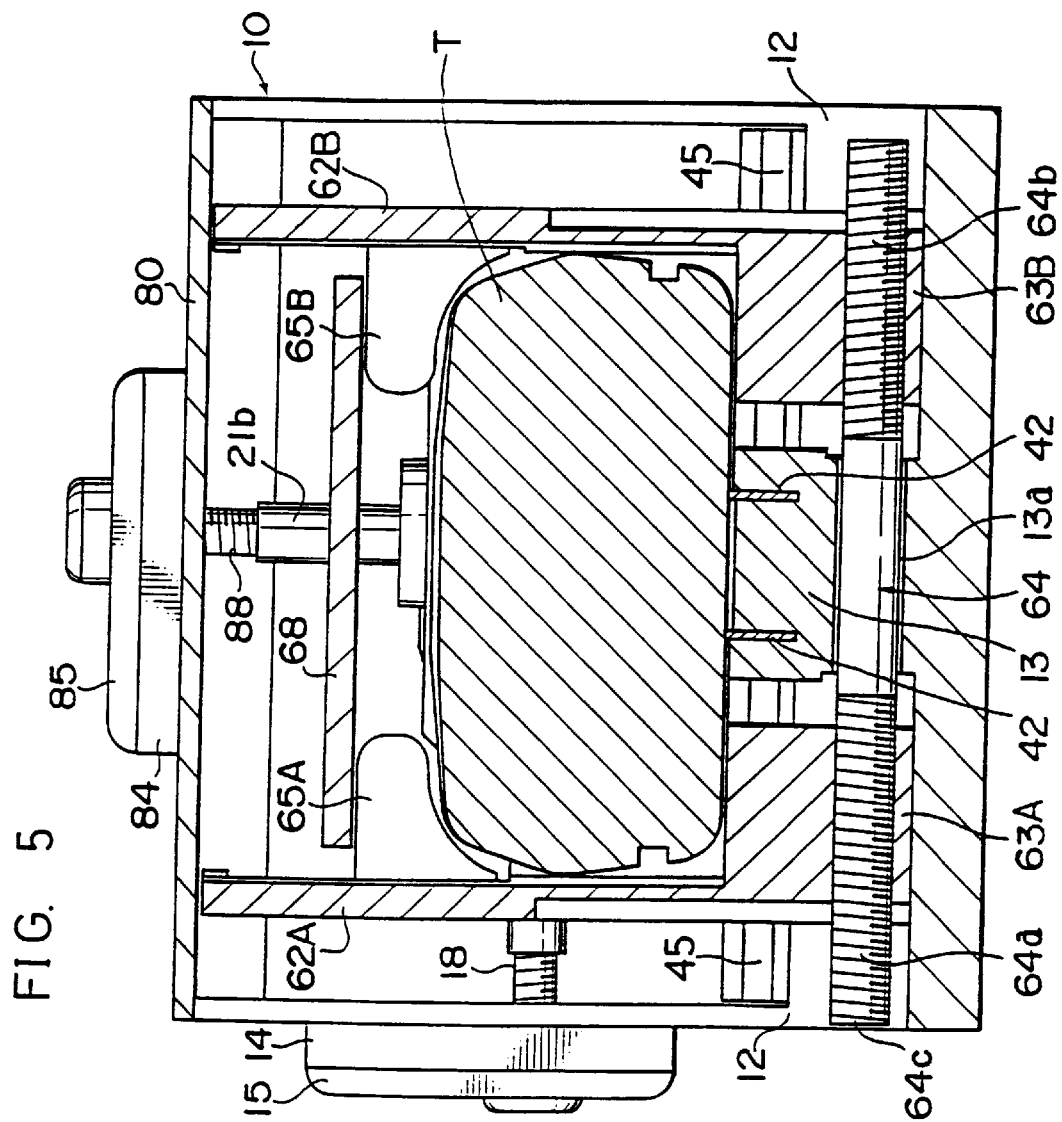
FIG. 5 is a cross sectional view of the phone holder taken along the line 5—5 in FIG. 3.

A phone holder according to this embodiment comprises, as shown in FIG. 1, an outer box 10, a connector module 20, a phone ejector module 30, an inner bottom frame 40, an adjustment module 70 including a pair of inner walls 50, 60, and a ceiling wall 80.

The outer box 10 has, as shown in FIGS. 2 to 7, a hollow portion having an opening (phone insertion opening) at one end (right side in FIGS. 1 to 3, hereinafter referred to as a "phone entrance" sides). with its length and at its upper side.

By mounting the ceiling wall 80 on the outer box 10 so as to close the upper side opening thereof, a holder main body according to this invention is formed. This holder main body is fixed in a proper position of a passenger compartment of a vehicle.

In each of the opposite side walls of the outer box 10 are formed a round through hole 11 and a notch 12 in this order from the phone entrance side. Each notch 12 is rectangular shaped and open upward and is formed in a position immediately before (right side in FIGS. 1 to 3) a position where the connector module 20 to be described later is arranged. Where the notches 12 are formed, an upward projected portion 13 (see FIGS. 5 and 6) is formed in a middle of the bottom wall of the outer box 10 with respect to widthwise direction. A through hole 13a is formed in this projected portion 13 in such a manner as to extend therethrough along widthwise direction (transverse direction in FIG. 5).

Figure 9:
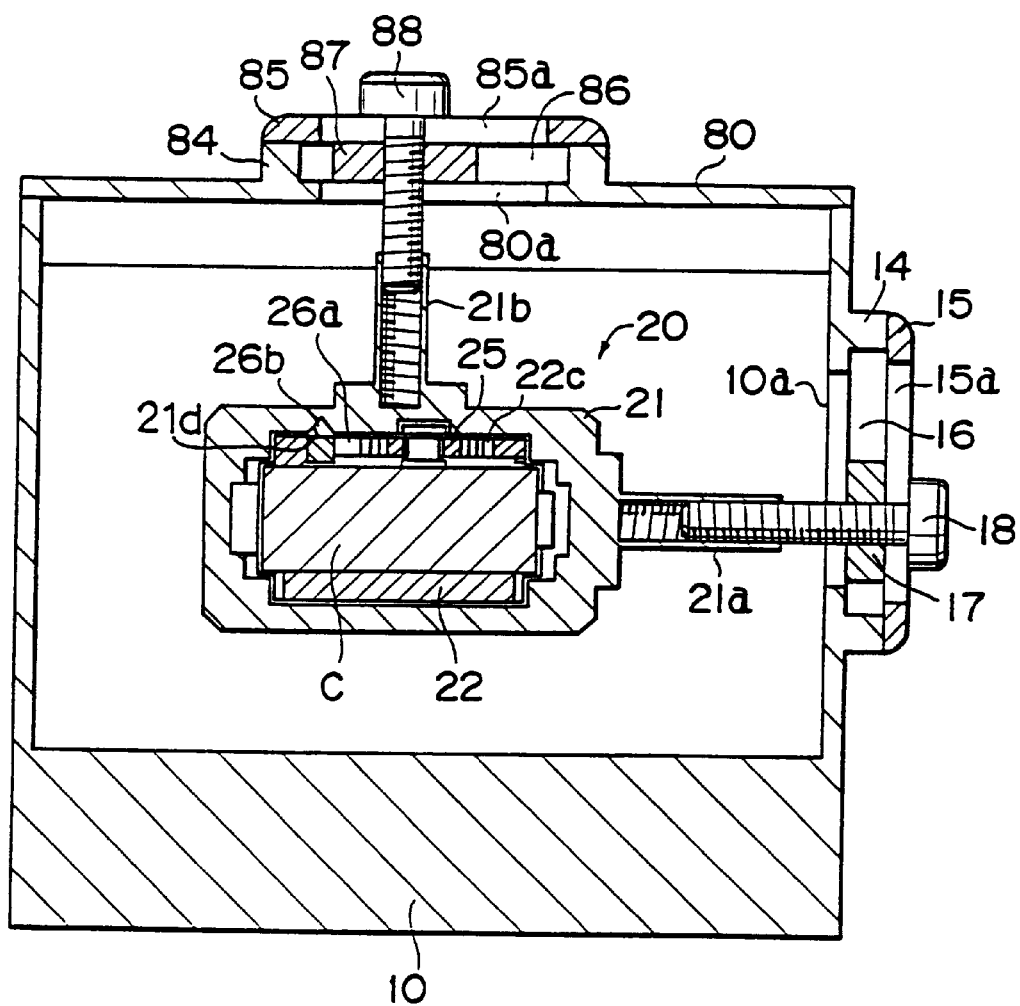
FIG. 9 is a cross sectional view of the phone holder taken along the line 9—9 in FIG. 3.

A long through hole (or referred to as a "first bolt insertion long hole") 10a as shown in FIG. 9 which extends along vertical direction (or referred to as a "second direction") is formed at a rear part of one side wall of the outer box 10. This through hole 10a is formed in a position at the side of the arrangement position of the connector module 20. On the outer side surface of the side wall of the outer box 10 where this through hole 10a is formed is provided a frame 14 which is so shaped as to encase the hole 10a from four sides. A cover 15 is mounted on the frame 14 to close it. A vertically extended through hole 15a is also formed in the cover 15. A nut (or referred to as a "holder main body screw portion") 17 of polygonal shape is accommodated in a space 16 defined by the frame 14 and the cover 15.

The nut 17 is held by the frame 14 from opposite sides along the length of the phone holder (depth direction of FIG. 9) and is held also by the outer surface of the side wall of the outer box 10 and the inner surface of the cover 15 from opposite sides along height direction of the frame 14 (transverse direction of FIG. 9). The nut 17 is unrotatably slidable only along vertical direction of the space 16 at a position where an internally threaded hole thereof is aligned with the through holes 10a, 15a. In other words, the frame 14 and the cover 15 constitute a first retaining portion for unrotatably holding the holder main body screw portion (i.e., nut 17) to be movable along the second direction (i.e., extending direction of the first bolt insertion long hole 10a).

Similarly, a long through hole (or ref erred to as a "second bolt insertion long hole") 80a as shown in FIG. 9 which extends along transverse direction (or referred to as a "first direction") is formed in the ceiling wall 80 above the arrangement position of the connector module 20. On the upper surface of the ceiling wall 80 is provided a frame 84 which is so shaped as to encase the hole 80a from four sides. A cover 85 is mounted on the frame 84 to close it. A transversely extended through hole 85a is also formed in the cover 85. A nut 87 of polygonal shape (or referred to as a "holder main body screw portion") is accommodated in a space 86 defined by the frame 84 and the cover 85.

This nut 87 is held by the frame 84 from opposite sides along the length of the phone holder and is held also by the outer surface of the side wall of the outer box 10 and the inner surface of the cover 85 from opposite sides along vertical direction. The nut 87 is unrotatably slidable only along transverse direction of FIG. 9 in the space 86 at a position where an internally threaded hole thereof is aligned with the through holes 80a, 85a. In other words, the frame 84 and the cover 85 constitute a second retaining portion for unrotatably holding the holder main body screw portion (i.e., nut 87) to be movable along the first direction (i.e., extended direction of the second bolt insertion long hole 80a). The nut 17 is also referred to as a "first holder main body screw portion", and the nut 87 is referred to as a "second holder main body screw portion".

In this embodiment, the holder connector C is constructed in such a manner as to be connectable with an unillustrated phone connector incorporated in a rear end of a mobile phone T, and is held in a connector housing of the connector module 20. The connector housing has a double layered structure consisting of an outer housing 21 and an inner housing 22.

Figure 10:
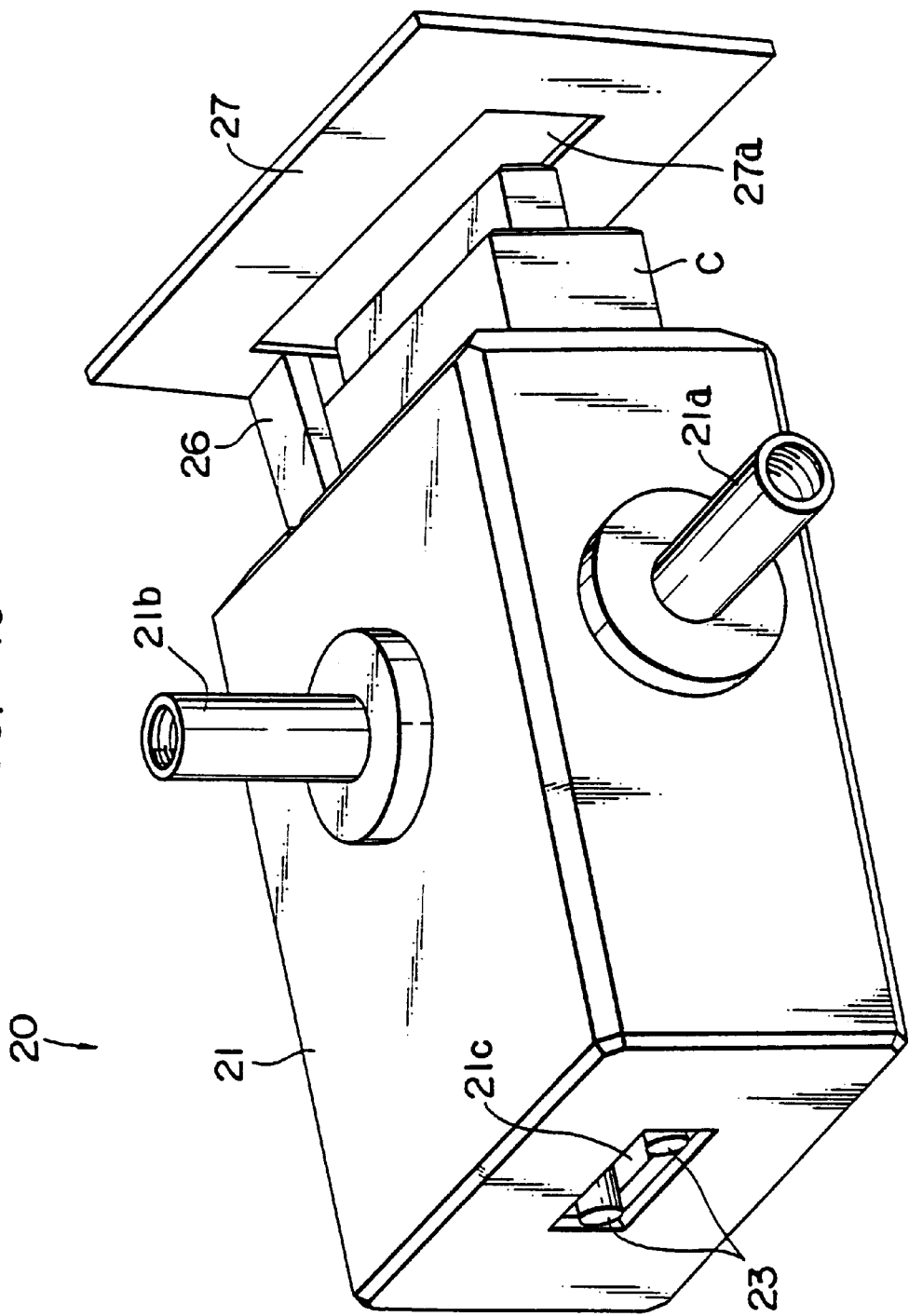
FIG. 10 is a perspective view of a connector module of the phone holder.
Figure 11:
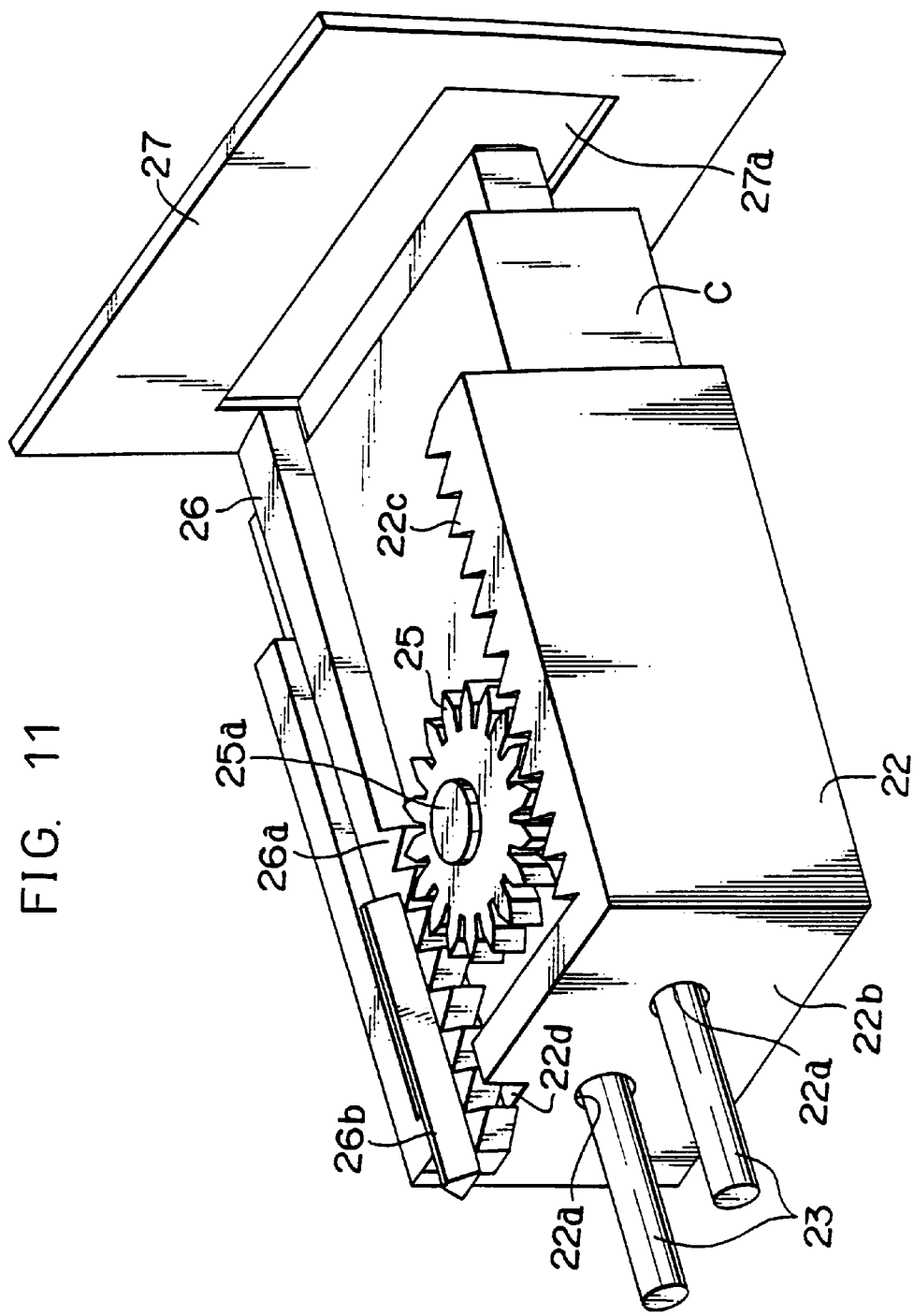
FIG. 11 is a perspective view of the connector module with an outer housing omitted.

As shown in FIGS. 9 and 10, a transversely extended cylindrical nut 21a is formed on one side surface of the outer housing 21 (at a side surface corresponding to the above-mentioned long through hole 10a). This nut (or referred to as a "holder connector screw portion") 21a is open toward the through hole 10a, and is formed with a threaded hole oriented in the same direction as the nut 17 in an inner side thereof. An end portion of a bolt 18 (or referred to as a "bolt of the position fixing means" or "first bolt of the first fixing member") which is screwed to the nut 17 through the through hole 15a from the outside of the holder main body is screwed into the nut 21a (i.e., meshable with the nut 21a while being inserted). In other words, the outer housing 21 is coupled with one side wall of the outer box 10 via the transversely extended bolt 18, and the position thereof in the transverse direction is adjusted by rotating the bolt 18.

Similarly, a vertically extended cylindrical nut 21b (or referred to as a "holder connector screw portion") is formed on the upper surface of the outer housing 21. This nut 21b is open toward the through hole 80a formed in the ceiling wall 80. An end portion of a bolt 88 (or referred to as a "bolt of the position fixing means" or "second bolt of the second fixing member") which is screwed to the nut 87 through the through hole 85a from the outside of the holder main body is screwed into the nut 21b. In other words, the outer housing 21 is coupled with the ceiling wall 80 via the vertically extended bolt 88, and the position thereof in the vertical direction is adjusted by rotating the bolt 88. The nut 21a is also referred to as a "first holder connector screw portion", and the nut 21b is referred to as a "second holder connector screw portion".

As shown in FIGS. 9, 11 to 13, the inner housing 22 is open forward (upward in FIGS. 12 and 13) and has a middle portion of its ceiling wall along transverse direction opened upward to slidably fit the holder connector C into the inner housing 22 along forward and backward directions (along phone inserting and ejecting directions).

A pair of left and right pins 23 project backward from the rear end surface (bottom end surface in FIGS. 12 and 13) of the holder connector C. The holder connector C is guided in inserting and ejecting directions of the mobile phone T by inserting these pins 23 into through holes 22a formed in a back wall 22b of the inner housing 22. Further, coil springs 24 (or referred to as a "bias member") are mounted on the respective pins 23, thereby urging the holder connector C forward (upward in FIGS. 12 and 13) by bias forces of the coil springs 24.

Further, a through hole 21c is formed in the rear wall of the outer housing 21 in order to avoid interference with the pins 23, as shown in FIG. 10.

On the housing of the holder connector C a pinion gear 25 is mounted rotatably about a vertically extended rotatable shaft 25a. On the other hand, a rack 22c meshable with the pinion gear 25 is formed at one inner periphery of the ceiling wall of the inner housing 22. Accordingly, as the pinion gear 25 is rotated, the connector holder C is moved along forward and backward directions with respect to the inner housing 22.

This connector module 20 is also provided with a driving force transmitter including an integral assembly of a coupling bar 26 and a contact plate 27. The coupling bar 26 extends along forward and backward directions and has a rack 26a and a guided portion 26b in the form of a triangular column at its rear half. While the rack 26a is in mesh with the pinion 25, the guided portion 26b is fitted in a V-shaped guide groove 21d (see FIG. 9) formed in the outer housing 21. Accordingly, the entire coupling bar 26 is slidably guided along forward and backward directions.

The contact plate 27 extends in a direction normal to the phone inserting direction and is integrally connected with the front end of the coupling bar 26 so as to be brought into contact with the rear end of the mobile phone T inserted into the holder main body. A rectangular opening 27a which permits the passage of the holder connector C is formed in the middle of the contact plate 27.

Figure 12:
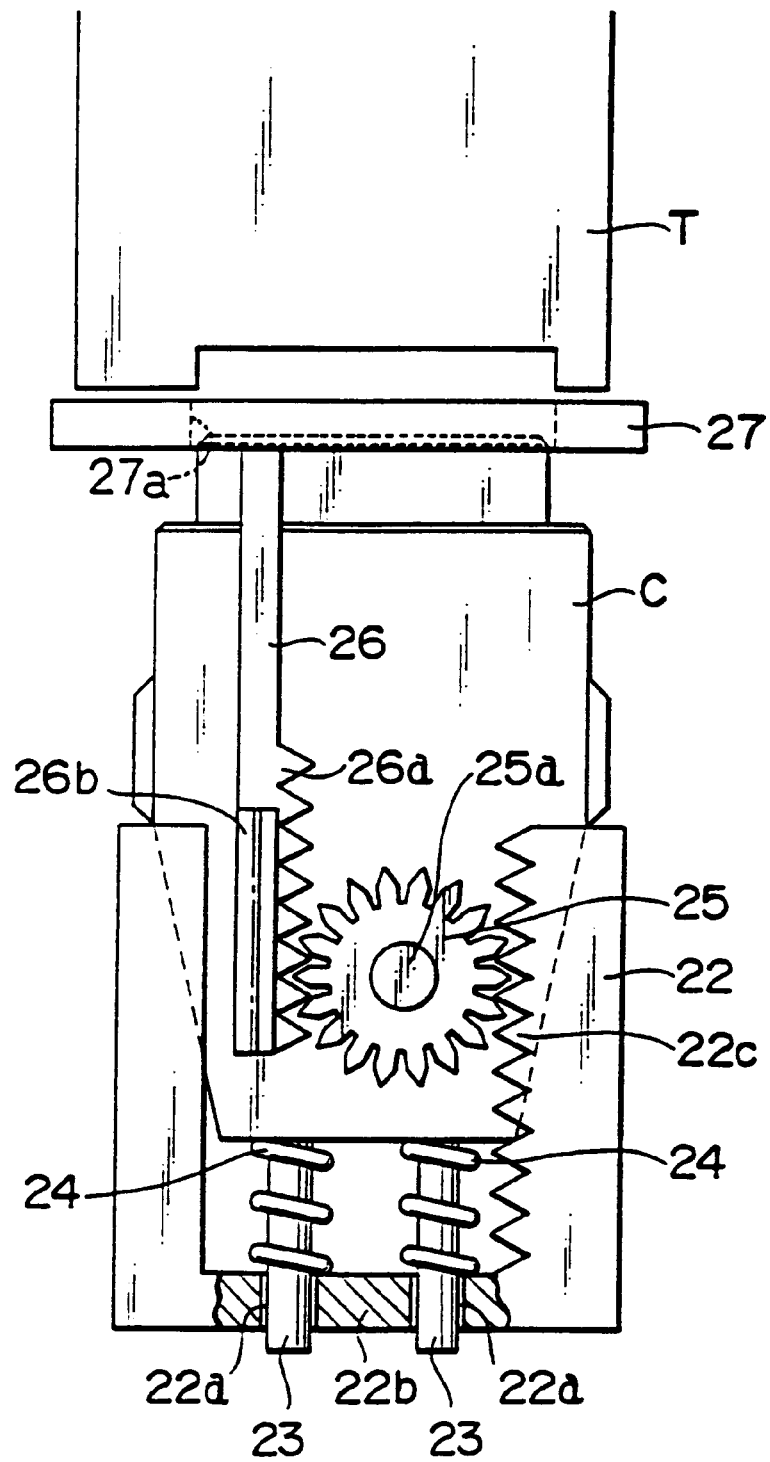
FIG. 12 is a plan view showing a state before a mobile phone is connected with a connector of the connector module.
Figure 13:
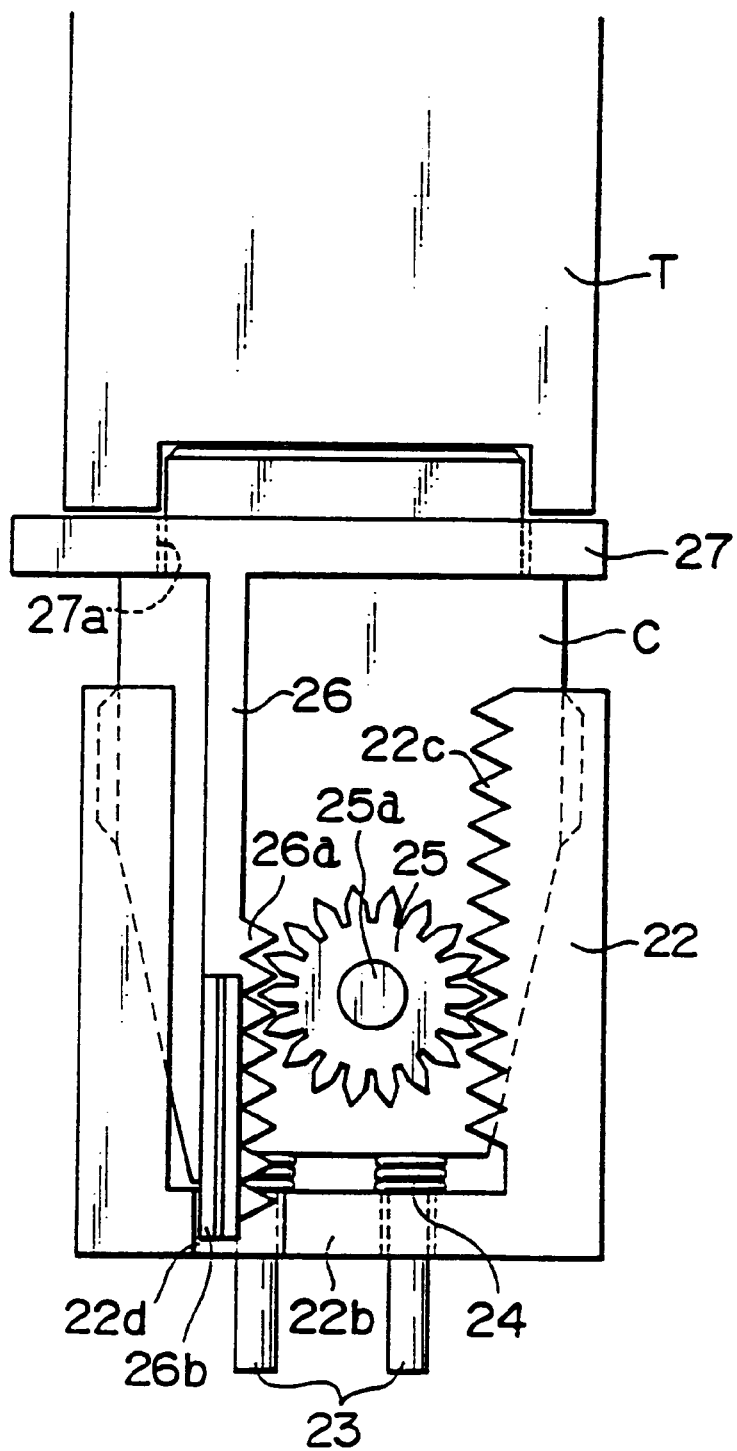
FIG. 13 is a plan view showing a state that the mobile phone has been connected to the connector of the connector module.

The slide stroke of the holder connector C is set such that the contact plate 27 is positioned more forward than the holder connector C in a state where the holder connector C is pushed to its foremost position by the bias forces of the coil springs 24 as shown in FIG. 12, and the connection of the holder connector C and the phone side connector of the mobile phone T is completed through the opening 27a of the contact plate 27 in a position slightly before a rearmost position where the holder connector C is retracted against the bias forces of the coil springs 24 as shown in FIG. 13.

Figure 14:
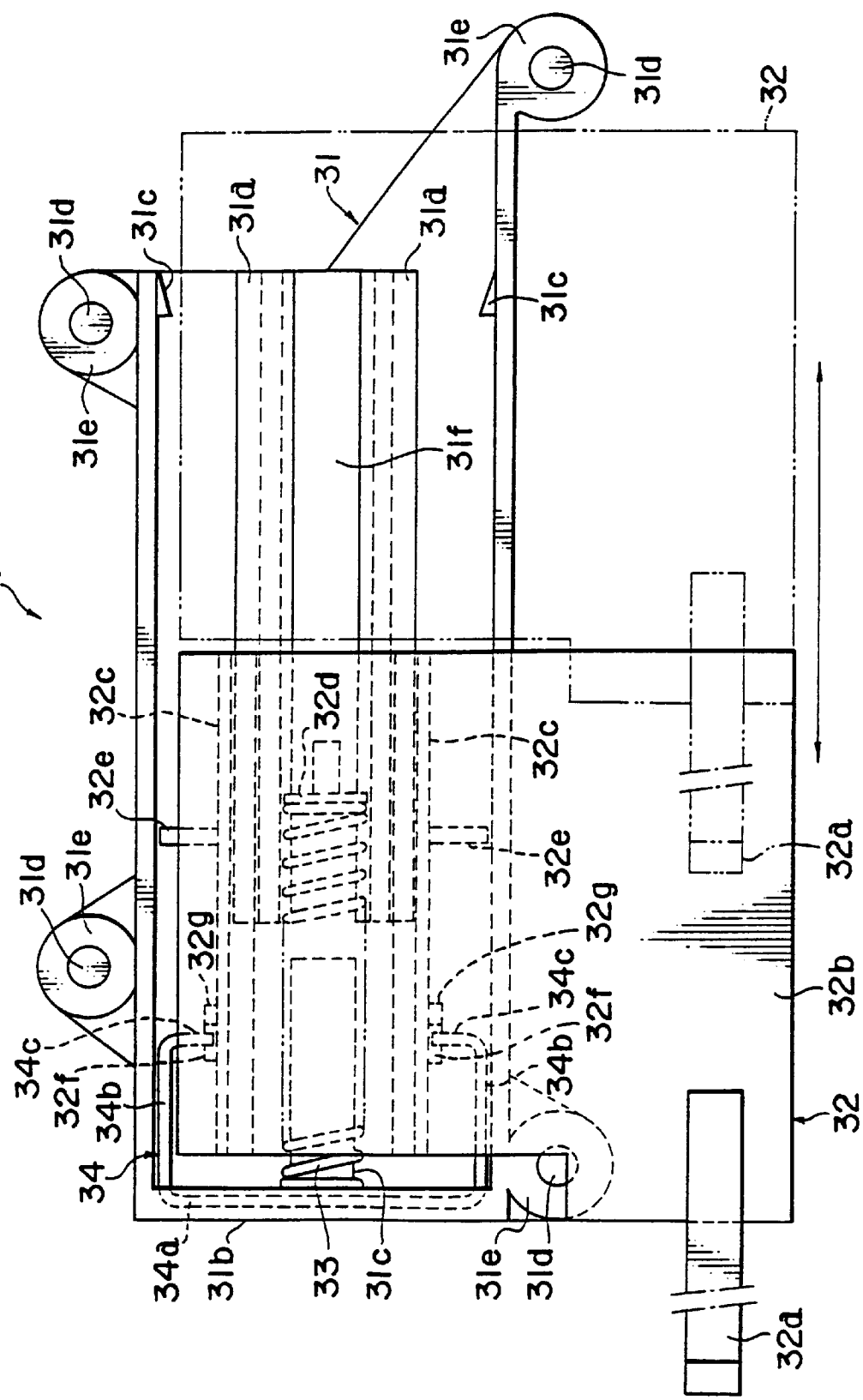
FIG. 14 is a plan view of a phone ejector module of the phone holder.
Figure 15:
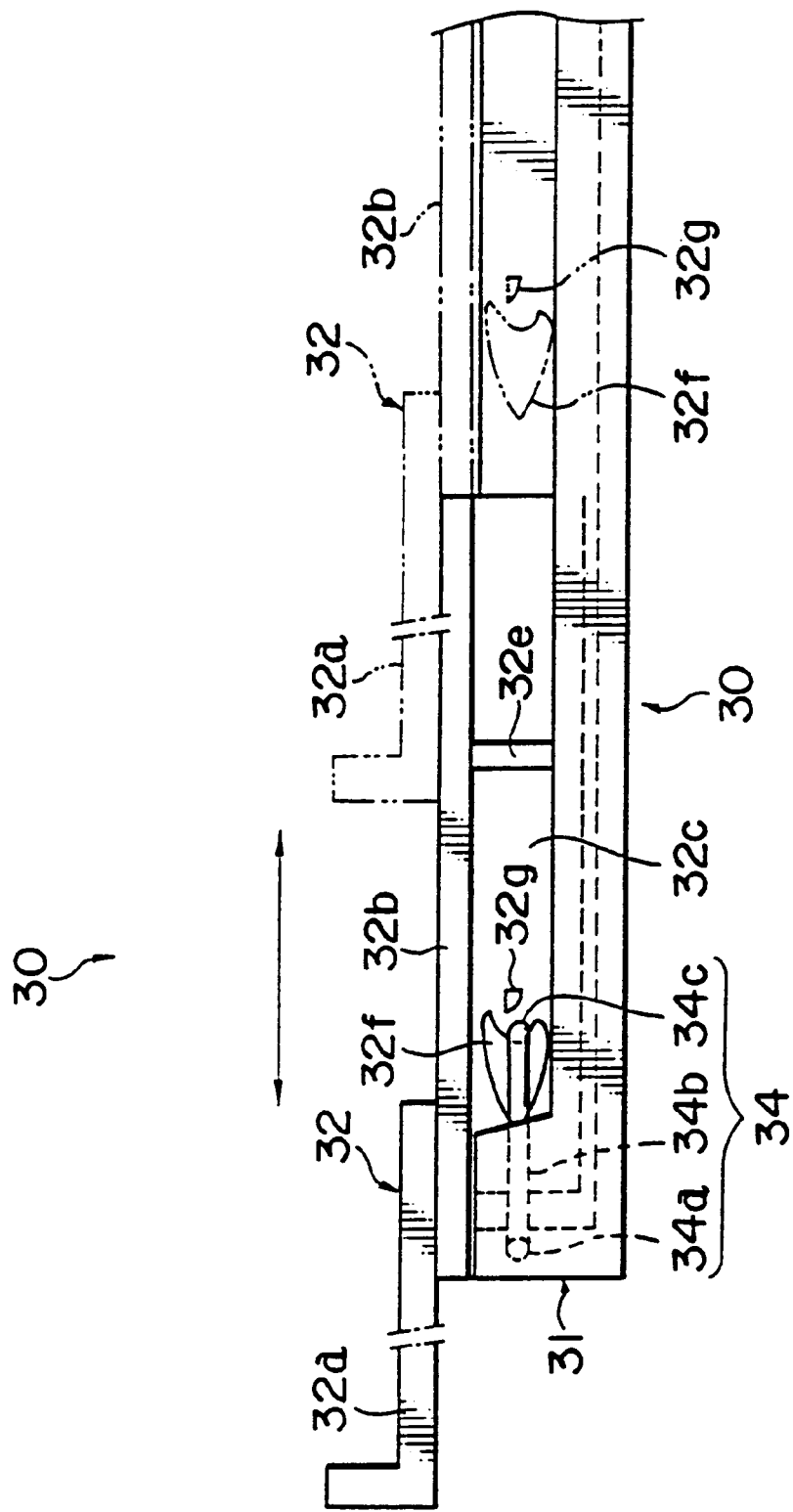
FIG. 15 is a side view of the phone ejector module.
Figure 16:
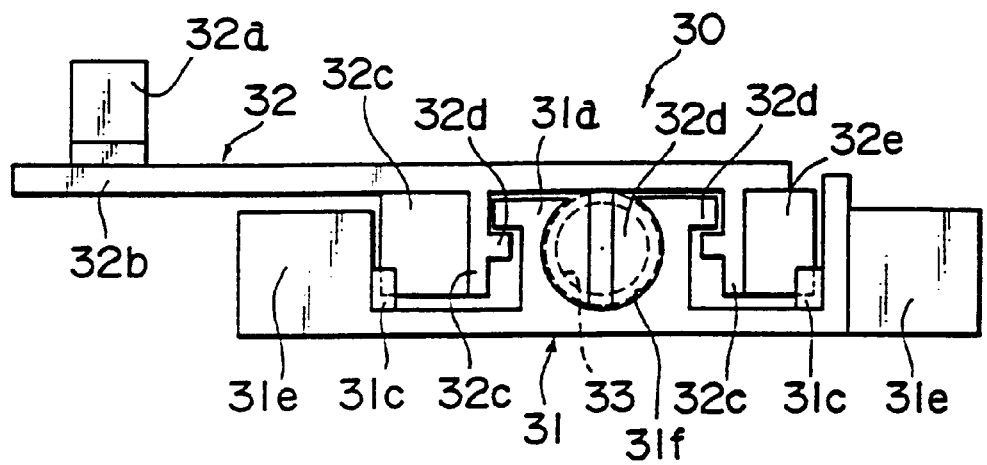
FIG. 16 is a front view of the phone ejector module.

The phone ejector module 30 is adapted to provide the mobile phone T with a pushing force (bias force) necessary to disengage the phone connector TC of the mobile phone 6 from the holder connector C when the mobile phone T is ejected from the phone holder, and includes a base member 31 and a slider 32 as shown in FIGS. 14 to 16.

Cylindrical mount portions 31e each having a vertically extended bolt insertion hole 31d are provided in specified positions of the base member 31. By inserting bolts into the respective bolt insertion holes 31d and rotating the bolts into unillustrated internally threaded holes formed in the bottom wall of the outer box 10, the base member 31 is fixed to a suitable bottom portion of the outer box 10.

A rail 31a extending in the phone inserting direction (left-right direction of FIG. 14) is provided on the upper surface of the base member 31. This rail 31a has a substantially T-shaped cross section when viewed from front as shown in FIG. 16, and a groove 31f having a substantially circular cross section is so formed as to open upward.

The slider 32 has a horizontal main plate 32b, and a pair of left and right vertical walls 32c projecting from the lower surface of the main plate 32b. Both vertical walls 32c extend in the phone inserting direction, and elongated projections 32d project inward from the inner side surfaces of the vertical walls 32c. The slider 32 is slidably supported on the base member 31 (along phone inserting direction) by engaging the vertical walls 32c and the elongated projections 32d with an upper end portion of the rail 31a. An arm 32a which has a substantially L-shaped cross section when viewed along sideways direction and has a rear end projecting upward is fixed to the upper surface of the main plate 32b of the slider 32, and the rear end surface of the mobile phone T is brought into contact with the rear end of the arm 32a.

A rear wall 31b stands substantially upright at the rear end (left end in FIG. 14) of the base member 31, and a cylindrical spring support shaft 31c projects forward from a middle position of the rear wall 31b. A rear part of a coil spring 33 is mounted on this spring support shaft 31c, and a front part thereof is fitted into the groove 31f of the rail 31a. On the other hand, a spring support plate 32d is in contact with the lower surface of the slider 32 and is fitted in the groove 31f.

The coil spring 33 is held between the spring support plate 32d and the rear wall 31b, and the slider 32 is urged forward (to the right in FIGS. 14 and 15) by the bias force of the coil spring 33. Further, stoppers 31c project at the opposite ends of the rear part of the base member 31, whereas contact pieces 32e project outward from the vertical walls 32c of the slider 32. A position where the contact pieces 32e and the stoppers 31c are in contact with each other is a foremost end position (position shown by phantom line in FIG. 14) of the slider 32.

At the rear part of the base member 31 is provided a locking bar 34 for locking the slider 32. This locking bar 34 includes a base shaft 34a extending along the transverse direction of the mobile phone T (top-bottom direction in FIG. 14), a pair of arms 34b extending forward from the opposite ends of the base shaft 34a, and locking portions 34c extending inward from the front ends of the respective arms 34b. The base shaft 34a is pivotally supported on the rear wall 31b. Further, a spacing between the leading ends of the locking portions 34c is set slightly larger than a spacing between the outer surfaces of the vertical walls 32c of the slider 32.

Figure 17:
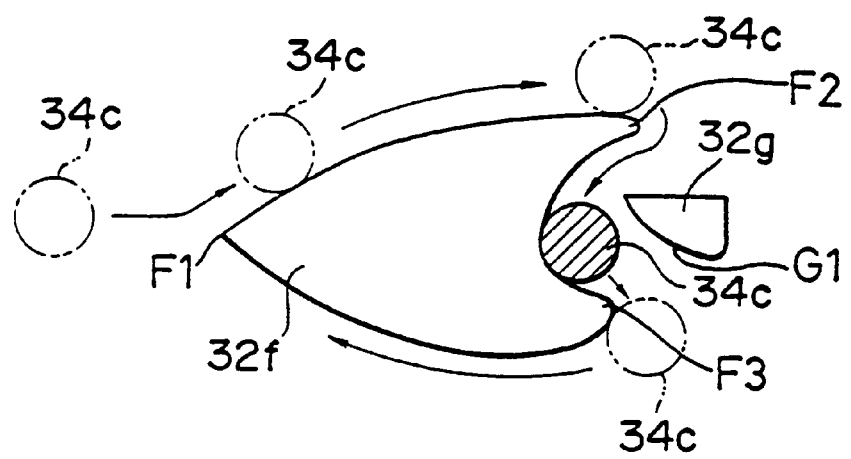
FIG. 17 is a side view of an engaging projection and a guide projection formed in a slider of the phone ejector module.

On the other hand, an engaging projection 32f and a guide projection 32g as shown in FIG. 17 are formed on the outer surface of a rear portion of each vertical wall 32c. Each engaging projection 32f has a single apex F1 substantially in the middle of its rear end (left end in FIG. 17) along vertical direction, and has two apexes F2, F3 at the opposite ends of its front end along vertical direction. The outer surface between the apices F2 and F3 is dented so that the engaging projection 32f has a substantially heart shape as a whole. On the lower surface of the guide projection 32g is formed a guide surface G1 which is inclined downward toward the front (toward the right side in FIG. 17).

As the rear end of the arm 32a is pushed by the mobile phone T being inserted into the holder main body and the slider 32 is retracted against the bias force of the coil spring 33, the locking portions 34c of the locking bar 34 move onto the upper surface of the engaging projections 32f of the slider 32 (see arrow of FIG. 17). When the locking portions 34c move beyond the apex F2 of the engaging projection 32f, the locking portions 34c enter the recesses between the apexes F2 and F3 (position indicated by solid line in FIG. 17) by being subjected to the bias force of the coil spring 33. As a result, the slider 32 is locked in its locking position indicated by solid line in FIGS. 14 and 15. Further, by pushing the slider 32 from this position further to a rearmost end position, the locking portions 34c come downward out of the recesses (see arrows of FIG. 17) by being guided by the guide surfaces G1 of the guide projections 32g located before the recesses. As a result, the locking is released so that the slider 32 is pushed forward by the bias force of the coil spring 33.

Here, the locked position of the slider 32 is set at a position where the connection of the mobile phone T in contact with the arm 32a of the slider 32 and the holder connector C of the connector module 20 is completed. The rearmost end position of the slider 32 is set in such a position that the holder connector C connected with the mobile phone T is retracted to the rearmost end position shown in FIG. 13.

Referring back to FIG. 1, the inner bottom frame 40 is placed on the bottom wall of the outer box 10, and includes a single front frame 41 extending along transverse direction and a pair of left and right main frames 42, 42 each extending backward from a middle portion of the front frame 41. A space is defined between the main frames 42, 42 for allowing the passage of a projected portion at the rear end of the arm 32a of the slider 32 (see FIG. 4).

Through holes 42a extending along transverse direction are formed at front parts of the main frames 42. The positions of these through holes 42a are so set as to be aligned with the through holes 11 of the outer box 10. Support plates 44 bulge out from rear portions of the main frames 42; spaces 46 are defined between the support plates 44 and the front frame 41; and rectangular notches 45 open along sideways direction are formed in intermediate positions of the support plates 44 along forward and backward directions. These notches 45 have the same width as the notches 12 of the outer box 10 and are formed in positions in conformity with the notches 12.

An inner wall pair 50 is comprised of right and left side plates 52A, 52B (or referred to as "movable portions") arranged upright, and nut portions 53A, 53B (see FIG. 4) having internally threaded through holes extending along the widthwise direction of the mobile phone T are formed at the bottom ends of the respective side plates 52A, 52B. The threads formed in the respective through holes are oriented in opposite directions (i.e., one is a right handed screw thread, and the other is a left handed screw thread). A dimension of the respective nut portions 53A, 53B along forward and backward directions is set such that the nut portions 53A, 53B are closely fitted in the spaces 46 of the inner bottom frame 40. As a result of this fitting, the respective side plates 52A, 52B are movably accommodated in the outer box 10 along the widthwise direction of the mobile phone T. Further, the internally threaded through holes are so positioned as to align with the through holes 42a, 11 in the transverse direction.

The positions of the side plates 52A, 52B are adjusted by a screw shaft 54 (or referred to as a "position adjuster"). A middle portion of the screw shaft 54 is insertable into the through hole 42a (see FIG. 4), and left and right portions thereof are formed into externally threaded portions 54a, 54b to be screwed into the respective nut portions 53A, 53B. An operable portion 54c which is rotated by a driver or like tool is formed at one end surface of the screw shaft 54 (end surface facing the through hole 11). By rotating the screw shaft 54, the side plates 52A, 52B are simultaneously moved toward and away from each other.

Now, referring back to FIG. 5, similar to the inner wall pair 50, an inner wall pair 60 is comprised of right and left side plates 62A, 62B (or referred to as "movable portions") arranged upright, and nut portions 63A, 63B having internally threaded through holes extending along the widthwise (transverse) direction of the mobile phone T are formed at the bottom ends of the respective side plates 62A, 62B. The threads formed in the respective through holes are oriented in opposite directions (i.e., one is a right handed screw thread, and the other is a left handed screw thread). A dimension of the respective nut portions 63A, 63B and a dimension of the side plates 62A, 62B along forward and backward directions are set such that the nut portions 63A, 63B and the side plates 62A, 62B are closely fitted in the notches 45 of the inner bottom frame 40 and the notches 12 of the outer box 10. As a result of this fitting, the respective side plates 62A, 62B are movably set in the outer box 10 along the widthwise (transverse) direction of the mobile phone T. Further, the internally threaded through holes are so positioned as to align with the through hole 13a of the projected portion 13 of the outer box 10.

The positions of the side plates 62A, 62B are adjusted by a screw shaft 64 (or referred to as a "position adjuster"). Similar to the screw shaft 54, a middle portion of the screw shaft 64 is insertable into the through hole 13a, and left and right portions thereof are formed into externally threaded portions 64a, 64b to be screwed into the respective nut portions 63A, 63B. An operable portion 64c which is rotated by a driver or like tool is formed at one end surface of the screw shaft 64 (the same side as the operable portion 54c of the screw shaft 54). By rotating the screw shaft 64, the side plates 62A, 62B are simultaneously moved toward and away from each other. The side surfaces of the respective side plates 62A, 62B are formed into tapered surfaces 62c which are more transversely spaced apart from the mobile phone T as approaching toward the phone entrance side, assuming that the side surfaces of the mobile phone T are substantially parallel to the phone insertion direction.

Figure 6:
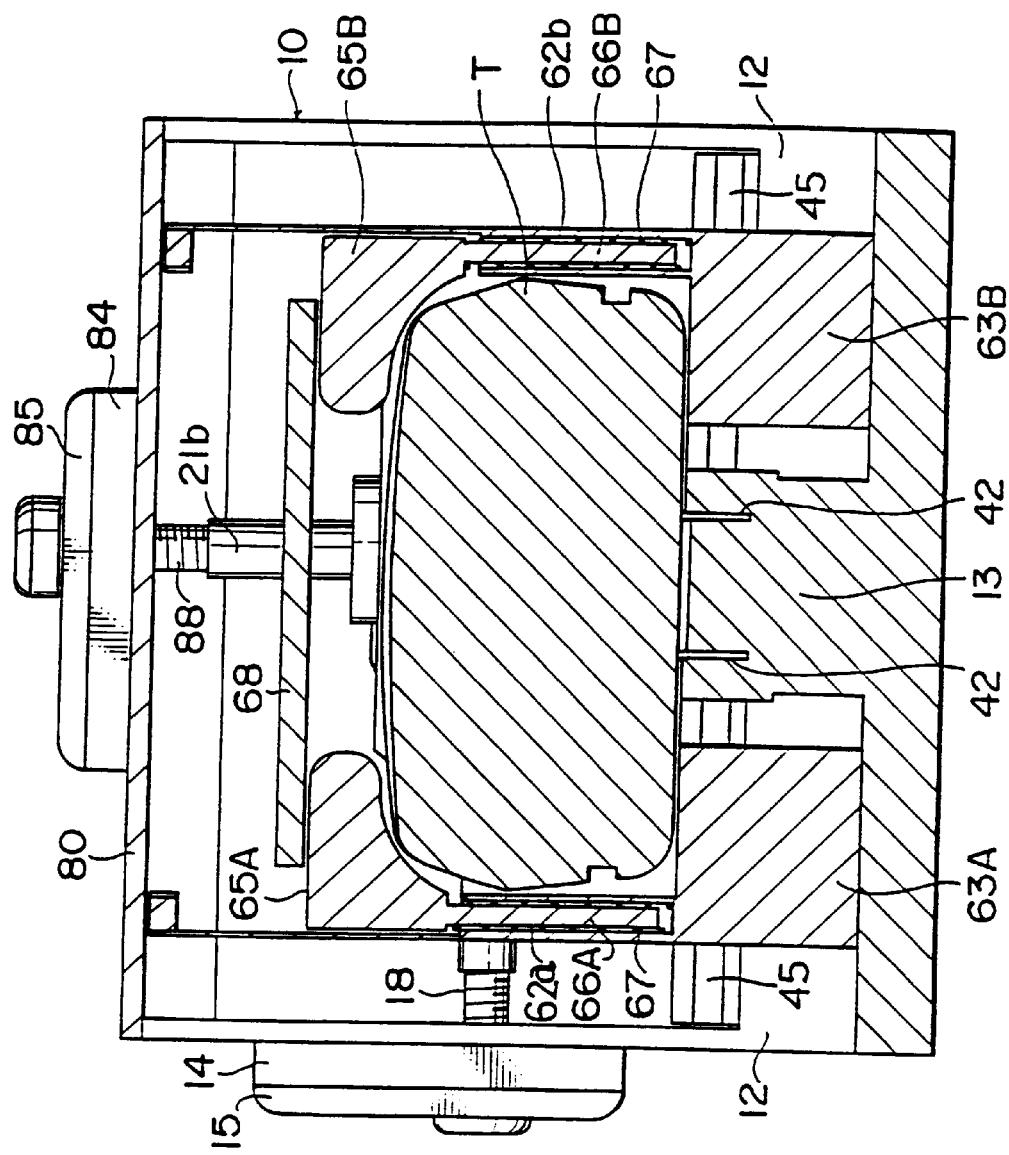
FIG. 6 is a cross sectional view of the phone holder taken along the line 6—6 in FIG. 3.
Figure 7:
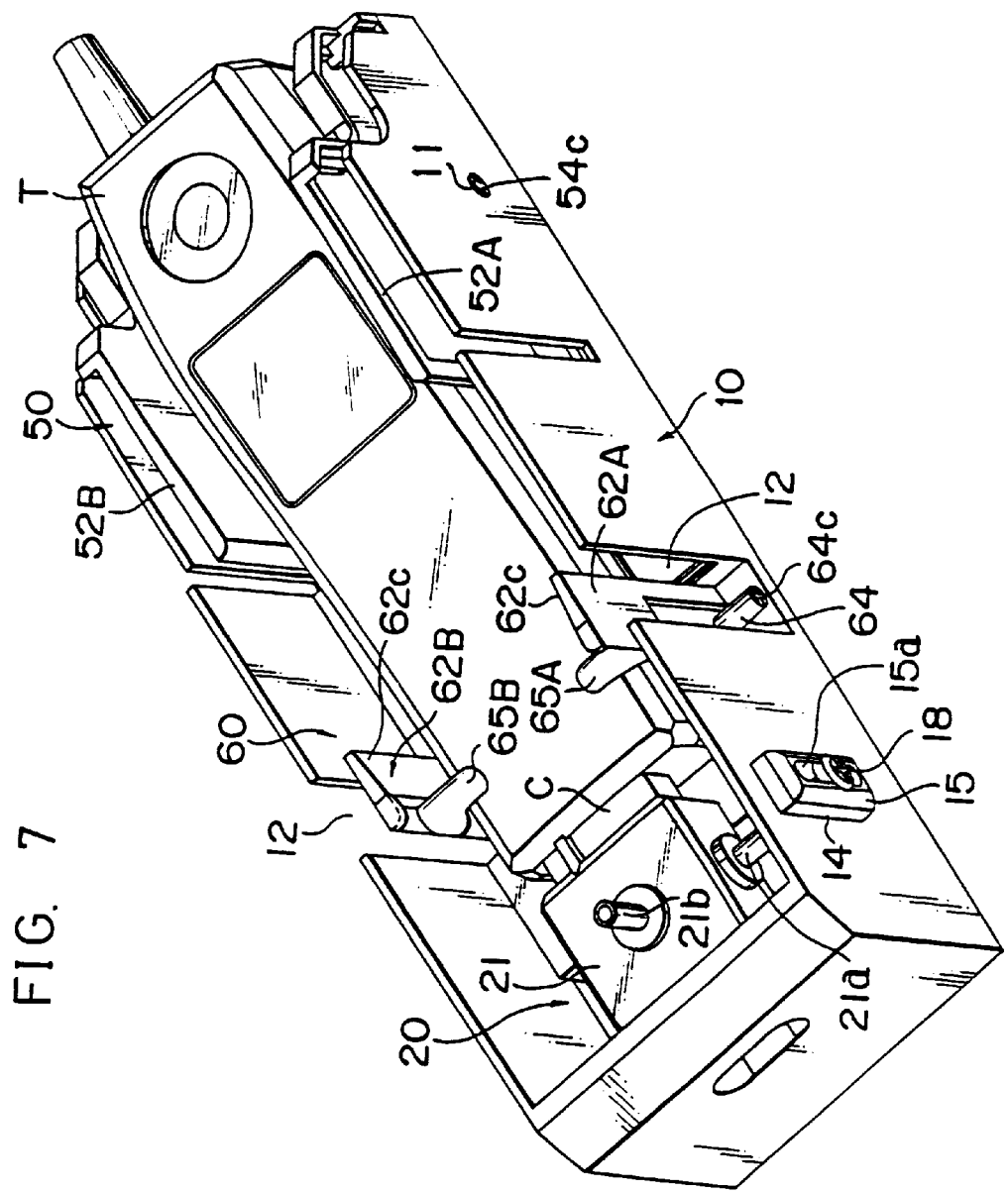
FIG. 7 is a perspective view of the phone holder with a ceiling wall omitted.
Figure 8:
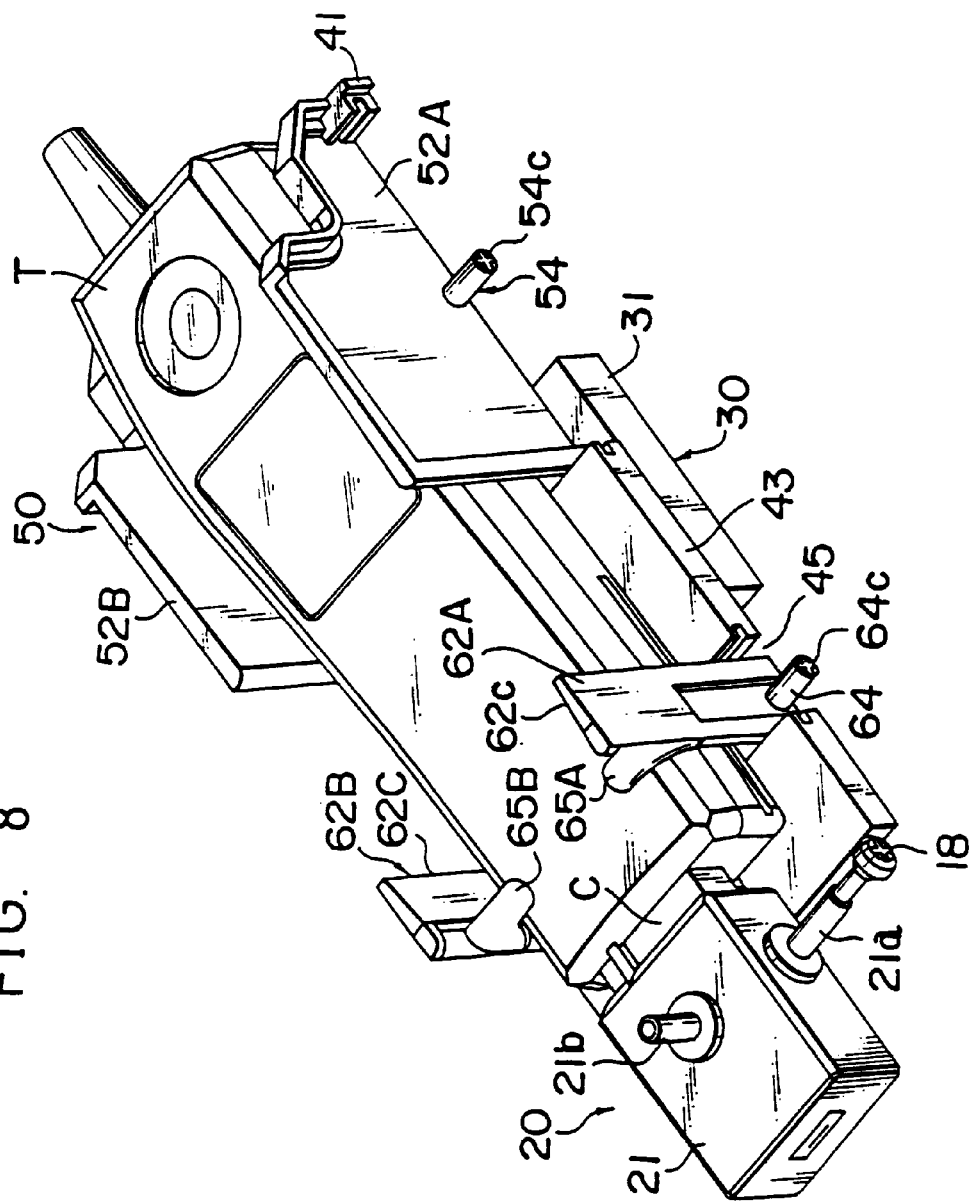
FIG. 8 is a perspective view of the phone holder with the ceiling wall and an outer box omitted.

On the respective side plates 62A, 62B, restricting projections 65A, 65B for restricting the position of the mobile phone T from above are movably provided along vertical direction. Specifically, tubular portions 62a, 62b which are open upward as shown in FIG. 6 are formed at rear portions of the respective side plates 62A, 62B, whereas columns 66A, 66B project downward from the respective restricting projections 65A, 65B. These columns 66A, 66B are fitted into the tubular portions 62a, 62b. The respective tubular portions 62a, 62b accommodate respective coil springs 67 surrounding the columns 66A, 66B. The respective restricting projections 65A, 65B are biased upward by the bias force of the coil springs 67. The inner surfaces of the restricting projections 65A, 65B are continuous with the inner surfaces of the side plates 62A, 62B and are so curved as to be brought into contact with part of the side surfaces and the upper surface of the mobile phone T (see FIGS. 5 and 6).

On the other hand, the ceiling wall 80 is coupled with an inner ceiling plate 68 for pressing the restricting projections 65A, 65B from above. This inner ceiling plate 68 extends along the phone inserting direction substantially in parallel with the ceiling wall 80 as shown also in FIG. 3, and a cylindrical nut 68a which is open upward is formed on its upper surface.

The ceiling wall 80 is formed with a round through hole 80b, and a frame 81 which is so shaped as to surround this through hole 80b is formed on the upper surface of the ceiling wall 80. A nut 82 is unrotatably accommodated in the frame 81, and an internally threaded hole of the nut 82 is in alignment with the through hole 80b and is exposed upward. A bolt 83 is screwed into the nut 82 and a bottom end portion thereof is screwed into the nut 68a, with the result that the ceiling wall 80 and the inner ceiling plate 68 are coupled one above the other by the bolt 83.

Next, the assembling of the phone holder, the adjustment of the respective parts and the action of the phone holder during the use after the adjustment are described.

1) The base member 31 of the ejector module 30 is secured to the bottom wall of the outer box 10 by bolts. The slider 32 is locked in the locking position shown by solid line in FIGS. 14 and 15. In other words, the locking portions 34c of the locking bar 34 of the base member 31 are engaged with the rear side recesses of the engaging projections 32f as shown by solid line in FIG. 17.

2) The screw shaft 54 is inserted into the through hole 42a of the inner bottom frame 40 for the centering. The internally threaded holes of the nuts 53A, 53B of the side plates 52A, 52B are screwed down the opposite externally threaded portions 54*a,* 54*b* of this screw shaft 54, and the side plates 52A, 52B are moved toward each other to a certain degree by turning the operable member 54*c* of the screw shaft 54 while the side plates 52A, 52B are oriented upright. At this time, the distance between the side plates 54A, 54B is set larger than the widthwise dimension of the mobile phone T.

3) The inner bottom frame 40 is secured to the bottom wall of the outer box 10. Thereby, the side plates 52A, 52B are accommodated in the outer box 10.

4) The screw shaft 64 is screwed into the through hole 13*a* formed in the projected portion 13 on the bottom wall of the outer box 10 for the centering. The internally threaded holes of the nuts 63A, 63B of the side plates 62A, 62B are screwed down the opposite externally threaded portions 64A, 64B of this screw shaft 64, and the side plates 62A, 62B are moved toward each other to a certain degree by turning the operable member 64*c* of the screw shaft 64 while the side plates 62A, 62B are oriented upright. At this time, the distance between the side plates 64A, 64B is set larger than the widthwise dimension of the mobile phone T.

5) In the state shown in FIG. 12, the holder connector C and the mobile phone T are connected through the opening 27*a* of the contact plate 27 while the contact plate 27 is pressed backward (downward in FIG. 12) at the rear end of the mobile phone T. During this connecting operation, the coupling bar 26 continuous with the contact plate 27 is retracted with respect to the inner housing 22, thereby rotating the connector side pinion 25 in mesh with the rack 26*a* of the coupling bar 26. As the pinion 25 is rotated, the holder connector C enters the inner housing 22 at half the speed of the retracting speed of the contact plate 27 (state of FIG. 12). In other words, the holder connector C and the mobile phone T are connected while the holder connector C is being retracted.

6) The mobile phone T is set in a specified position inside the outer box 10, i.e., a position where the rear end surface of the mobile phone T is in contact with the rear end of the arm 32*a* provided on the slider 32 of the ejector module 30.

7) The side plates 62*a,* 62B and 52A, 52B (or movable portions) are moved further toward each other by tuning the screw shaft (or position adjuster) 64 (54), and stopped in positions where the inner surfaces of the side plates 62A, 62B (52A, 52B) come into contact with the opposite side surfaces of the mobile phone T. Thereby, the side plates 52A, 52B, 62A, 62B are fittingly brought into contact with the outer surface of the mobile phone T.

8) The ceiling wall 80 is mounted on the outer box 10 with the bolt 83 screwed into the nut 82 of the ceiling wall 80 and the bottom end portion of the bolt 83 screwed into the nut 68*a* of the inner ceiling plate 68. The inner ceiling plate 68 is lowered to a position where the lower surface thereof presses the restricting projections 65A, 65B down to bring them into contact with the outer surface of the mobile phone T, and the bolt 83 is screwed until the head thereof comes into contact with the upper surface of the frame 81 (state of FIG. 3). Thereby, the restricting projections 65A, 65B are fixedly positioned on the mobile phone T at such a height position that the inner surface thereof comes into contact with the outer surface of he mobile phone T.

9) The bolt 18 is screwed into the nut 17 located in the frame 14 and the cover 15 through the through long hole 15*a,* and the leading end thereof is screwed into the nut 21*a* of the connector module 20. The position of the connector module 20 is fixed along transverse direction by screwing the bolt 18 until the head thereof comes into contact with the outer surface of the cover 15 (position of FIG. 9).

10) Similar to 9), the bolt 88 is screwed into the nut 87 located in the frame 84 and the cover 85 through the through long hole 85*a,* and the leading end thereof is screwed into the nut 21*b* of the connector module 20. The position of the connector module 20 is fixed along vertical direction by screwing the bolt 88 until the head thereof comes into contact with the outer surface of the cover 85 (position of FIG. 9). In this way, when the connector module 20 along the vertical direction is positioned, the position adjustment is completed.

After the above adjustment, the mobile phone T is further pushed in the inserting direction and the slider 32 having the arm 32*a* in contact with the mobile phone T is further moved to the back against the bias force of the coil spring 33. Then, the locking portion 34*c* fitted in the recesses between the apexes F2 and F3 of the engaging projections 32*f* come down out of the recesses by being guided by the guide projections 32*g,* thereby releasing the locking of the slider 32 by the locking portions 34*c.* As a result, the slider 32 advances by the bias force of the coil spring 33 and the mobile phone T is pushed toward the entrance side by the arm 32*a* of the slider 32.

During this operation, the holder connector C connected with the mobile phone T is also advanced in the inner housing 22. By the rotation of the pinion 25 provided on the holder connector C while being in mesh with the rack 22*c,* the coupling bar 26, having the rack 26*a* in mesh with the pinion 25, and the contact plate 27 continuous with the coupling bar 26 advance at the speed twice as fast as the advancing speed of the holder connector C. In other words, the ratio of the advancing speed of the coupling member 26 to the advancing speed of the holder connector C (pinion shaft 25*a*) is 2:0. As a result, the mobile phone T is disconnected from the holder connector C by being pushed by the contact plate 27 (state of FIG. 12). In this way, the mobile phone T can be easily taken out of the phone holder after being disconnected as above.

In the case that the mobile phone T is desired to be set in the phone holder again, it may be inserted into the phone holder along the side plates 52A, 52B and further along the side plates 62A, 62B. By inserting the mobile phone T, the arm 32*a* in contact with the rear end of the mobile phone T and the entire slider 32 are retracted on the base member 31 against the bias force of the coil spring 33 and the locking portions 34*c* of the locking bar 34 of the base member 31 move over the apex F2 (see FIGS. 15 and 17) of the engaging projections 32*f* and are fitted into the recesses located below the apex F2. As a result, the slider 32 is locked with the base member 31.

On the other hand, in the connector module 20, the contact plate 27 is retracted by being pushed by the rear end of the mobile phone T, and the connector holder C is connected with the phone side connector while being retracted at half the speed of the retracting speed of the contact plate 27.

In the phone holder of this embodiment, before an actual use of the phone holder, the position of the holder connector C is adjusted in advance to such a position as to be connectable with the phone connector of the mobile phone T. Accordingly, the mobile phone T is securely guided to the connecting position with the holder connector C irrespective of the various arrangement positions of the phone connectors of the mobile phones T to be used.

Further, in this embodiment, the holder connector C is accommodated in the connector housing consisting of the inner housing 21 and the outer housing 22 of the connector module 20, and the connector housing itself is movable along the phone inserting direction. The position of the connector housing along the phone inserting direction is adjusted by engagement of the nuts 21a, 21b (or first and second holder connector screw portions) formed in the outer side of the inner housing 21 and the bolts 18, 88 (or first and second bolts of the position fixing means). Accordingly, even if the arrangement position of the phone connector is displaced from the holder connector C along the phone inserting direction, such displacement can be adjusted by moving the connector housing in the phone inserting direction.

The first embodiment can take the following modifications and alterations.

Figure 18:
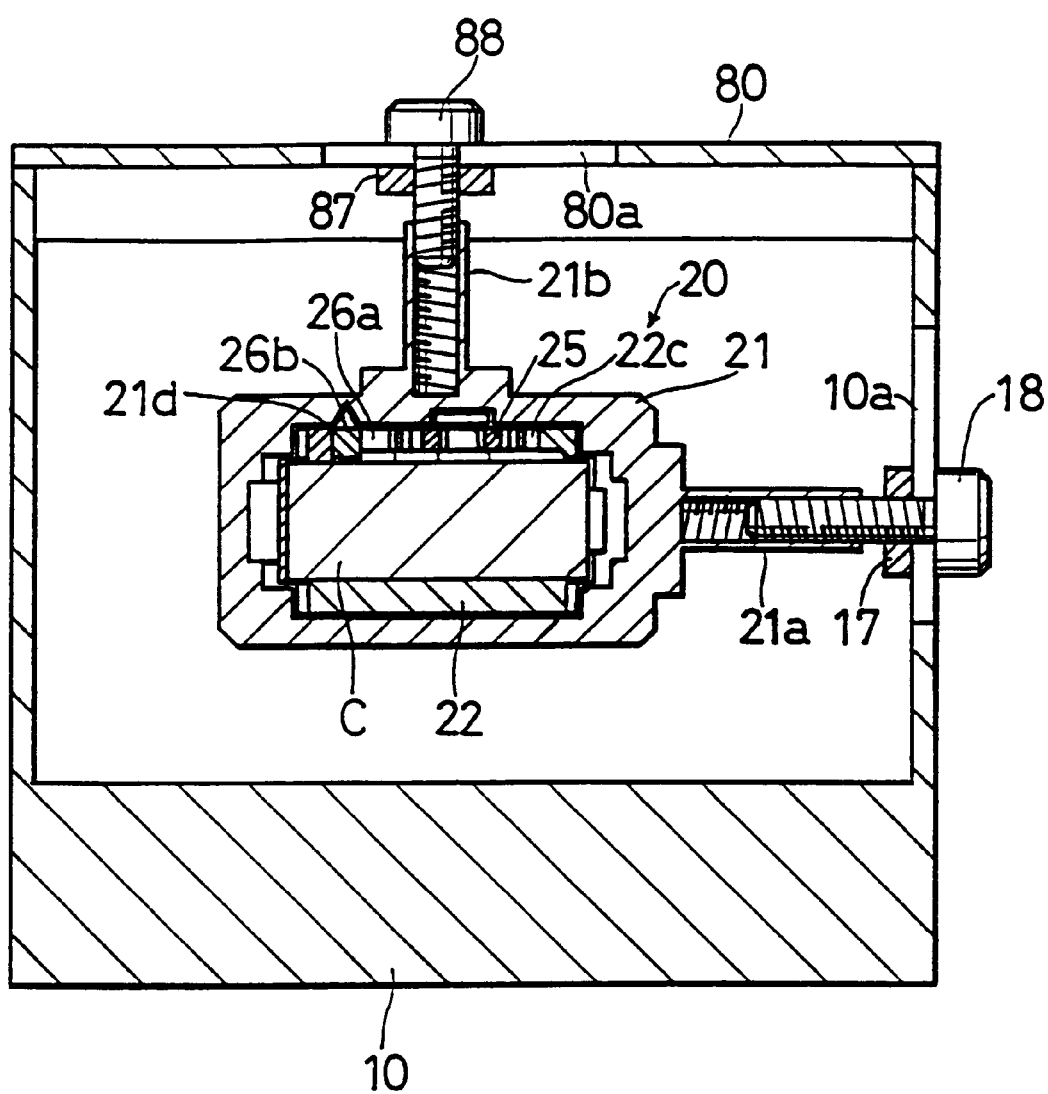
FIG. 18 is a cross sectional front view of essential part of a phone holder as an altered form of the first embodiment.

(1) In this embodiment, the frame 14 and the cover 15 constitute the first retaining portion to hold the nut 17, and the frame 84 and the cover 85 constitute the second retaining portion to hold the nut 87. Alternatively, as shown in FIG. 18, the nuts 17, 87 may be formed independently of the holder main body and may be mounted to such a position as to come into fitting contact with a backside surface of the holder main body (inner side wall of the outer box 10 and the lower surface of the ceiling wall 80). In this case, the bolt 18 & the nut 17, and the bolt 88 & the nut 87 are operated individually, and hence the operation as a whole becomes cumbersome. Accordingly, the arrangement of the first embodiment is advantageous in facilitating positioning of the holder connector C.

Figure 19:
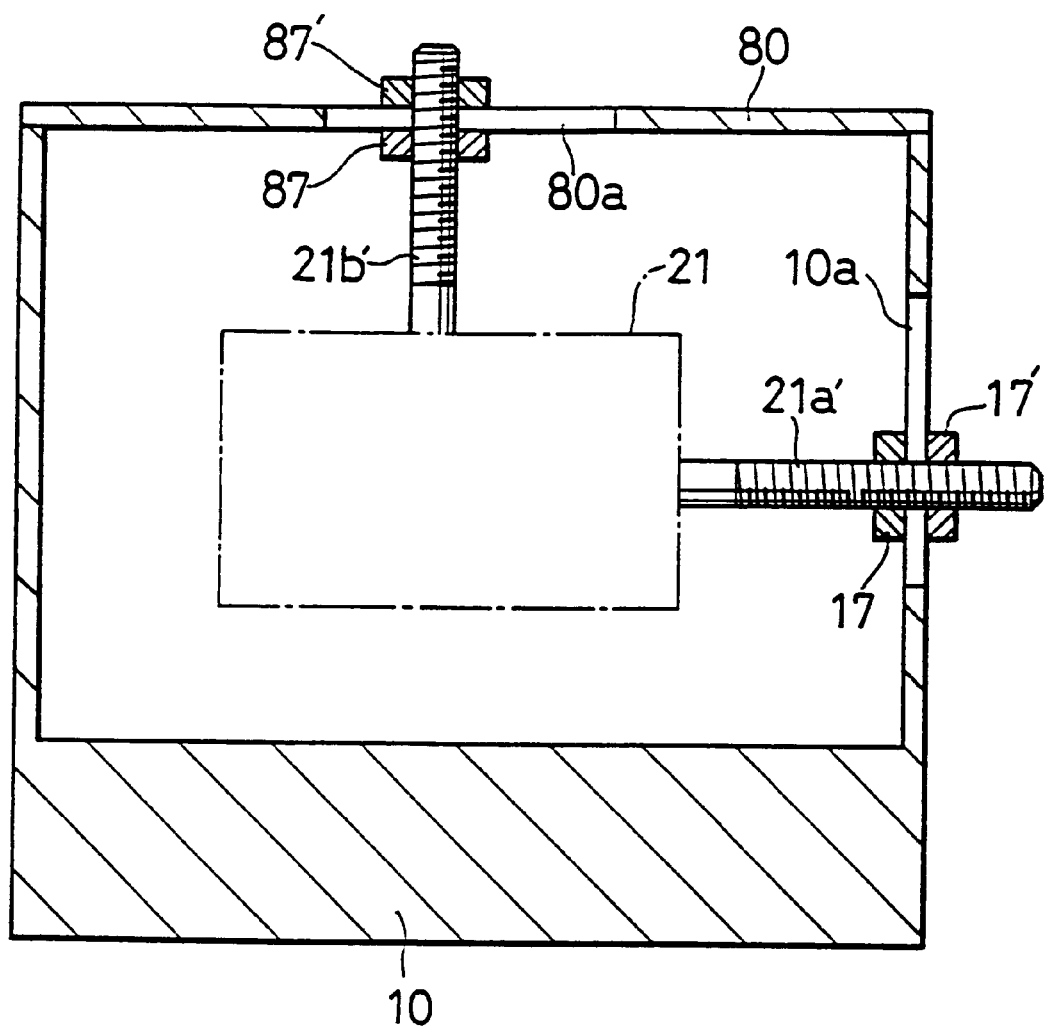
FIG. 19 is a perspective view of another altered form of the first embodiment.
Figure 20:
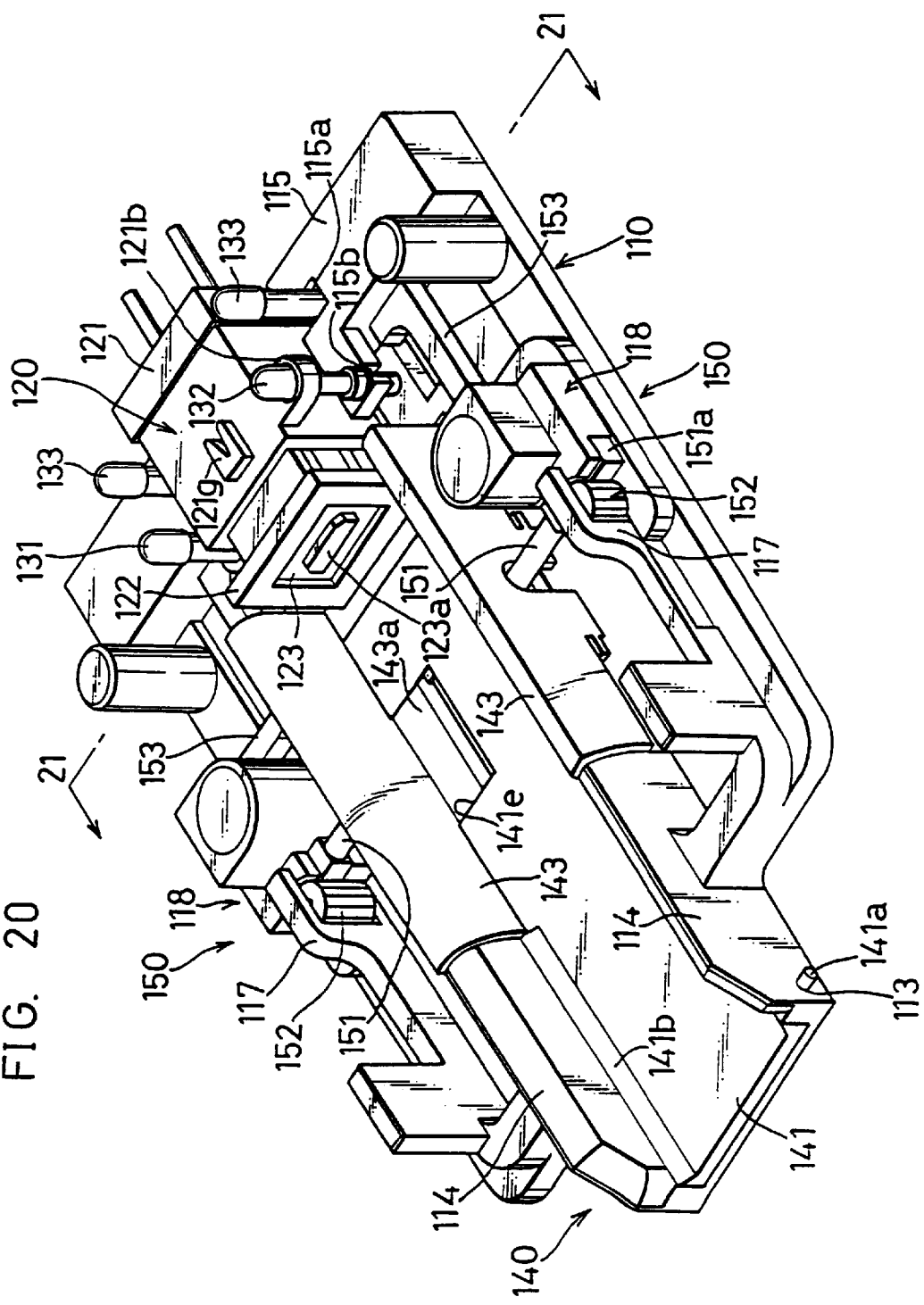
FIG. 20 is a perspective view showing an entire arrangement of a phone holder as a second embodiment according to this invention.

(2) As another altered form, as shown in FIG. 19, screw shafts 21a', 21b' respectively extending in the width direction of the mobile phone T (transverse direction of FIG. 19) and thickness direction of the mobile phone T (vertical direction of FIG. 19) may be provided in such a manner that an end thereof protrudes out of the outer box 10, in place of the nuts 21a, 21b shown in FIG. 9. Inserting the screw shafts 21a', 21b' in the through long holes 10a, 80a from inward and adjusting the vertical position of the screw shaft 21a' by operating the nuts 17, 17' and adjusting the transverse position of the screw shaft 21b' by operating the nuts 87, 87' respectively may position the holder connector C along transverse and vertical directions.

In this case, there is a possibility that the end of the screw shafts 21a', 21b' may protrude outward from the outer box 10 by an undesirable length depending on the arrangement position of the holder connector C. Accordingly, the arrangement of the embodiment is advantageous in that the bolts 18, 88 are fixed on the phone holder in such a state that only head portions thereof slightly bulge out of the outer wall of the phone holder irrespective of the position of the holder connector. Accordingly, the size of the phone holder as a whole becomes compact.

(3) In the case where the thickness (vertical direction in FIG. 9) or the width (transverse direction in FIG. 9) of the mobile phone T does not so greatly vary from the corresponding dimension of the holder main body relative to the holder connector C, the holder connector C may be movable along only one direction, i.e., the direction along which the position adjustment is necessary (either transverse or vertical direction), and the position fixing means may adjust the position of the holder connector C along the one direction.

For instance, in the case where only the transverse position adjustment of the holder connector C is necessary for the phone holder in FIG. 9, the through long hole 10a may be shaped into a circular bolt insertion hole, and the nut 17 may be fixed at a position corresponding to the circular bolt insertion hole. Alternatively, the bolt insertion hole itself may be formed into a through thread hole meshable with the bolt 18.

Second Embodiment

A second embodiment according to this invention is described with reference to FIG. 20 to 42. It should be noted that elements in this embodiment which are identical to those in the first embodiment are indicated at the same reference numerals as those in the first embodiment.

A phone holder in this embodiment comprises a base 110, a phone guiding unit 140, (see FIGS. 20 to 33), and a connector module 120 (see FIGS. 34 to 42). The base 110 and the phone guiding unit 140 constitute a holder main body.

The connector module 120 is secured on the base 110 at a position immediately behind the phone guiding unit 140 (rear end in FIG. 20), and includes a casing 121, a phone ejector 122, and a holder connector 123.

Figure 35:
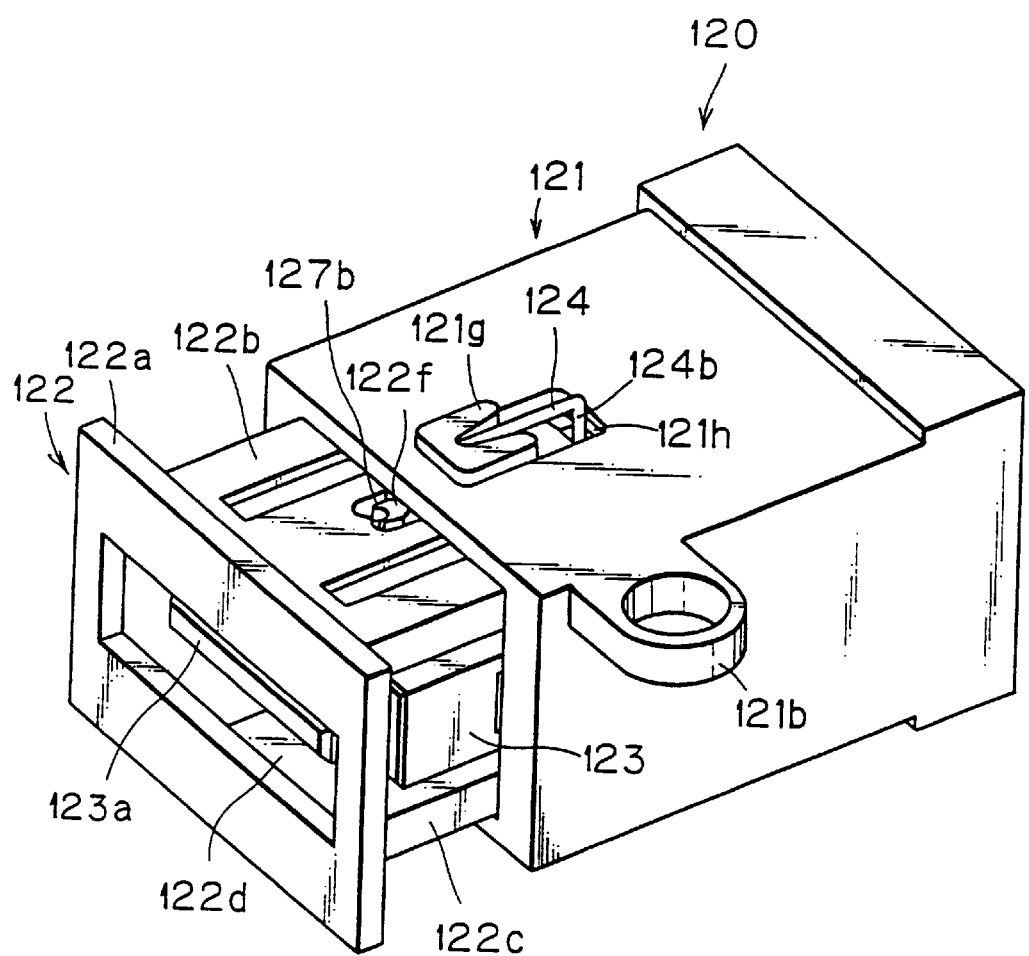
FIG. 35 is a perspective view of the assembled connector module of the second embodiment when viewed obliquely from forward.
Figure 36:
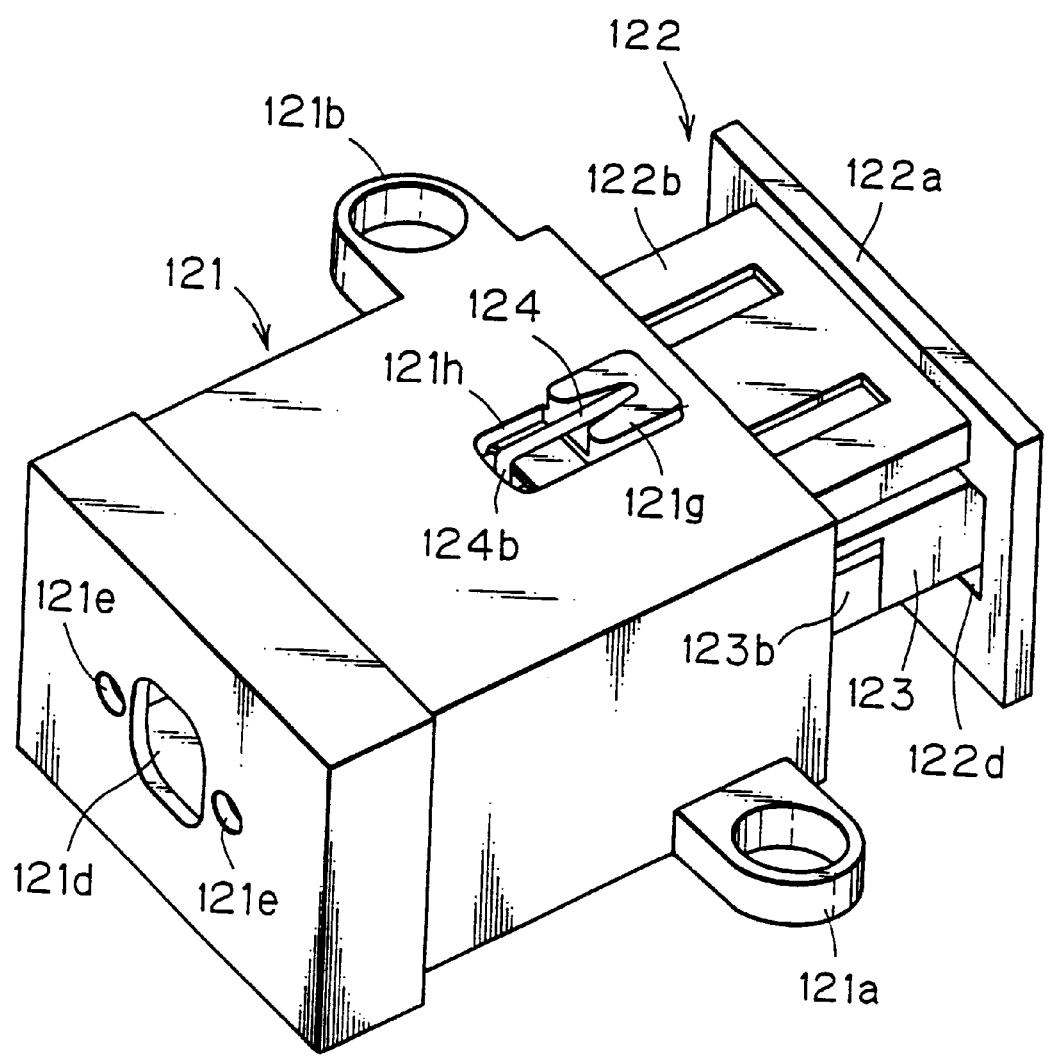
FIG. 36 is a perspective view of the assembled connector module of the second embodiment when viewed obliquely from rearward.

As shown in FIG. 35, the casing 121 has a box shape opened forward, and is adapted to hold main parts of the phone ejector 122 and the holder connector 123 to be slidable along forward and backward directions.

Figure 34:
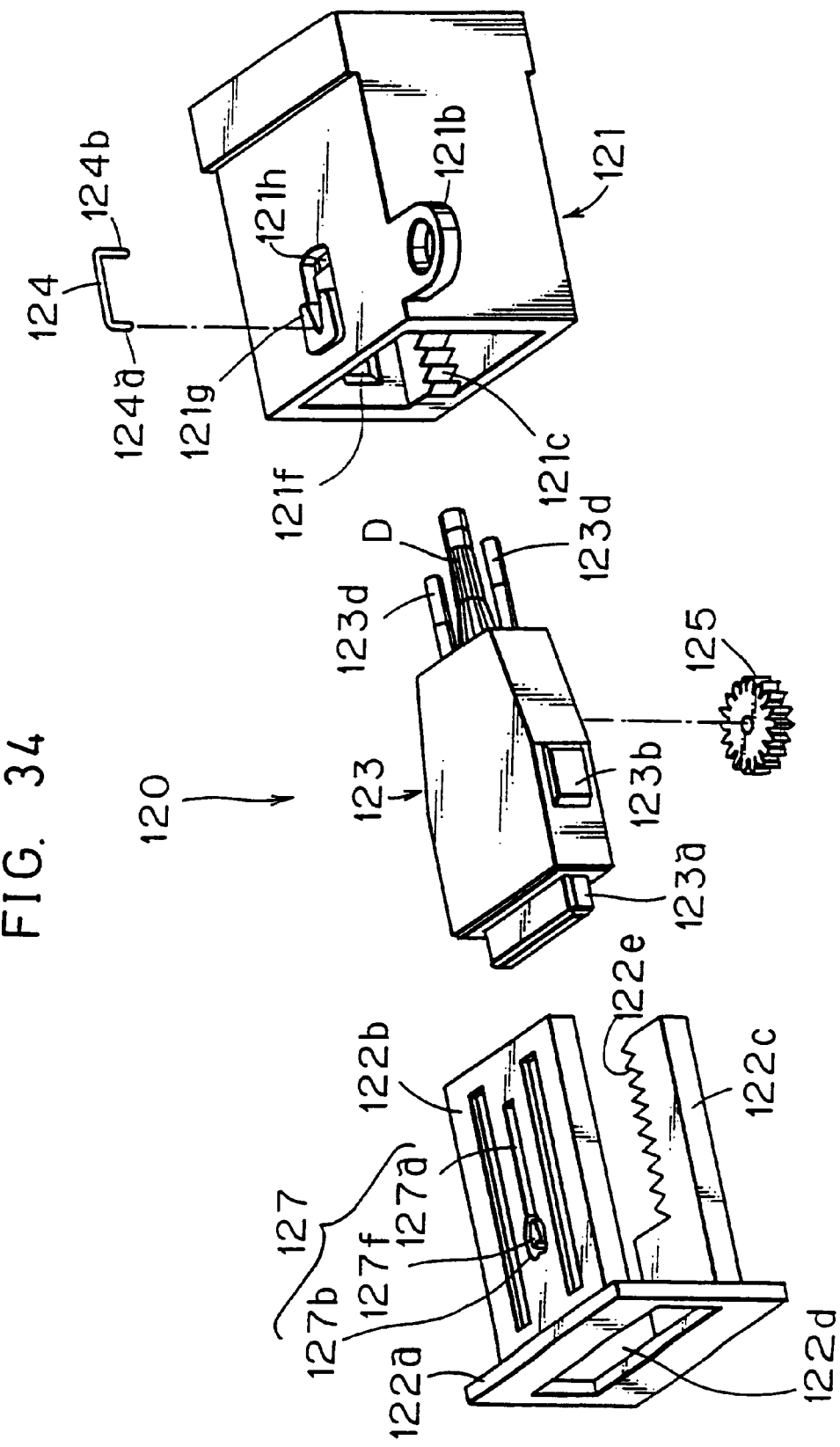
FIG. 34 is an exploded perspective view of the connector module in the second embodiment.

Referring to FIG. 34, the casing 121 is formed with a rack 121c extending along fore/aft directions at a left side of a bottom wall thereof, a cord insertion hole 121d in a center of a rear wall (left side wall in FIG. 36) thereof, and rod insertion holes 121e (see FIG. 36) at transverse directions of the cord insertion hole 121d.

An inverted U-shaped connector engaging pin 124 (see FIG. 34) is mounted in a center of a forward portion of a ceiling wall of the casing 121. The connector engaging pin 124 has a horizontally extended portion, a forward end 124a, and a rear end 124b. The forward end 124a and the rear end 124b are oriented downward.

Specifically, a hole 121i (see FIG. 42) opened upward is formed in the center of the ceiling wall of the casing 121. By inserting the forward end 124a of the connector engaging pin 124 in the hole 121i from above, the connector engaging pin 124 as a whole is attached on the casing 121 to be rotatable about an axis (forward end) 124a.

A through hole 121h (see FIG. 35) with substantially the same shape as the hole 121i is formed in the ceiling wall of the casing 121. A lower end of the rear end 124b of the connector engaging pin 124 protrudes downward in an inner space of the casing 121 through the through hole 121h. A V-shaped pivot restricting projection 121g is provided in the vicinity of the hole 121i of the ceiling wall to restrict a pivotal movement of the connector engaging pin 124 in a certain area.

Referring to FIG. 34, the phone ejector 122 has a vertical plate (ejector plate) 122a, and a pair of an upper horizontal plate 122b and a lower horizontal plate 122c. The horizontal plates 122b, 122c extend rearward from the ejector plate 122a, and are arranged at a position to vertically interpose the holder connector 123 therebetween. The ejector plate 122a is formed with a through opening 122d for passing the holder connector 123. The lower horizontal plate 122c has a cutaway portion at a left rear half thereof (rear side in FIG. 34), and is formed with a rack 122e along an inner side of the right rear half thereof.

Referring to FIGS. 38 to 41, a key shaped groove 127 for guiding a lead end of the rear end 124b of the connector engaging pin 124 is formed in a center of an upper surface of the upper horizontal plate 122b. The groove 127 consists of a straight portion 127a extending along forward and backward directions, and a loop line portion 127b connected to a forward end of the straight groove 127a. The loop line portion 127b has such a shape as to encase a substantially heart shaped projection 122f.

The shape of the loop line portion 127b is formed in such a manner that the rear end 124b of the connector engaging pin 124 starts from the straight portion 127a and fits in a recess P of the projection 122f after passing along the left side (upper side in FIGS. 38 to 41) of the loop line portion 127b, as the upper horizontal plate 122b of the phone ejector 122 is retracted in the casing 121 (i.e., the phone ejector 122 is pushed toward the casing 121), and then returns to the straight portion 127a after passing along the right side (lower side in FIGS. 38 to 41) of the loop line portion 127b, as the upper horizontal plate 122b goes out of the casing 121 (i.e., the phone ejector 122 is pushed back forward from the casing 121).

The holder connector 123 is connected with a terminal of a cord D (see FIG. 34), and accommodate in the casing 121 in a state that the cord D passes through the cord insertion hole 121d of the casing 121.

A connecting portion 123a (see FIG. 34) is formed at a forward end of a housing (connector housing) of the holder connector 123. Connection of the connecting portion 123a with a phone connector TC formed at a rear end of a mobile phone T connects the phone connector TC with the cord D via the holder connector 123.

Figure 37:
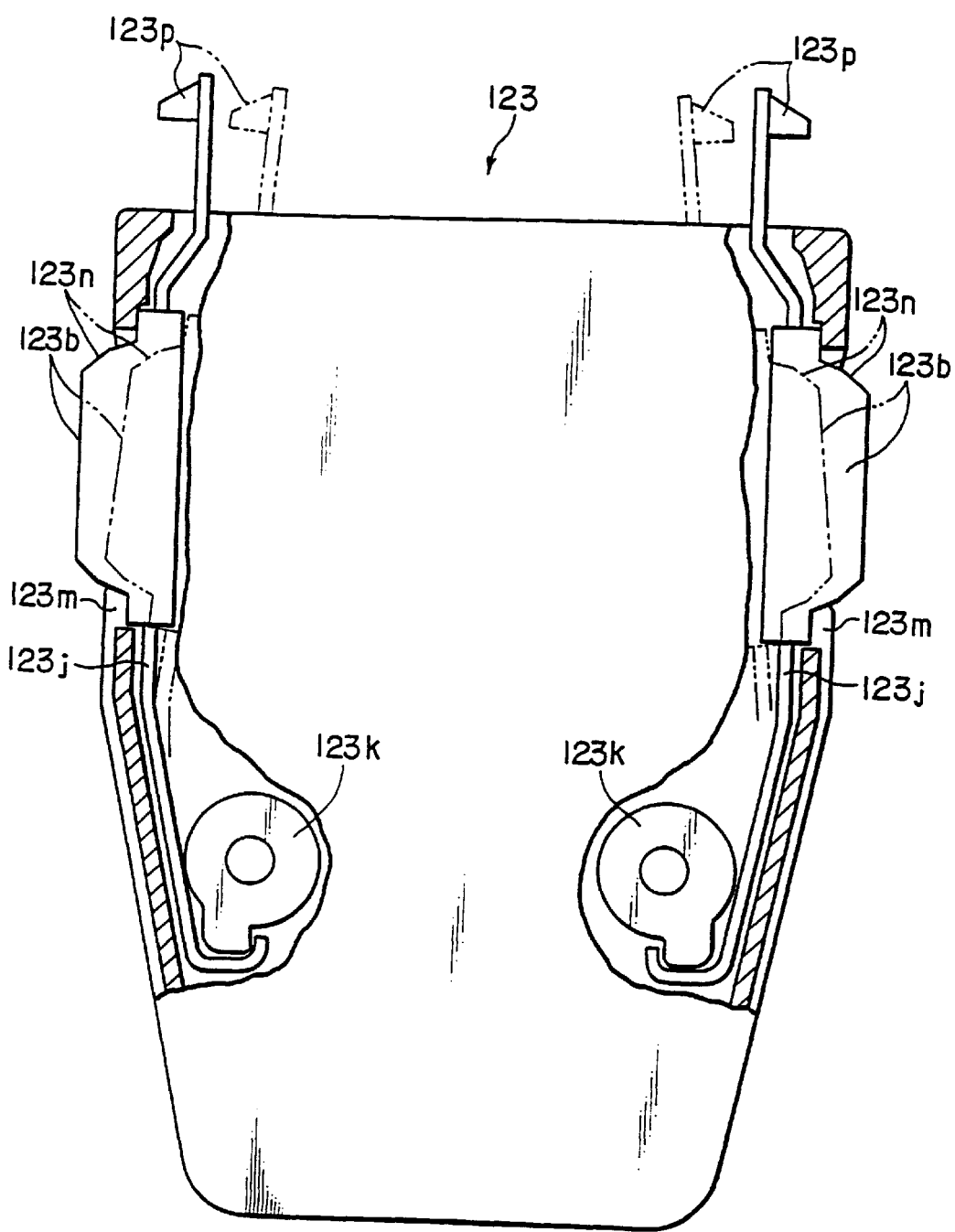
FIG. 37 is a partially cross sectional plan view of a holder connector which is mounted in the connector module of the second embodiment.
Figure 38:
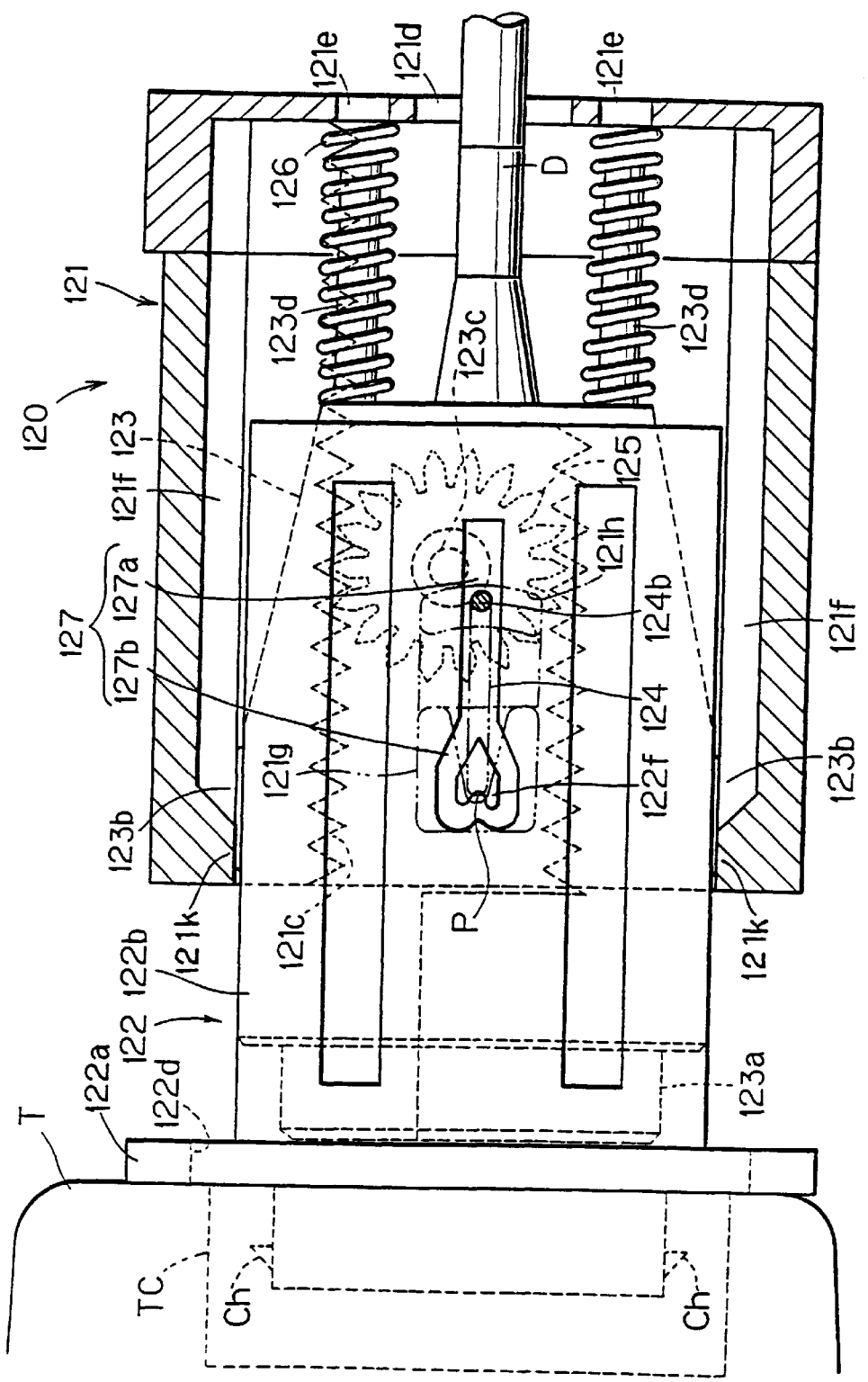
FIG. 38 is a cross sectional plan view showing a state that a phone ejector and the holder connector are located foremost in the connector module of the second embodiment.
Figure 39:
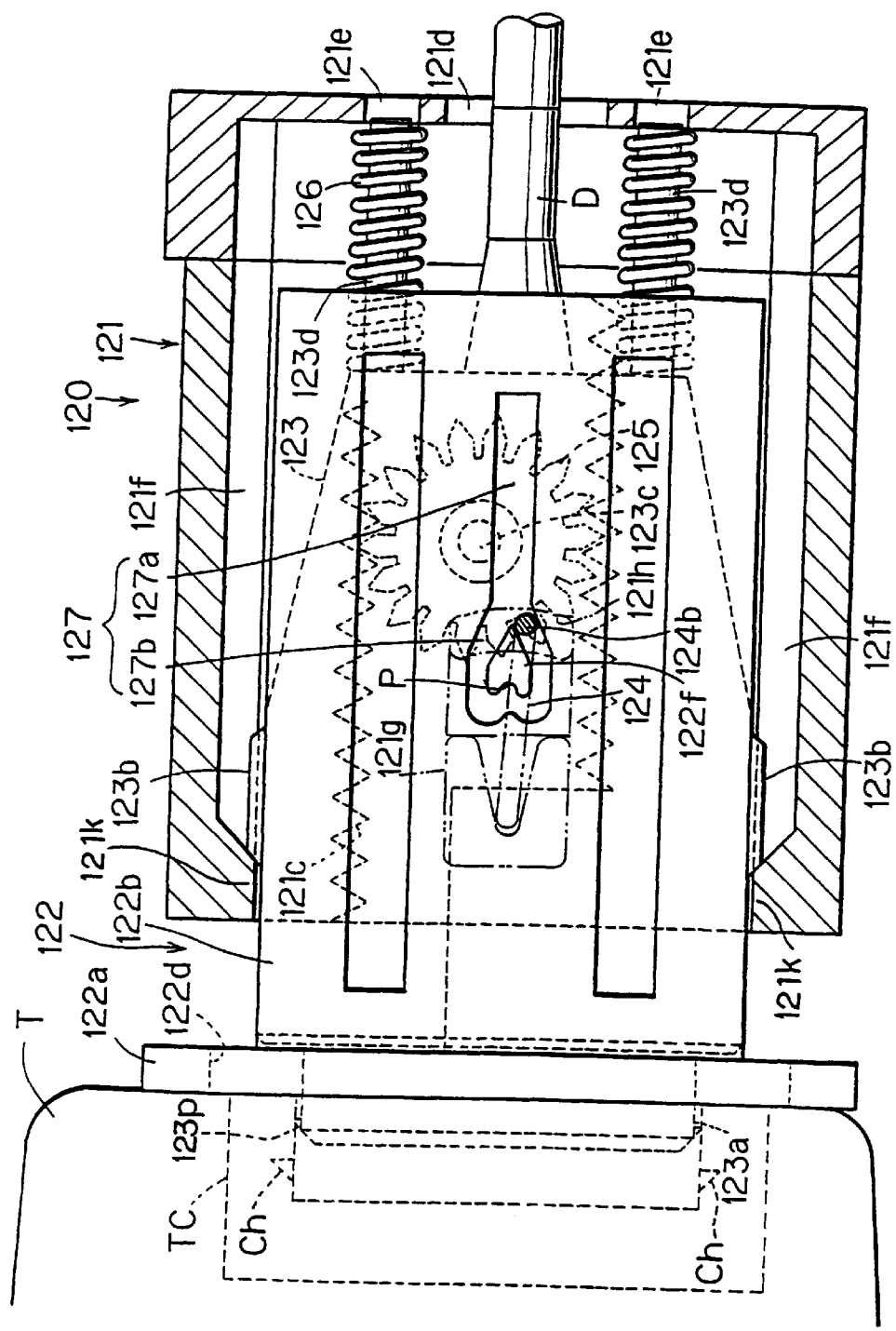
FIG. 39 is a cross sectional plan view showing a state that the holder connector and the phone connector start to connect in the connector module of the second embodiment.
Figure 40:
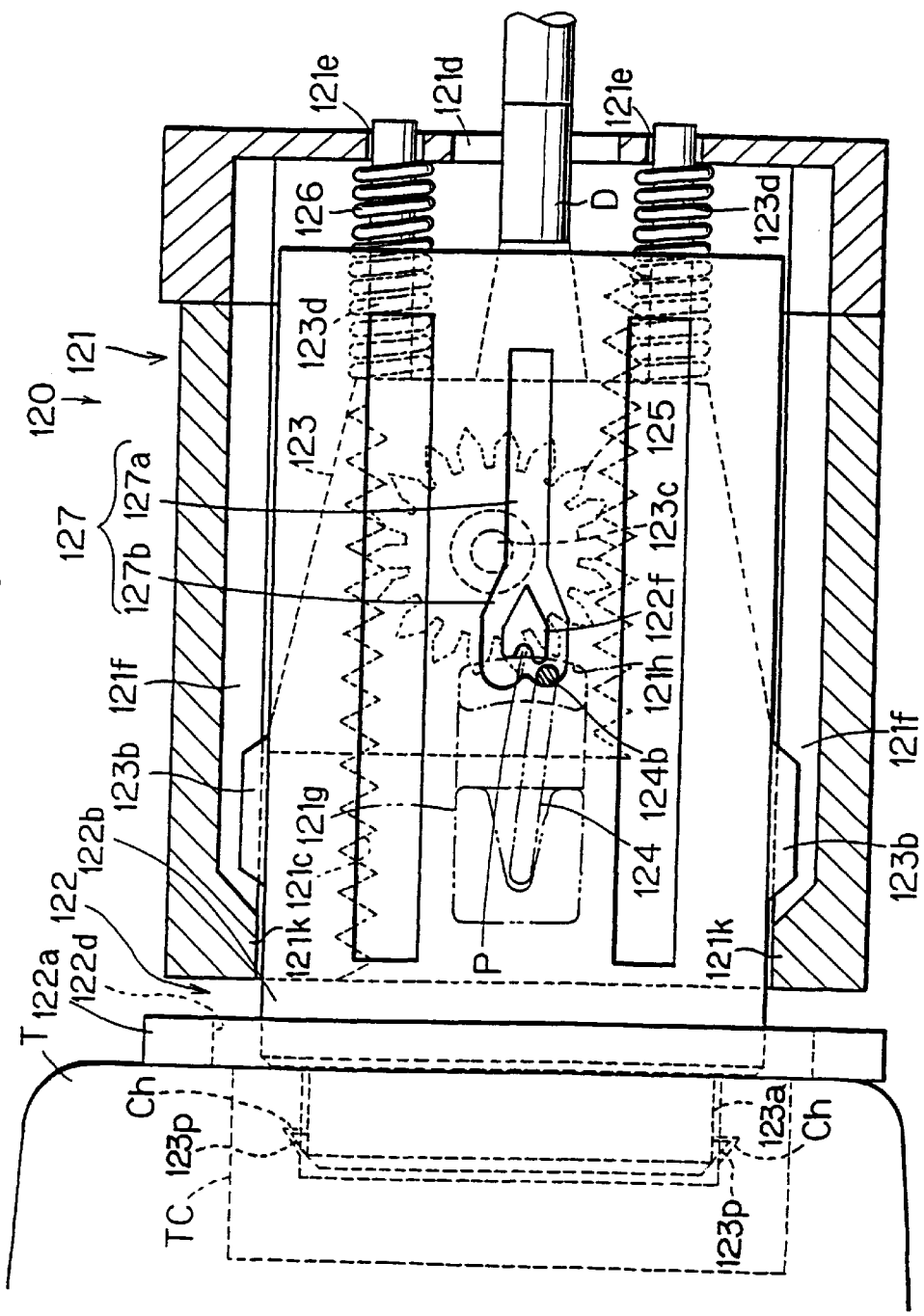
FIG. 40 is a cross sectional plan view showing a state that the holder connector is located rearmost in the connector module of the second embodiment after the connection of the holder connector with the phone connector is completed.

As shown in FIG. 37, a plate spring 123j extending along forward and backward directions (vertical direction in FIG. 37) is provided at each of the opposite lateral ends of the holder connector 123. The plate spring 123j has a rear end thereof secured on the connector housing and a forward end thereof formed into a free end. A laterally outward oriented locking pin 123p is provided at each of the free ends.

As shown in FIGS. 38 to 41, the locking pin 123p has an end thereof with a substantially flag shape projecting along transverse direction to secure an engaged state of the holder connector 123 with the phone connector TC (to lock the connection) by being inserted in a recess Ch formed in an inner side of the phone connector TC. An outward projecting engaging projection 123b (see FIG. 34) is formed in an intermediate portion along forward and backward directions of the holder connector 123. A tapered portion 123n (see FIG. 37) tapered toward the forward direction (upward direction in FIG. 37) is formed at an outer forward end of the engaging portion 123b.

For the sake of convenience, the connecting portion 123a is intentionally omitted in FIG. 37.

A deformation restricting portion 123k (see FIG. 37) with a cross section substantially shaped into a circular form is formed near a rear end of the plate spring 123j. The plate spring 123j is elastically deformable toward the longitudinal center line of the holder connector 123 at a fulcrum (contact portion) thereof in contact with the deformation restricting portion 123k.

Figure 21:
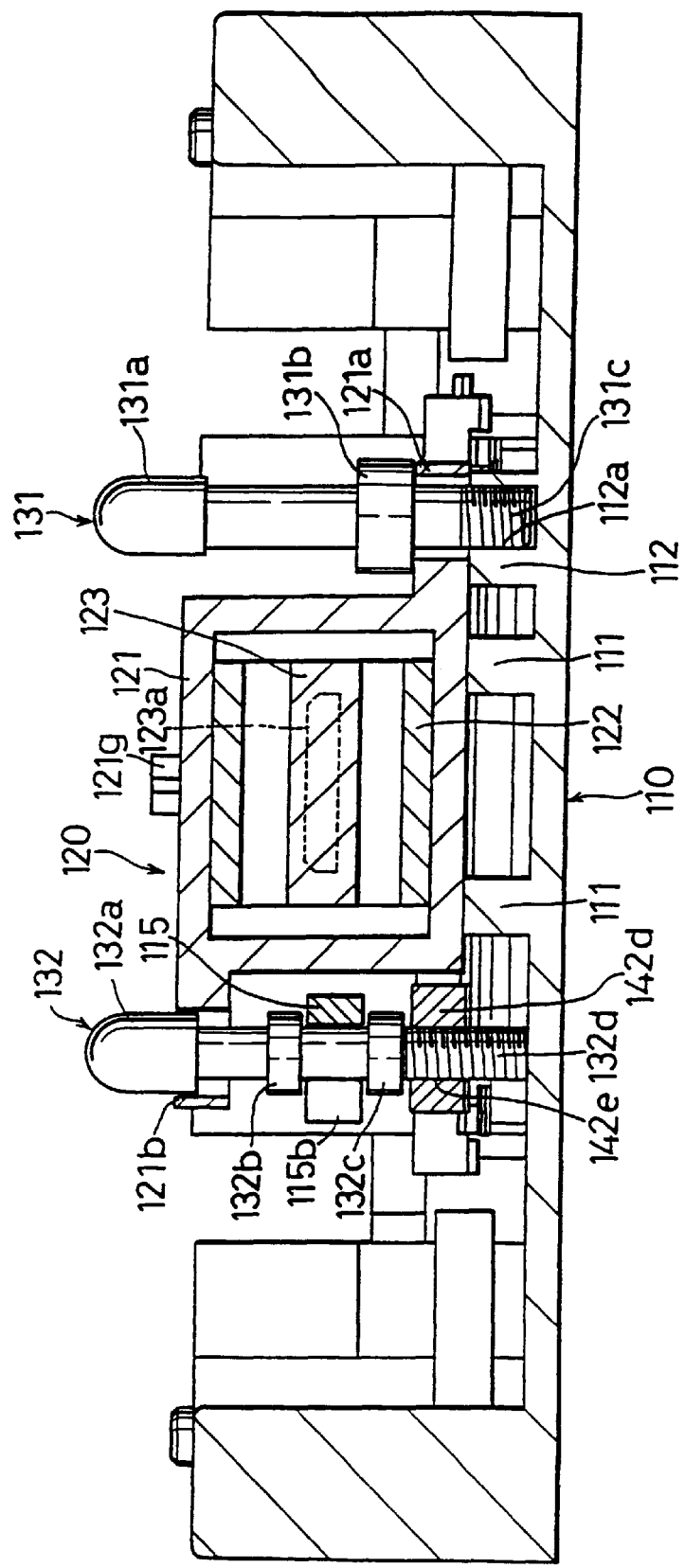
FIG. 21 is a cross sectional view taken along the line 21—21 in FIG. 20.
Figure 41:
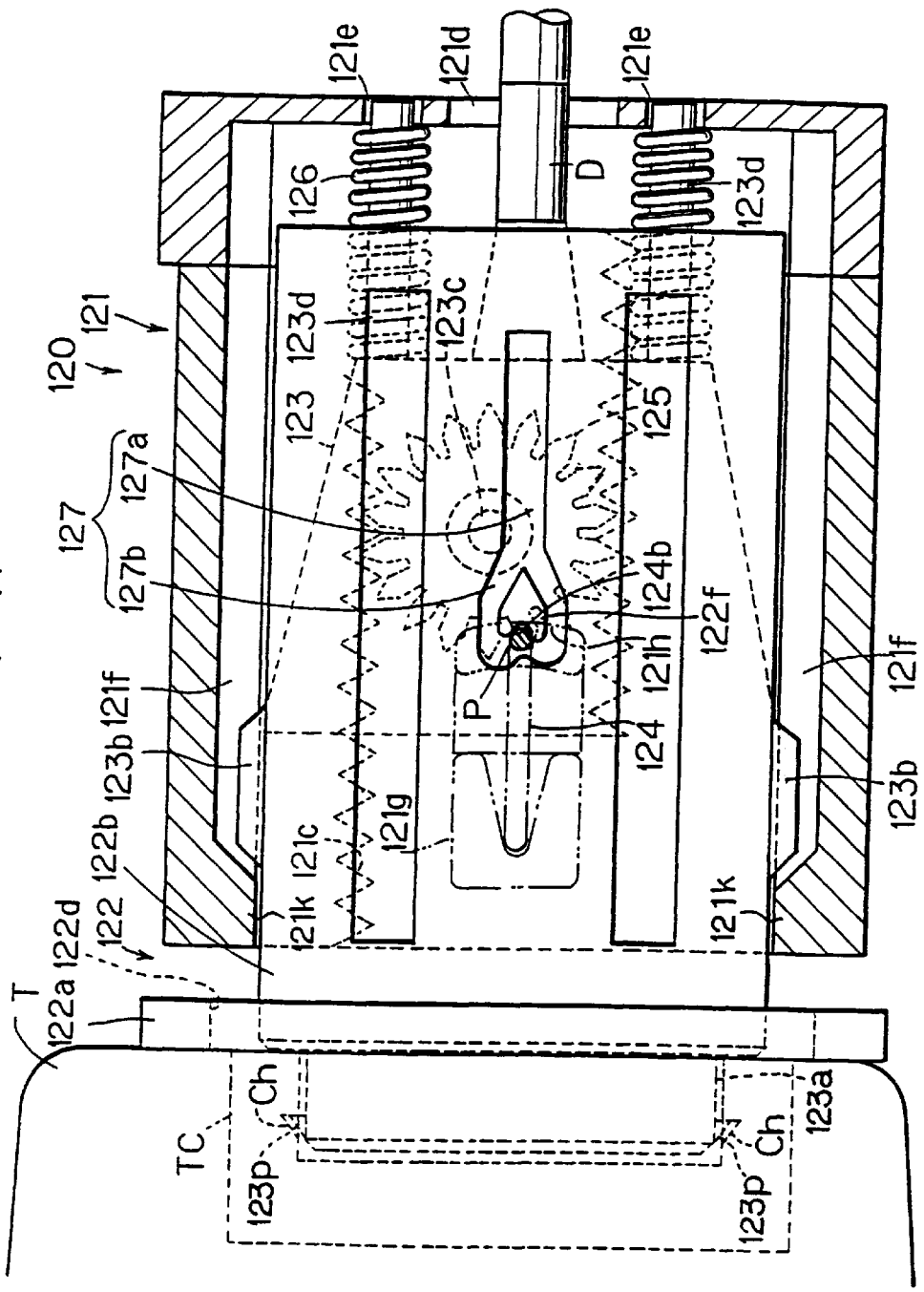
FIG. 41 is a cross sectional plan view showing a state that the phone ejector is biased toward a casing in the connector module of the second embodiment.

In a state that the plate spring 123j is not subject to deformation (state of solid line in FIG. 37), i.e., an external force is not applied, the engaging projections 123b project outward of the casing 121 through openings 123m formed in opposite side walls of the casing 121, and the locking pins 123p project from the connecting portion 123a in a state that the flag like lead ends thereof project in sideways (transverse) directions (see FIGS. 21 and 41).

On the other hand, when an external force is applied to the holder connector 123 to press the engaging projections 123b inward, the plate springs 123j are bent inward (state of phantom line in FIG. 37), and the locking pins 123p are transversely retracted inward from the state of solid line in FIG. 37 to the state of phantom line in FIG. 37.

On the other hand, a U-shaped groove 121f shown in FIGS. 38 to 41 is formed in an inner surface of opposite side walls of the casing 121. The groove 121f extends along forward and backward directions from a position slightly backward of a forward end of the casing 121 to a rear end of the casing 121. In other words, by slidingly inserting the holder connector 123 in the groove 121f, the holder connector 123 is held in the casing 121 to be slidable along forward and backward directions in a state that the engaging projections 123b are biased inward while coming into sliding contact with corresponding connector guide projections 121k of the casing 121.

A pair of left and right rods 123d (see FIG. 34) extend from a rear wall of the holder connector 123. The holder connector 123 as a whole is biased forward by a compressed coil spring 126 (see FIGS. 38 to 41) which is wound around each of the rods 123d. Each of the rods 123d is inserted in the rod insertion hole 121e of the casing 121 (see FIGS. 38 to 41).

Referring to FIGS. 38 to 41, a downward extended shaft 123c is formed at a bottom surface of the holder connector 123, and a pinion gear 125 is mounted on the holder connector 123 to be rotatable about an axis of the shaft 123c. The pinion gear 125 is in mesh with the rack 121c of the casing 121 and the rack 122e of the phone ejector 122. With this arrangement, the phone ejector 122 retracts in and comes out of the casing 121 at the speed as twice as fast as the holder connector 123.

Referring to FIGS. 38 to 41, the projection 122f and the groove 127 are so shaped that the rear end 124b of the connector engaging pin 124 fits in the recess P of the heart-shaped projection 122f when the phone ejector 122 and the holder connector 123 are moved to such a position as to connect the holder connector 123 with the phone connector TC of the mobile phone T in a state that the connecting portion 123a of the holder connector 123 projects forward through the opening 122d of the ejector plate 122a. This operation is described later in detail.

The connector module 120 is secured on the base 110 by a connector fixing member (or referred to as a "fixing member") 131.

The connector fixing member 131 has a vertically extended shaft main body, an operable head portion 131a formed at an upper end of the shaft main body, and an externally threaded portion 131c formed at a lower end thereof. The connector fixing member 131 is further formed with a flange portion 131b of a large diameter right above the externally threaded portion 131c. A pair of left and right connector support portions 111 are formed upright on a bottom wall of the base 110. Immediately rightward of the right side connector support portion 111 is formed a nut portion 112 having a threaded hole 112a opened upward. The externally threaded portion 131c of the connector fixing member 131 is meshable with the threaded hole 112a.

Referring to FIG. 21, a mounting portion (formed into an ear shaped portion, hereinafter referred to as an "ear portion") 121a having a vertical through hole and projecting along sideways (transverse) direction is provided on a lower portion on a right side wall of the casing 121 when the casing 121 is set in a state where the through hole 121h is opened upward (hereinafter referred to as a "first state").

Likewise, an ear portion 121b having the same shape as the ear portion 121a with a vertical through hole and projecting along sideways (transverse) direction is provided at such a position on an upper portion on the left side wall of the casing 121 as to correspond to the ear portion 121a. The ear portions 121a and 121b are symmetrically located with respect to a center point of the casing 121.

The ear portion 121a is also referred to as a "first mounting portion", and a the ear portion 121b is referred to as a "second mounting portion".

Referring to FIG. 21, the connector module 120 is mounted at such a position as to match the through hole of the ear portion 121a of the casing 121 with the threaded hole 112a of the base 110. Then, the externally threaded portion 131c of the connector fixing member 131 is screwed into the threaded hole 112a and the through hole of the ear portion 121a until the upper surface of the ear portion 121a is abutted against the flange portion 131b. Thereby, the connector module 120 is secured on the connector support portion 111 of the base 110 in a state that the through opening 121h is opened upward (i.e., the connector module 120 is set to the first state).

Figure 22:
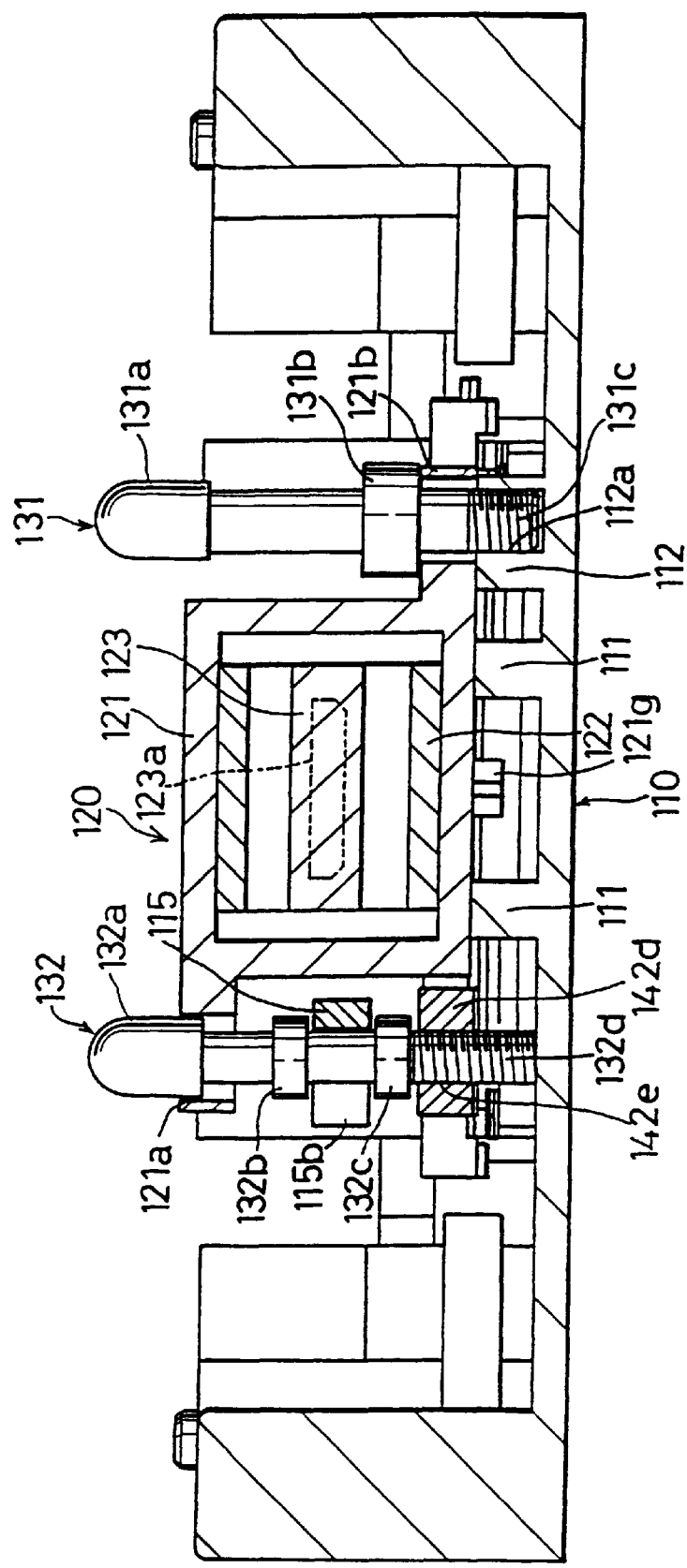
FIG. 22 is a cross sectional view of a connector module in a state that the connector module is inverted from a state in FIG. 20.

Referring to FIG. 22, the connector module 120 is mounted at such a position as to match the through hole of the ear portion 121b with the threaded hole 112a. The externally threaded portion 131c of the connector fixing member 131 is screwed into the threaded hole 112a and the through hole of the ear portion 121b until the upper surface of the ear portion 121b is abutted against the flange portion 131b. Thereby, the connector module 120 is secured on the connector support portion 111 in a state that the through opening 121h faces downward (hereinafter this state is referred to as a "second state").

In other words, in this embodiment, the connector module 120 can be selectively supported on the base 110 in the first state or the second state.

In the second state of FIG. 22, the pivot restricting projection 121g protrudes downward. Accordingly, this pivot restricting projection 121g is so shaped that the projection thereof is fitted in a spacing between the connector support portions 111 to avoid an interference with the base 110.

The phone guiding unit 140 has a hollow portion opened upward at a forward side (left side in FIG. 24) of the connector module 120 to guide the mobile phone T toward the connector module 120, and includes, as shown in FIGS. 23 to 26, a pivotal bottom wall (pivotal member) 141, an elevating bottom wall or elevating frame (elevating member) 142, and a pair of left and right movable side walls 143 (or referred to as "movable portions").

Figure 23:
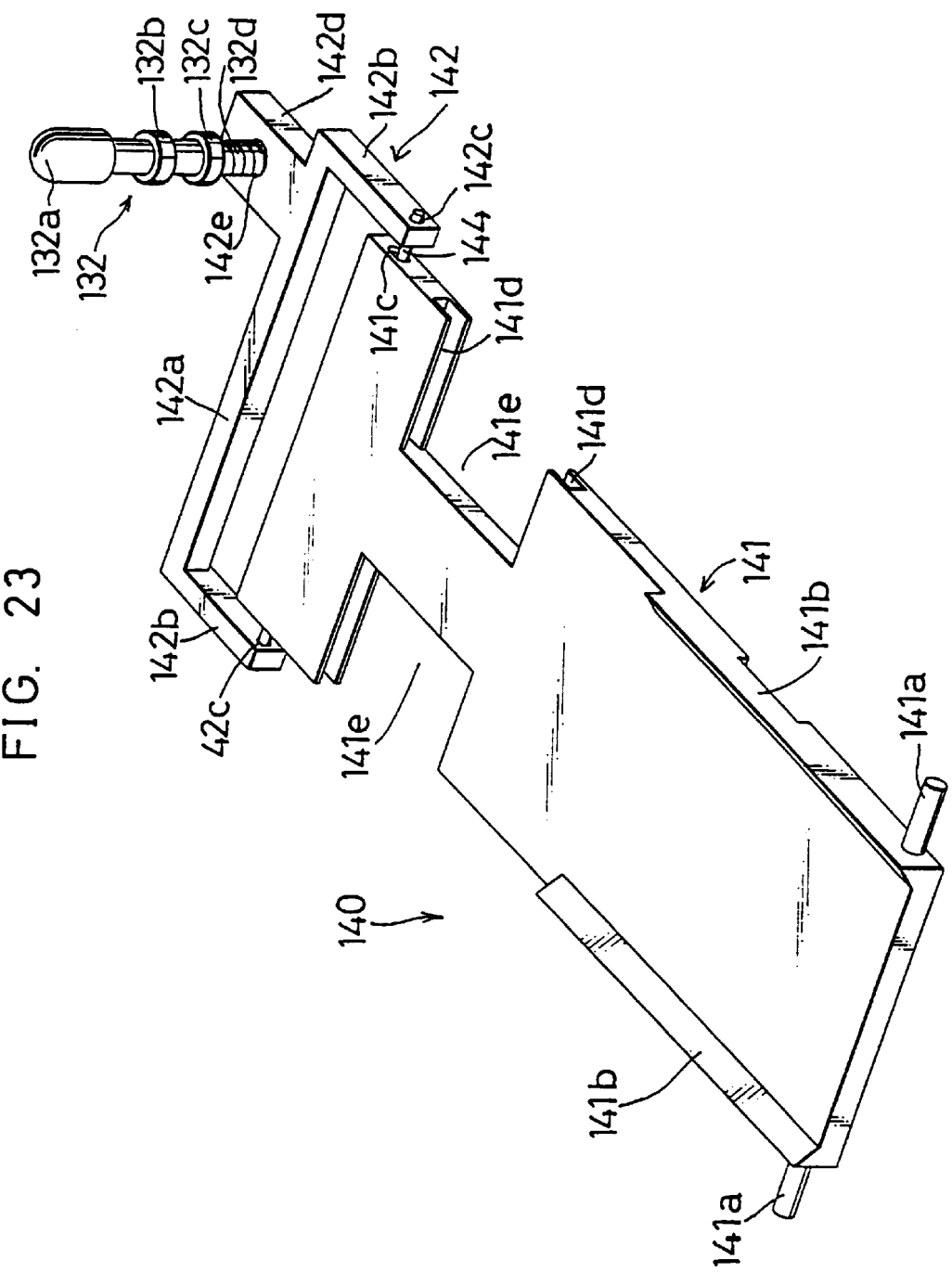
FIG. 23 is a perspective view of a pivotal bottom wall and an elevating bottom wall of the phone holder of the second embodiment.
Figure 24:
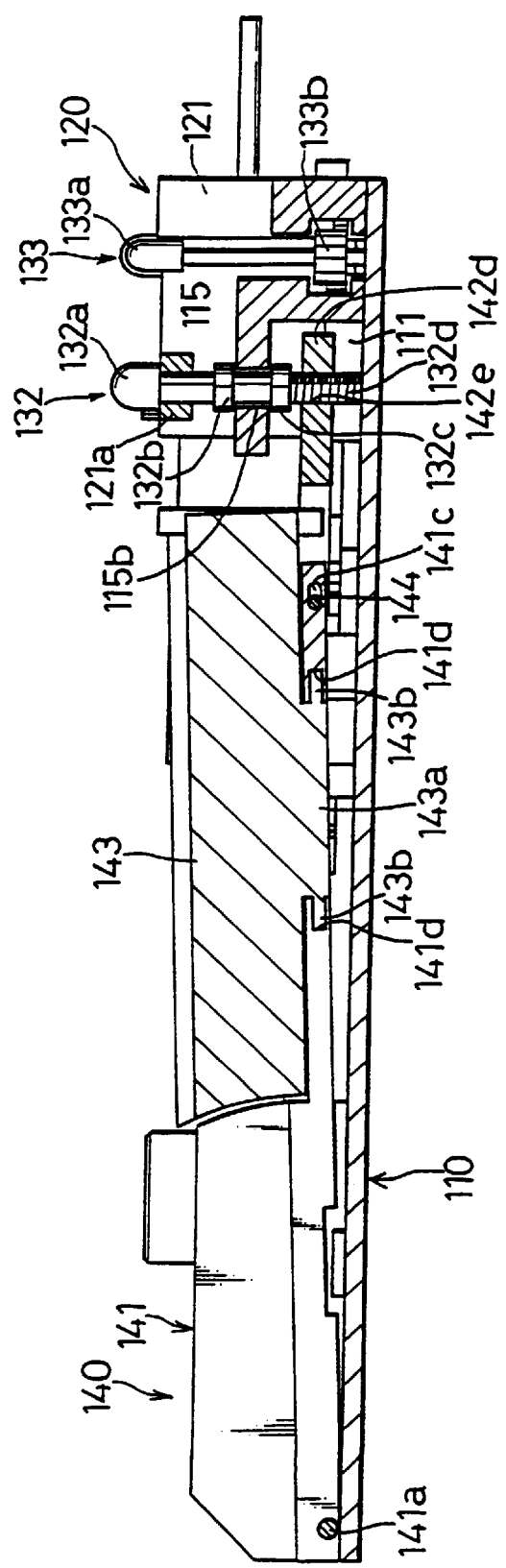
FIG. 24 is a cross sectional side view of the phone holder of the second embodiment.

The elevating frame 142 is integrally formed with a base frame 142a extending along left and right directions (width direction of the mobile phone T), a pair of arm portions 142b extending forward from the left and right ends of the base frame 142a, and a nut portion 142d extending rearward from a left side portion of the base frame 142a (right side portion in FIG. 23). Through holes 142c along left and right directions are formed at a front end of the arm portions 142b, and a vertical threaded hole 142e is formed in the nut portion 142d.

The base 110 is provided with a vertical position adjuster (or also referred to as a "position adjusters") 132 to move the elevating frame 142 up and down. The vertical position adjuster 132 is formed with a main shaft, an operable head portion 132a formed at an upper end of the main shaft, a pair of flange portions 132b, 132c at an intermediate portion thereof, and an externally threaded portion 132d at a lower end thereof. The externally threaded portion 132d is in mesh with the threaded hole 42e of the elevating frame 142.

An upper wall 115 horizontally extending at a position higher than the elevating frame 142 is formed on the base 110. A notch 115b which has a width smaller than an outer diameter of the flange portion 132b (132c) and larger than the diameter of the main shaft of the vertical position adjuster 132 is formed in the upper wall 115. By inserting the vertical position adjuster 132 into the notch 115a from sideways direction in such a manner that the portion of the position adjuster 132 between the flange portions 132b, 132c are fitted in the notch 115a, the vertical position adjuster 132 is supported on the base 110 to be rotatable about an axis of the main shaft thereof and non-movable along vertical direction. Accordingly, by turning the vertical position adjuster 132 about the axis thereof clockwise or counterclockwise, the entirety of the elevating bottom wall 142 which is engaged with the vertical position adjuster 132 is moved up and down.

In this embodiment, the casing 21 can be set upside down as shown in the first state of FIG. 21 and in the second state of FIG. 22. In the first state, the operable head portion 132a of the vertical position adjuster 132 is fitted in the through hole of the ear portion 121b in a state that the ear portion 121a of the connector module 120 is secured on the nut portion 112 (see FIG. 21).

In the second state, on the other hand, the operable head portion 132a of the vertical position adjuster 132 is fitted in the through hole of the ear portion 121a in a state that the ear portion 121b of the connector module 120 is secured on the nut portion 112 (see FIG. 22). In either case, there can be prevented a horizontal displacement of the operable head portion 132a because the vertical position adjuster 132 is inserted in the ear portion 121a (or 121b).

The pivotal bottom wall 141 is positioned forward of the elevating frame 142 and extends along forward and backward directions (longitudinal direction of the mobile phone T). A horizontally extended hole 141c is formed at the rear end of the pivotal bottom wall 141 to communicate with the opposite ends along transverse direction. A pivotal coupling rod 144 is inserted through the long through hole 141c of the pivotal bottom wall 141 and through holes 142c each formed at a lead end of the arm portion 142b of the elevating frame 142 to connect the elevating frame 142 and the pivotal bottom wall 141 in such a manner that the pivotal bottom wall 141 pivotally moves about the axis of the pivotal coupling rod 144 up and down.

A pivotal rod 141a is projected along sideways direction at a forward end on lateral sides of the pivotal bottom wall 141. A pair of left and right guiding side walls 114 are formed upright at a forward portion of the base 110 (portion away from the connector module 120 along forward direction). A through hole 113 extending along sideways directions is formed at a lower portion on a front end of the guiding side walls 114. By inserting the pivotal shaft 141a into the through holes 113 (see FIG. 20) from inward and placing the pivotal bottom wall 141 between the guiding side walls 114, a forward end of the pivotal bottom wall 141 is coupled to the base 110 to pivotally move the pivotal bottom wall 141 about the axis of the pivotal rod 141a up and down.

Figure 25:
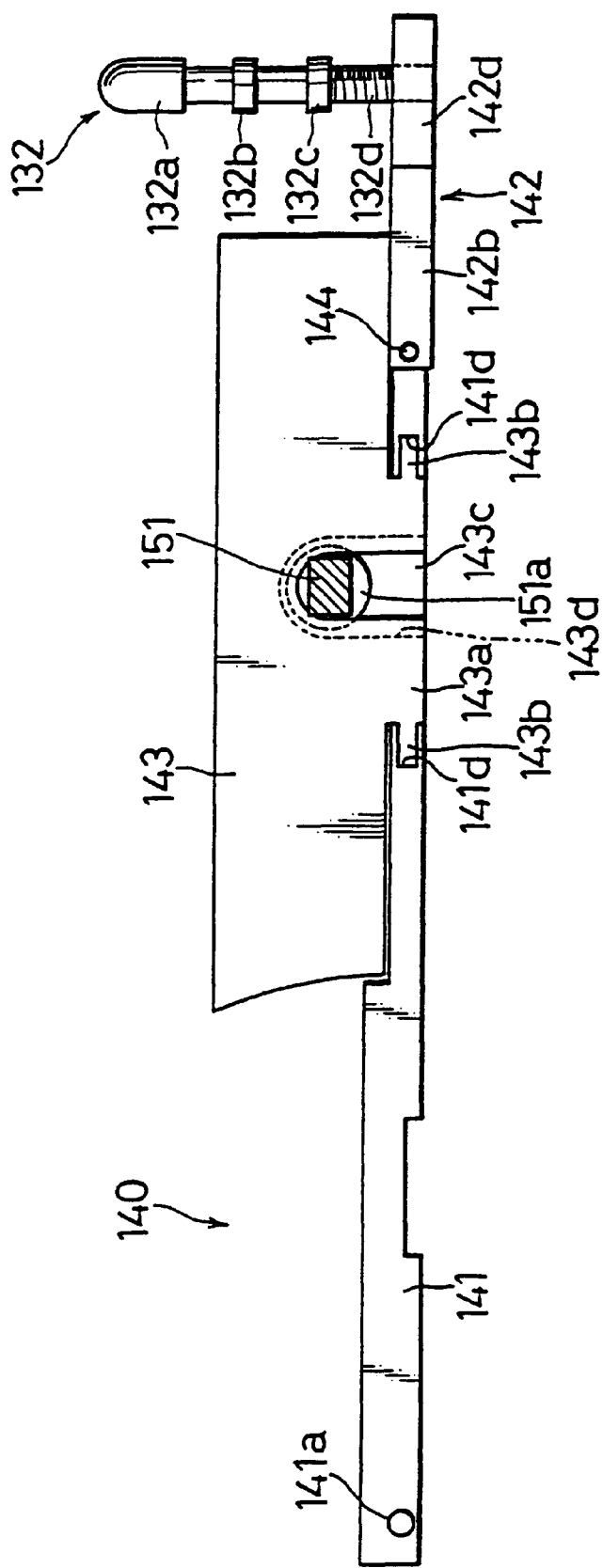
FIG. 25 is a partially cross sectional side view of the elevating bottom wall at a lowermost position thereof.
Figure 26:
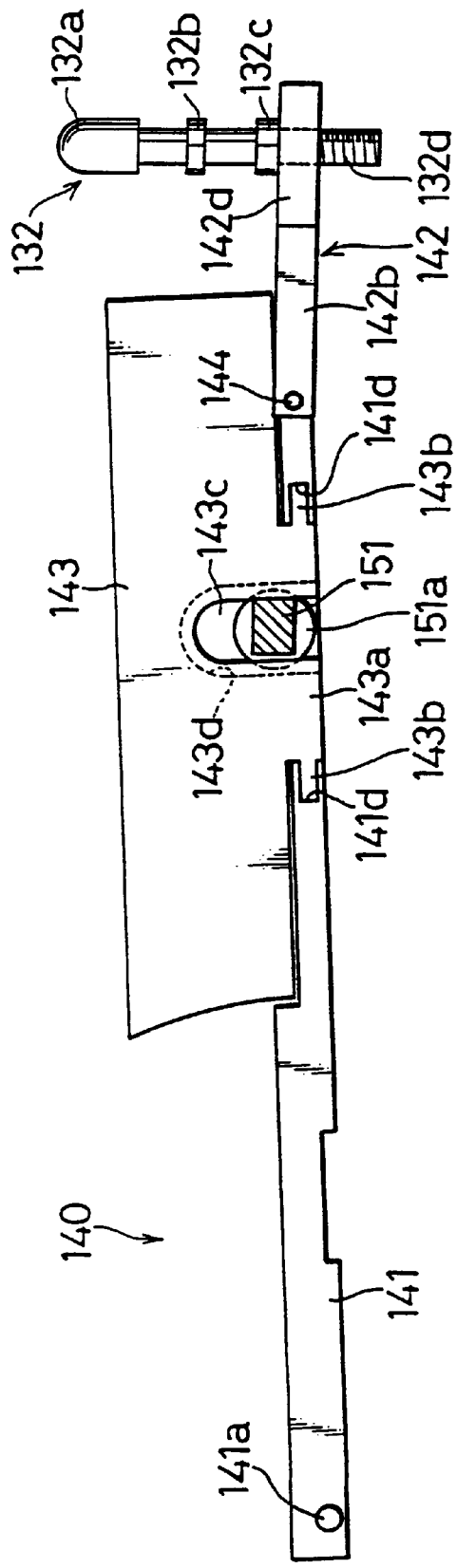
FIG. 26 is a partially cross sectional side view showing a state that the elevating bottom wall is lifted upward.

Thereby, as shown in FIG. 25, when the elevating frame 142 is set to the lowermost position, the pivotal bottom wall 141 is set substantially horizontal with the elevating frame 142, while as the elevating frame 142 is raised upward, as shown in FIG. 26, the pivotal bottom wall 141 is inclined with a downward slope as approaching forward (downward slope on the leftward in FIG. 26).

It should be noted that guiding ridges 141b formed upright along opposite lateral ends on the forward portion of the pivotal bottom wall 141 are adapted for guiding the mobile phone T along phone insertion direction.

Now, referring to FIGS. 25 and 26 in particular, the pair of movable side walls 143 are mounted on a rear portion of the pivotal bottom wall 141. Specifically, a pair of rectangular notches 141e cut away inward toward the center of the pivotal bottom wall 141 are formed at the rear portion of the pivotal bottom wall 141. A groove 141d is formed along front and rear peripheries of the notch 141e. An extension 143a extending toward the center of the pivotal bottom wall 141 is formed at a lower portion of the movable side wall 143. A projection 143b (see FIG. 26) projecting along forward (rearward) direction is formed at the opposite ends along forward and backward directions (longitudinal direction of the mobile phone T) of the extension 143a. By fittingly inserting the forward (rearward) projections 143b into the front (rear) grooves 141d, the movable side walls 143 are slidable along transverse directions with respect to the pivotal bottom wall 141.

A pair of right and left position adjusters (transverse position adjusters) 133 are arranged at a position immediately behind the connector fixing member 131 and the vertical position adjuster 132 respectively. By turning the transverse position adjuster 133, the rotational force thereof is transmitted to the corresponding movable side wall 143 via a movement conversion mechanism 150 to slide the movable side wall 143 along sideways (transverse) directions individually relative to the pivotal bottom wall 141.

Figure 27:
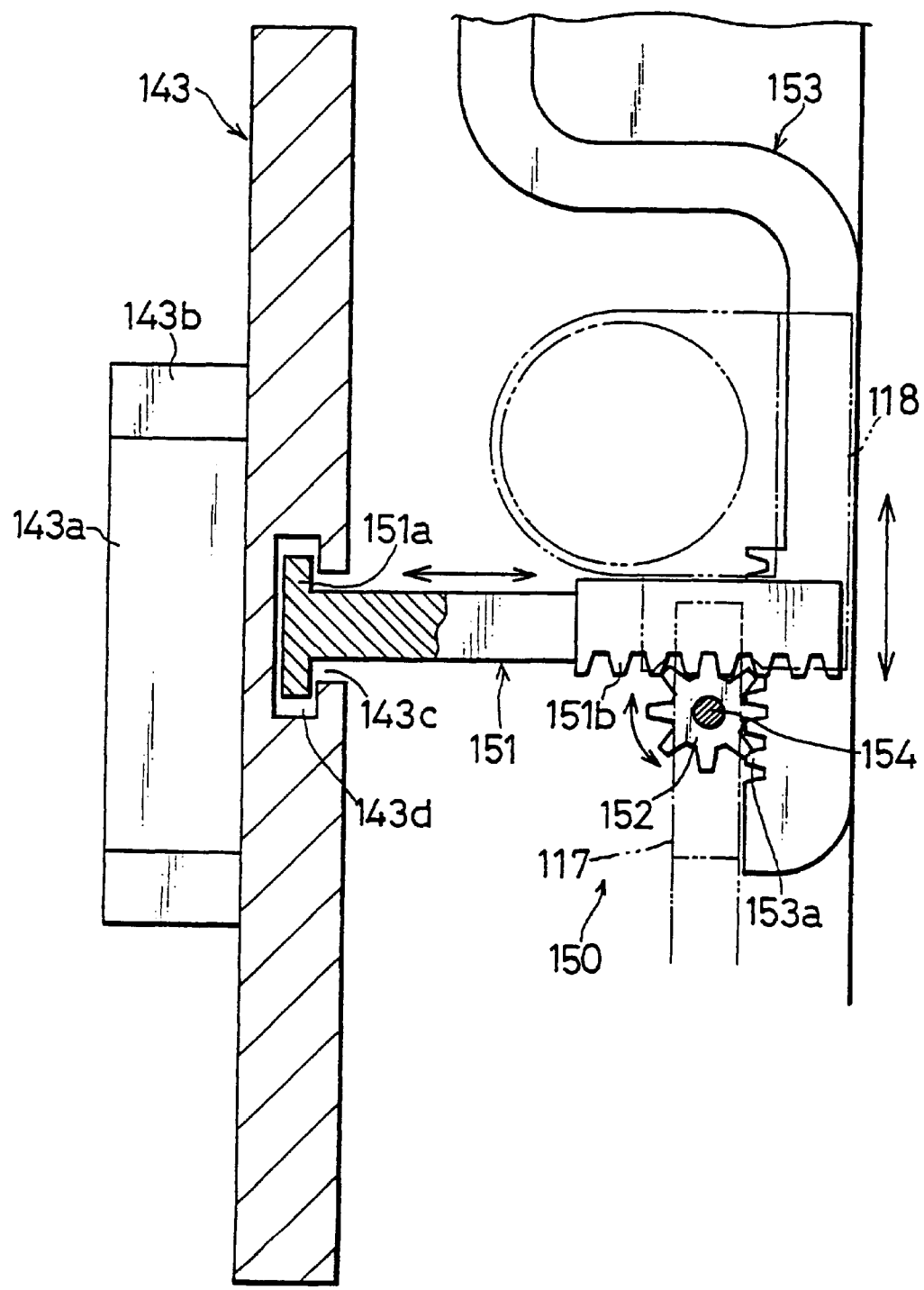
FIG. 27 is a partially cross sectional plan view of a movement conversion mechanism of the phone holder of the second embodiment.
Figure 28:
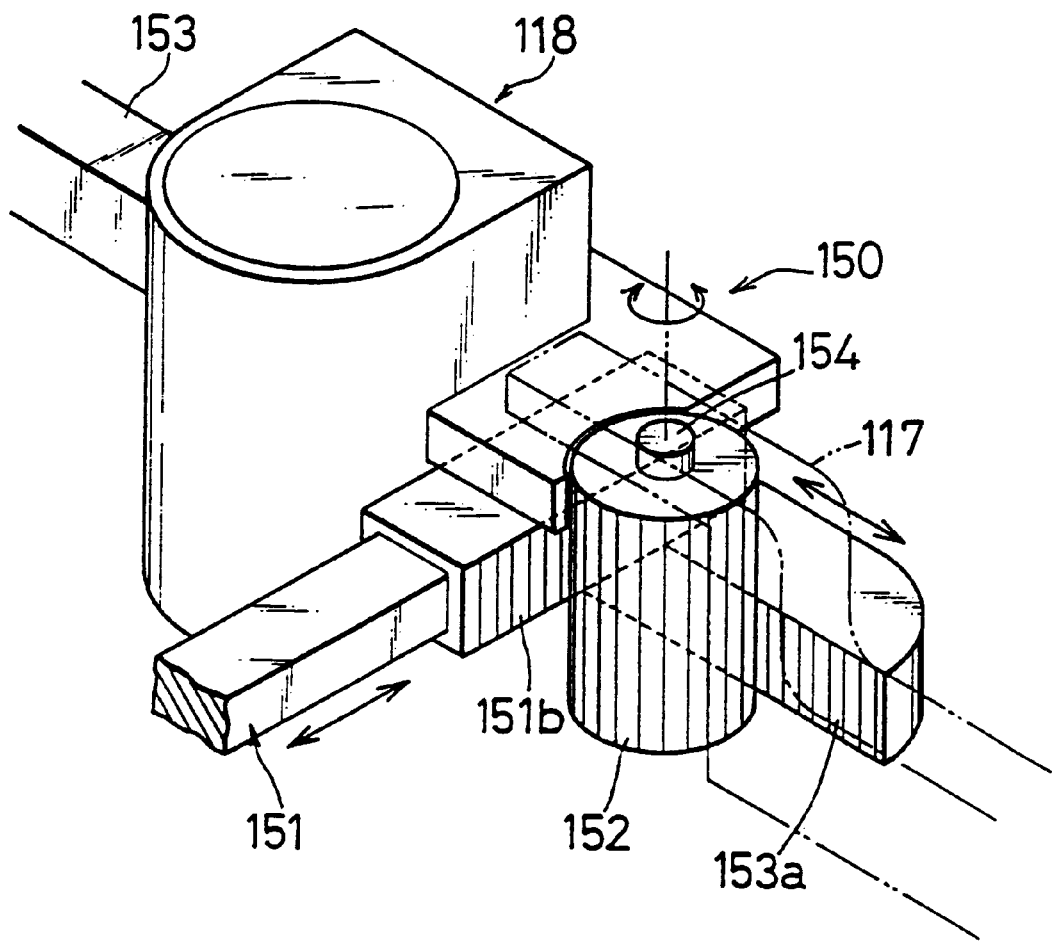
FIG. 28 is a perspective view of the movement conversion mechanism.

The movement conversion mechanism 150 includes, as shown in FIGS. 27 and 28, a first transmitter 151, a pinion gear 152, and a second transmitter 153 each of which are disposed at left and right sides of the phone holder. A conversion mechanism supporter 118 is also formed at left and right sides of the base 110 to slidably support an outer portion of the corresponding first transmitter 151 along sideways directions and to slidably support a forward portion of the corresponding second transmitter 153 along forward and backward directions. At a position immediately before the conversion mechanism supporter 118 is provided a gear support arm 117 in such a state that one end thereof is disposed away upward from the bottom wall of the base 110. The pinion gear 152 is rotatably supported between the gear support arm 117 and the bottom wall of the base 110 via the opposite ends of a center axis (shaft) 154 thereof.

Now, referring to FIG. 27, the first transmitter 151 extends along sideways (transverse) directions of the phone holder and is formed with a flange portion 151a at an inward end thereof and a rack 151b at an outward end thereof, respectively. The rack 151b is in mesh with an upper portion of the pinion gear 152. At the outer side of the movable side wall 143 is formed an entrance groove 143c along the longitudinal direction of the phone holder with a width (height in FIG. 27) smaller than the flange portion 151a and larger than the main shaft body of the first transmitter 151. At a rear portion (leftward portion in FIG. 27) of the entrance groove 143c is formed a rear side groove 143d with a width (height in FIG. 27) larger than the flange portion 151a. The grooves 143c, 143d are continuous and opened downward. By inserting the flange portion 151a of the first transmitter 151 into the rear side groove 143d from the bottom, the inner side end of the first transmitter 151 is coupled to the movable side wall 143 to be movable in the transverse direction.

Again, referring to FIGS. 27 to 30 in particular, the second transmitter 153 has such a shape as to extend from the arrangement position of the conversion mechanism supporter 118 to the left (right) position adjuster 133. Racks 153a, 153b extending along forward and rearward directions are formed respectively at a forward end and a rearward end of the second transmitter 153. The front rack 153a is in mesh with a lower portion of the pinion gear 152, and the rear rack 153b is connected to the transverse position adjuster 133.

Figure 29:
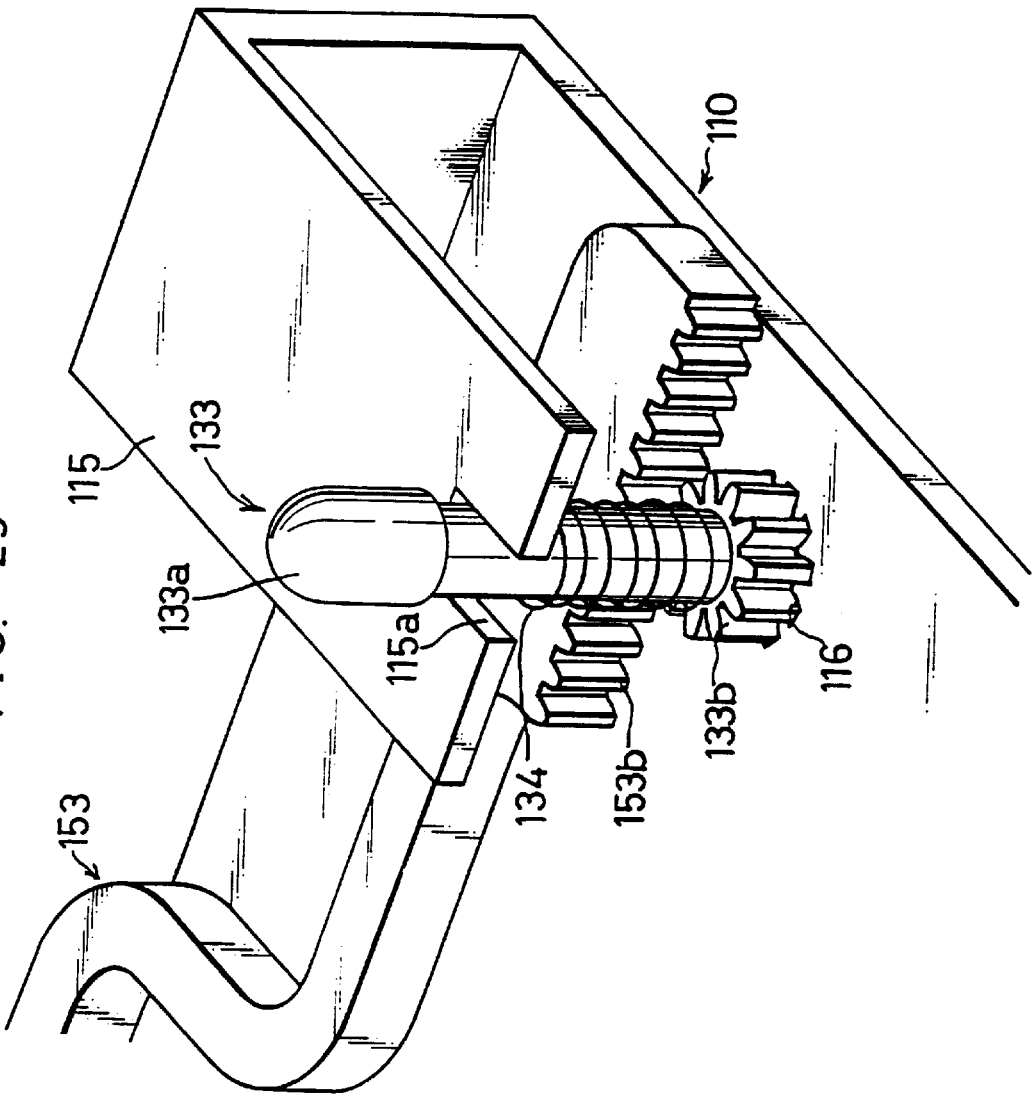
FIG. 29 is a perspective view showing a state that a transverse position adjuster of the phone holder in the second embodiment is lowered to a rotation prohibited position.
Figure 30:
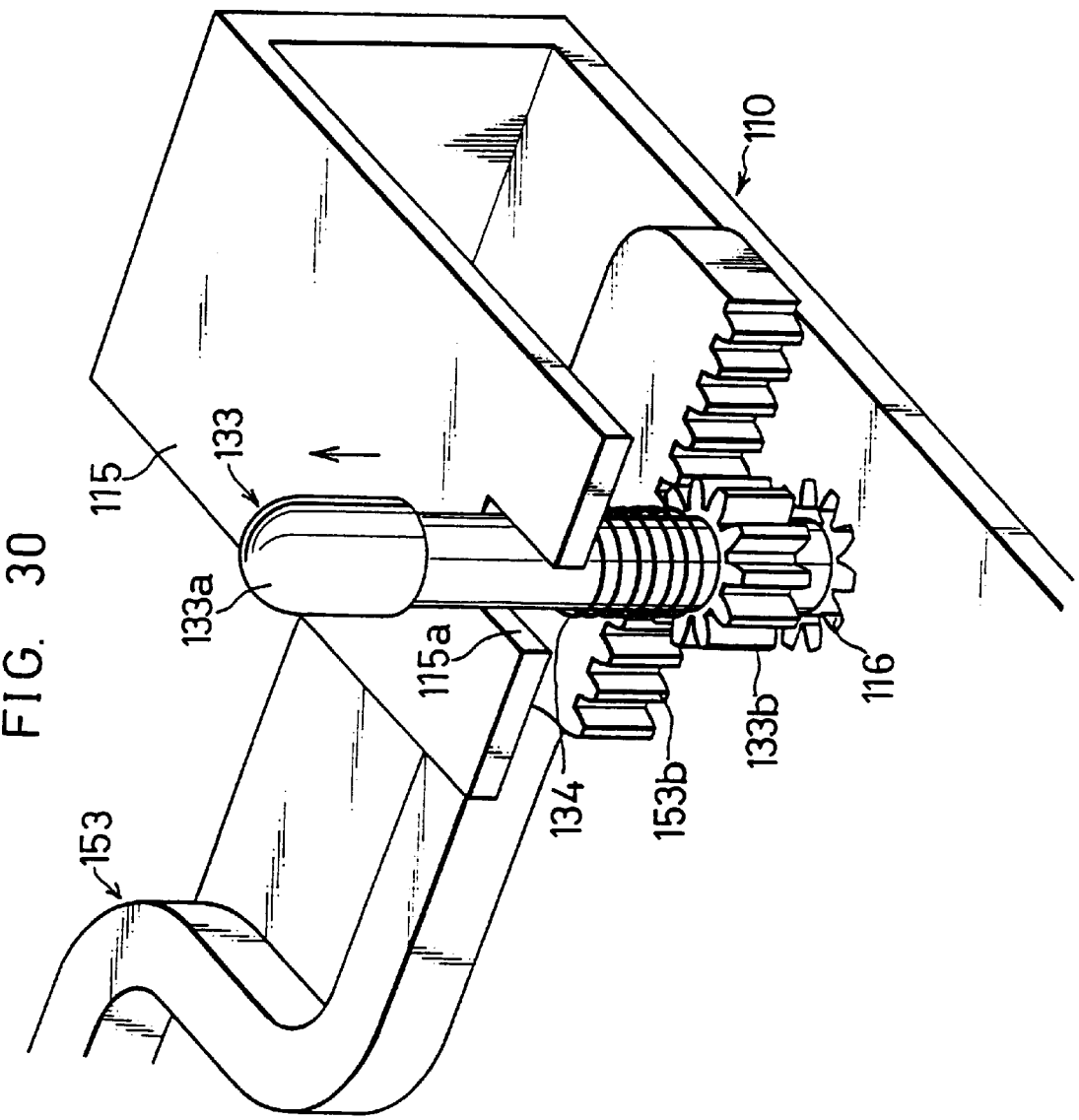
FIG. 30 is a perspective view showing a state that the transverse position adjuster is lifted upward to a rotation allowed position.
Figure 31:
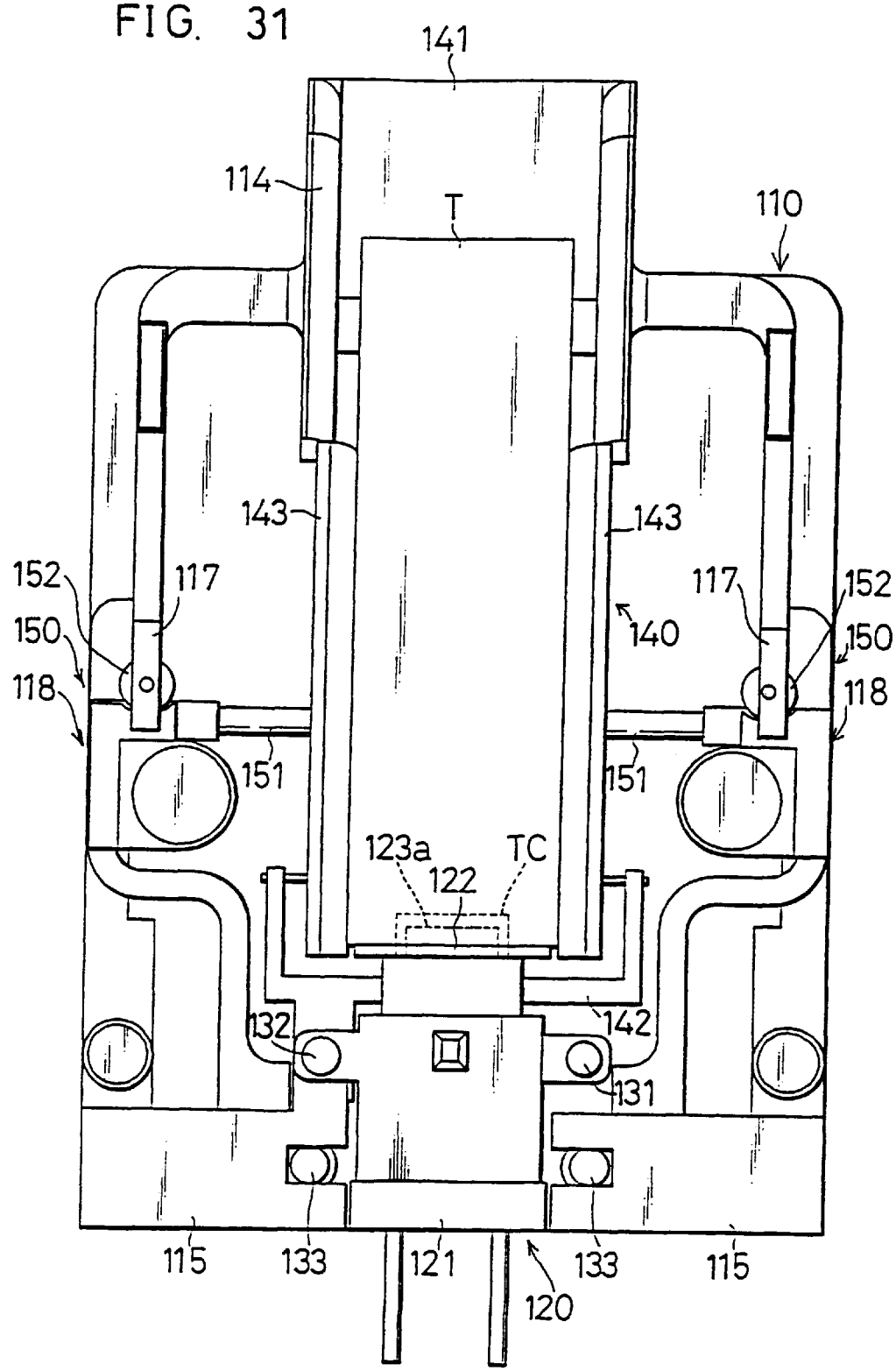
FIG. 31 is a plan view showing a state that a mobile phone with a phone connector arranged at a center position is mounted in the phone holder of the second embodiment.
Figure 32:
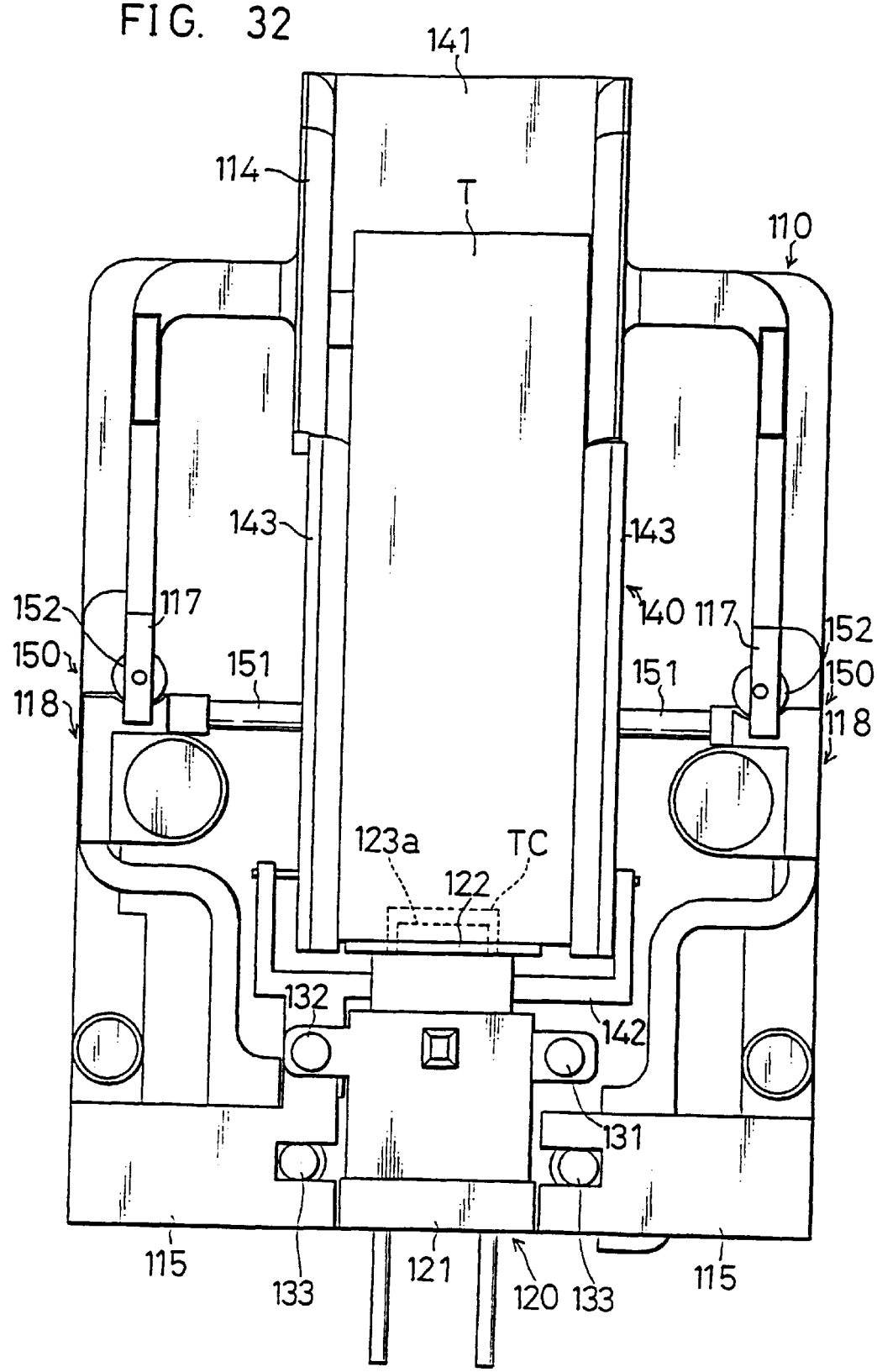
FIG. 32 is a plan view showing a state that a mobile phone with a phone connector arranged at a position rightward from the center is mounted in the phone holder of the second embodiment.
Figure 33:
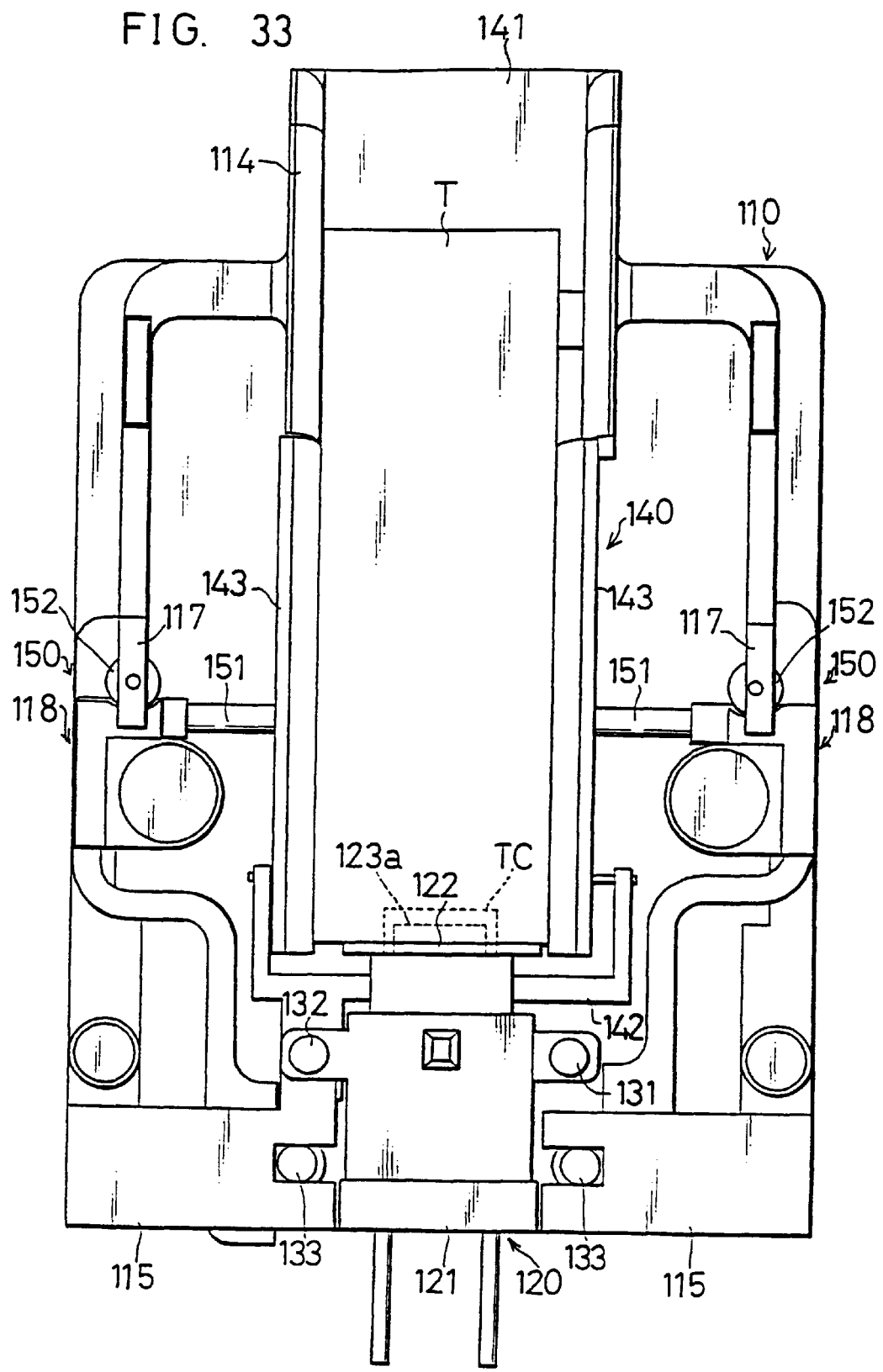
FIG. 33 is a plan view showing a state that a mobile phone with a phone connector arranged at a position leftward from the center is mounted in the phone holder of the second embodiment.

As shown in FIGS. 29 and 30, the transverse position adjuster 133 includes a vertically extended main shaft, an operable head portion 133a formed at an upper end of the main shaft and a pinion gear 133b provided at a lower end thereof to be in mesh with the rear rack 153b. At the upper wall 115 of the casing 110 is formed a rectangular notch 115a opened toward the center. By inserting the main shaft of the transverse position adjuster 133 in the notch 115a from inward direction, the transverse adjuster 133 is supported on the upper wall 115 to be rotatable about an axis of the main shaft thereof and vertically movable in the notch 115a.

At the arrangement position of the transverse position adjuster 133, a hole 116 having such a shape as to fittingly accommodate the pinion gear 133b is formed in the bottom wall of the base 110. When the transverse position adjuster 133 is set to such a position that the pinion gear 133b is fitted in the hole 116 (state that the transverse position adjuster 133 is shifted to the lowermost position), a turning of the transverse position adjuster 133 is prohibited (rotation prohibited position) (see FIG. 29). Thereby, the transverse position adjuster 133 is set to a locked state. On the other hand, when the transverse position adjuster 133 is set to such a position that the pinion gear 133b is disengaged from the hole 116 and located above the hole 116, a turning of the transverse position adjuster 133 is allowed (rotation allowed position, a locked state is released) (see FIG. 30).

When the transverse position adjuster 133 is shifted upward to the rotation allowed position (lock released state), a rotational movement of the position adjuster 133 is converted into a forward or a backward movement of the second transmitter 153, a rotational movement of the pinion gear 152, and sideways movement of the first transmitter 151 to finally push the movable side wall 143 coupled to the first transmitter 151 along sideways (transverse) directions.

In other words, by turning the position adjuster 133 when it is set to the rotation allowed position, the corresponding movable side wall 143 is slid along sideways directions to adjust the position of the phone holder along transverse directions.

A compressed coil spring (bias member) 134 is wound around the main shaft of the transverse position adjuster 133 between the upper surface of the pinion gear 133b and the lower surface of the upper wall 115 to set the position adjuster 133 at the lowermost position (a locked state) by a bias force of the compressed coil spring 134 in a normal state of the phone holder.

Next, an operation of adjustment of the phone holder in this embodiment and an action after the adjustment are described.

1) An operator determines whether the phone holder is used in a state that the connector module 120 faces upward or downward (i.e., set in the first state or the second state) in accordance with the mounting position of the phone connector TC of a mobile phone T to be used with the phone holder. When the mounting direction is determined, the connector module 120 is secured on the base 110 in the determined direction.

For instance, in the case where the holder connector 123 and the phone connector TC of the mobile phone T are connectable in a state that the connector module 120 faces upward as shown in FIG. 21 (first state), the ear portion 121*a* is matched with the threaded hole 112*a* and is secured together with the threaded hole 112*a* on the base 110 by the connector fixing member 131.

On the other hand, in the case where the holder connector 123 and the phone connector TC of the mobile phone T are connectable in a state that the connector module 120 faces downward as shown in FIG. 22 (second state), the ear portion 121*b* is matched with the threaded hole 112*a* and is secured together with the threaded hole 112*a* on the base 110 by the connector fixing member 131.

2) Then, the elevating bottom wall or elevating member 142 is lowered to the lowermost position shown in FIG. 25, and the mobile phone T held substantially in a horizontal state is inserted in the hollow portion of the phone holder defined by the movable side walls 143 from above in a state that the movable side walls 143 are located farthest away from each other along transverse directions shown in FIG. 25, while connecting the phone connector TC with the holder connector 123. At this stage, the mobile phone T is set away above the elevating frame 142 and the pivotal bottom wall 141 with a clearance.

3) The vertical position adjuster 132 is manipulated to raise the elevating frame 142 upward, and the turning of the vertical position adjuster 132 is stopped when the upper surface of the elevating frame 142 is in fitting contact with the bottom surface of the mobile phone T. Thereby, the elevating frame 142 (and the pivotal bottom wall 141) is positioned in contact with the bottom surface of the mobile phone T in a state that the phone connector TC is connected with the holder connector 123.

4) While nipping the operable head portion 133*a* of one (left or right) of the transverse position adjusters 133, the operator raises the transverse position adjusters 133 upward overcoming the bias force of the compressed coil spring 134 to change the transverse position adjuster 133 from the rotation prohibited position (locked position) shown in FIG. 29 (position where the pinion gear 133*b* is fitted in the hole 116) to the rotation allowed position (lock released position) shown in FIG. 30 (position where the pinion gear 133*b* is away above the hole 116).

Then, at the rotation allowed position, the position adjuster 133 is manipulated to slide the corresponding movable side wall 143 along transverse direction toward the center, i.e., toward the mobile phone T which has been halfway set in the holder main body in 3). When the inner surface of the movable side wall 143 is in fitting contact with the side surface of the mobile phone T, the turning of the position adjuster 133 is stopped.

Similarly, the same operation is performed for the other one of the transverse position adjusters 133 to allow the inner surface of the opposite movable side wall 143 in fitting contact with the other side surface of the mobile phone T. Thereby, the movable side walls 143 are positioned in contact with the side surfaces of the mobile phone T in a state that the phone connector TC is connected with the holder connector 123.

After the position adjustment of 4), the operator stops turning of the operable head portion 133*a*, and pushes the operable head portion 133*a* downward to set the transverse position adjuster 133 to the rotation prohibited position (the position where the pinion gear 133*b* is engaged in the hole 116 by the bias force of the compressed coil spring 134). As a result, the movable side wall 143 is set at the position adjusted in 4). In this way, the position adjustment of the phone holder is completed.

When the mobile phone T is to be inserted in the phone holder after the position adjustment, merely placing the mobile phone T on the bottom walls 141, 142 in a state that the side surfaces thereof are in fitting contact with the movable side walls 143 of the phone guiding unit 140, and sliding the mobile phone T rearward along the side walls 143 and the bottom walls 141, 142 enable the phone connector TC of the mobile phone T to be connected with the holder connector 123.

Next, an action of the phone holder when the mobile phone T is inserted after the position adjustment is described in detail. Before the connection of the phone connector TC of the mobile phone T with the holder connector 123, the holder connector 123 in the casing 121 is advanced at the foremost position shown in FIG. 38 by a bias force of the compressed coil spring 126. The locking pins 123*p* are set in a retracted position in a state that the connector guide projections 121*k* of the casing 121 are in pressing contact with the engaging projections 123*b* of the holder connector 123. At this stage, the phone ejector 122 which is connected with the holder connector 123 via the pinion gear 125 and the rack 122*e* is located forward of the holder connector 123.

When the mobile phone T is inserted toward the phone ejector 122 in this state, first, the rear end of the mobile phone T is abutted against the ejector plate 122*a* of the phone ejector 122. Accompanied with a further pushing operation of the mobile phone T, the phone ejector 122 is retracted in the casing 121. At this time, the pinion gear 125 in mesh with the rack 122*e* of the phone ejector 122 rolls along the rack 121*c* of the casing 121 in mesh therewith. The phone ejector 122 is accommodated in the casing 121 in the phone insertion direction at the speed twice as fast as the traveling speed of the holder connector 123. In other words, the holder connector 123 travels in the phone ejecting direction with respect to the retracting phone ejector 122 to be connected with the phone connector of the mobile phone T.

In this way, when the connecting portion 123*a* of the holder connector 123 is projected forward through the opening 122*d* of the ejector plate 122*a* to be connected with the rear end (i.e., phone connector TC) of the mobile phone T, the engaging projections 123*b* of the holder connector 123 are projected outward through the groove 121*f* after the pressing contact with the connector guide projections 121*k* of the casing 121, thereby setting the locking pins 123*p* in an engaged state in the recess Ch of the phone connector TC (i.e., securing connection of the connecting portion 123*a* of the holder connector 123 with the phone connector TC). The holder connector 123 and the phone ejector 122 reach the rearmost position shown in FIG. 40 in the connected state. As the mobile phone T is guided (retracted) in the casing 121 toward the rearmost position, the rear end 124*b* of the connector engaging pin 124, which has been initially located in the straight portion 127*b*, moves along the left side of the loop line portion 127*b*, and approaches near the recess P of the projection 122*f*.

Figure 42:
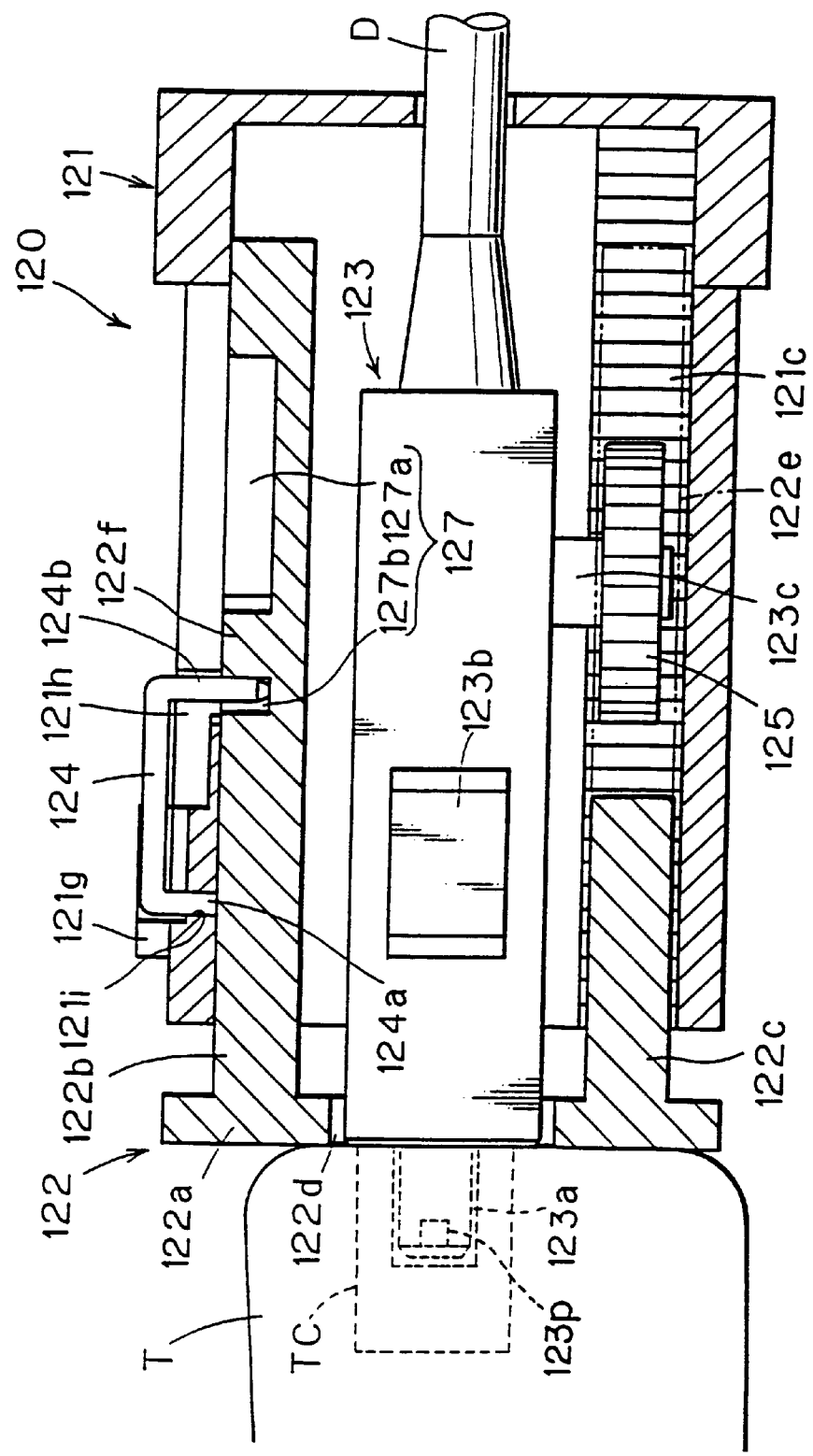
FIG. 42 is a cross sectional side view showing a state that the phone ejector is biased toward the casing in the connector module of the second embodiment.
Figure 43:
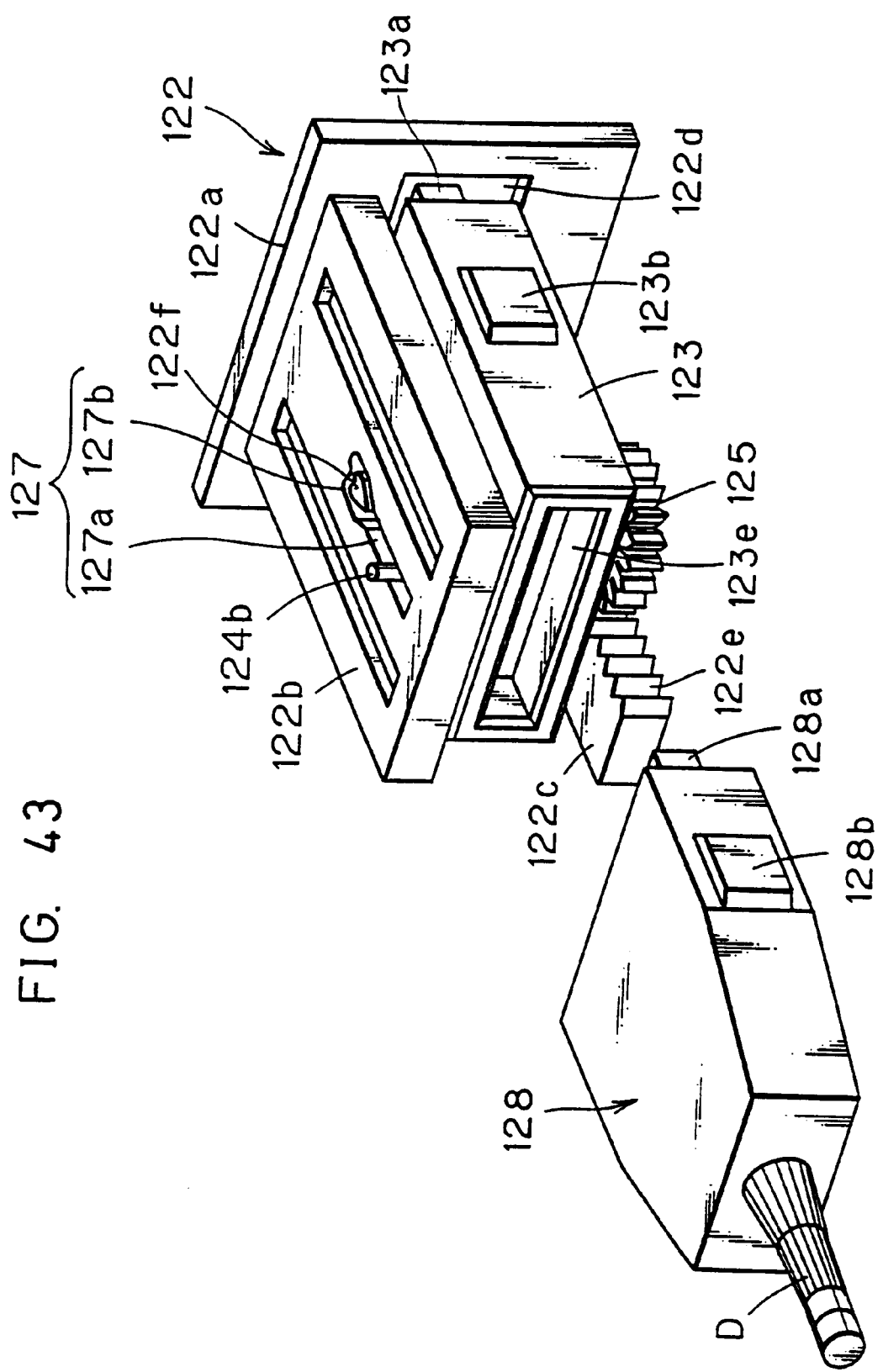
FIG. 43 is a perspective view of constituent elements of a connector module in a third embodiment other than a casing.
Figure 44:
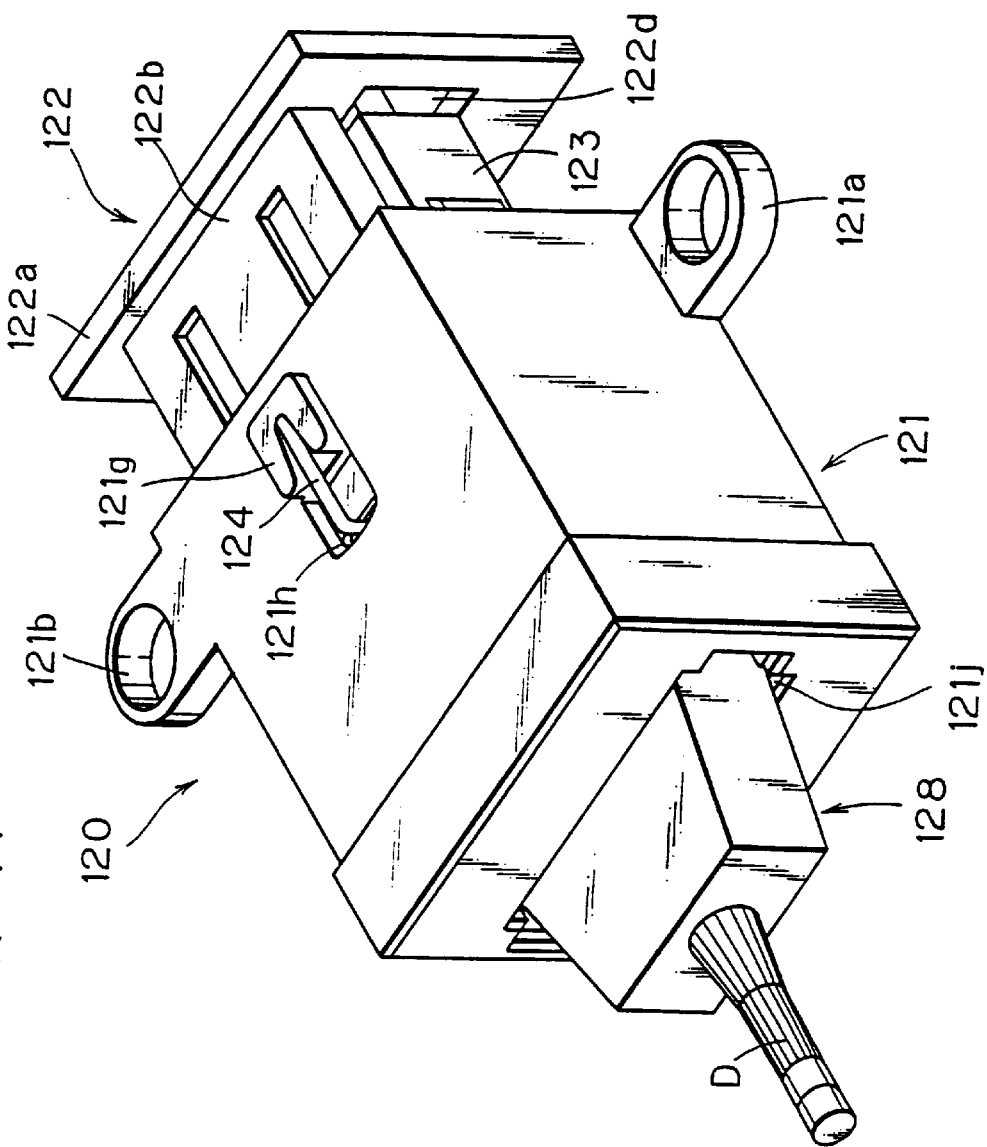
FIG. 44 is a perspective view of the connector module in an assembled state of the third embodiment.
Figure 45:
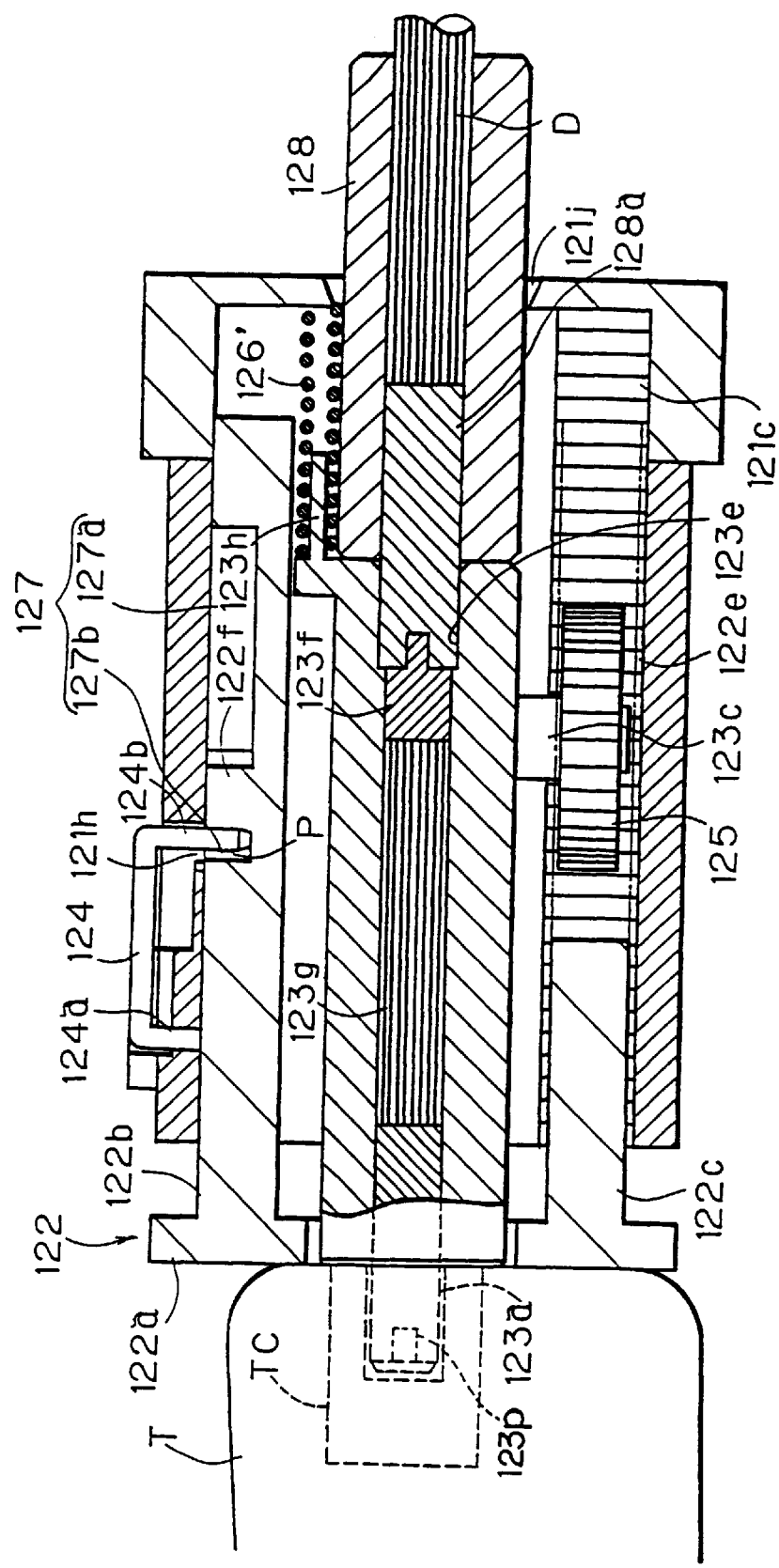
FIG. 45 is a cross sectional side view of the connector module in FIG. 44.
Figure 46:
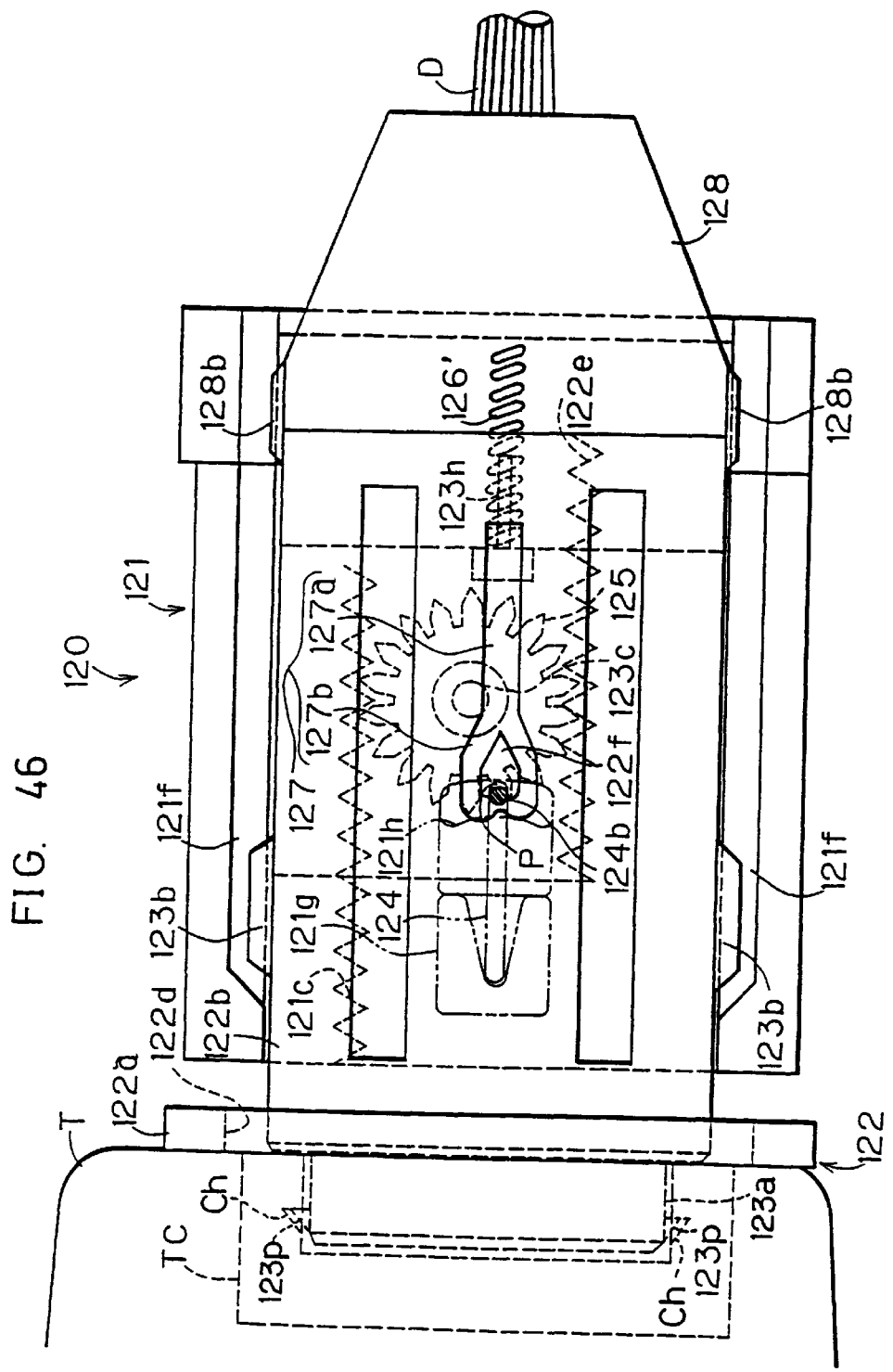
FIG. 46 is a cross sectional plan view of the connector module in FIG. 44.

When the operator stops pushing the mobile phone T toward the holder connector 123 after the holder connector 123 and the phone ejector 122 reach the rearmost position of the casing 121, the holder connector 123 and the phone ejector 122 are slightly pushed back by a bias force of the compressed coil spring 126 to finally set the rear end 124*b* of the connector engaging pin 124 in a fitted state in the recess P of the projection 122*f* after guiding the rear end 124*b* along the loop line portion 127*b* (state of FIGS. 41 and 42). Thereby, the holder connector 123 and the phone ejector 122 are engaged with the casing 121 in a state that the rear end 124b of the connector engaging pin 124 is fitted in the recess P of the projection 122f (i.e., the mobile phone T is completely connected with the holder connector 123).

When the mobile phone T is further pushed rearward (i.e., the phone ejector 122 is pushed rearward), the rear end 124b of the connector engaging pin 124 is disengaged from the recess P and guided along the right side of the loop line portion 127b to release the fitting state in the recess P. As the rear end 124b is returned to the straight portion 127a after passing along the right side of the loop line portion 127b, the phone ejector 122 is advanced forward. Concurrently, the phone ejector 122 is advanced at the speed twice as fast as the advancing speed of the holder connector 123, and the locking pins 123p are set to a retracted state while the engaging projections 123b of the holder connector 123 being in pressing contact with the connector guide projections 121k of the casing 121. The difference between the advancing speed of the holder connector 123 and the phone ejector 122 automatically pushes the mobile phone T forward by the pushing force of the phone ejector 122, thereby disconnecting the phone connector TC from the holder connector 123.

Figure 48A:
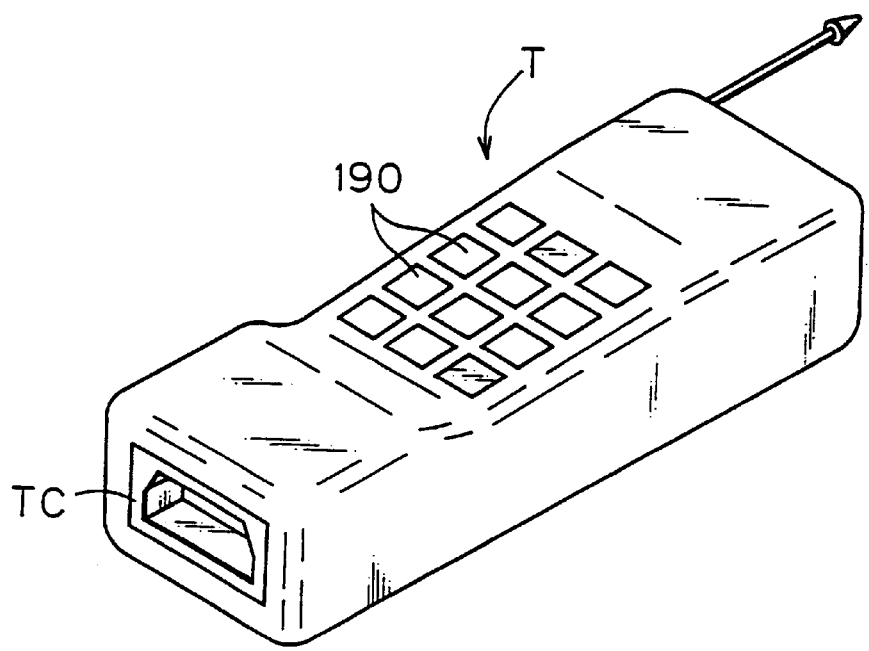
FIGS. 48A and 48B are perspective views respectively showing a state that phone connectors are oriented in the opposite directions.
Figure 48B:
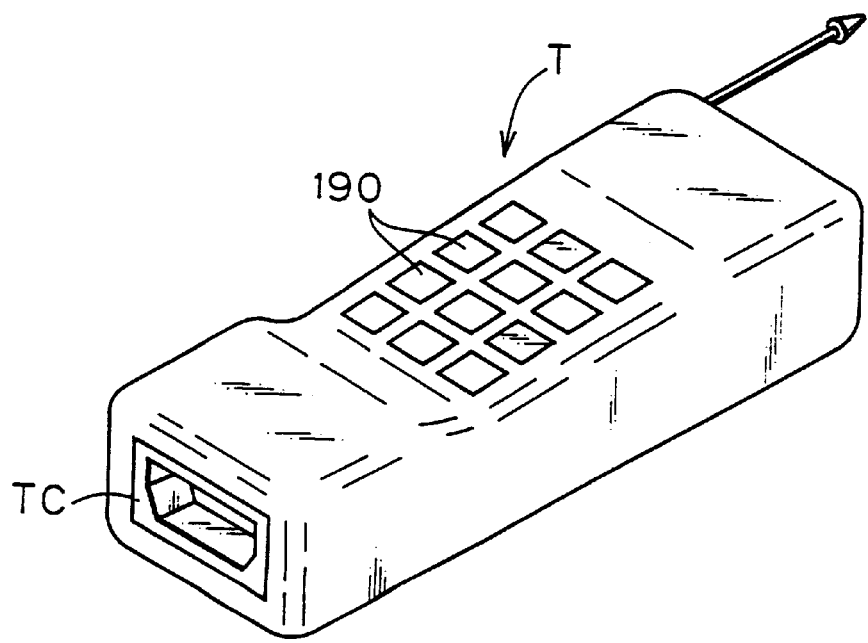

To sum it all up, in the phone holder of this embodiment, the connector module 120 is selectively mountable on the base 110 in the first state and the second state. Accordingly, this phone holder can hold two types of mobile phones T (type A and type B) shown in FIGS. 48A and 48B where the phone connector TC of the type B is mounted in a state inverted from the type A. Thereby, the usability of this phone holder is improved, while contributing to mass production of the phone holder and remarkably reducing the production cost.

Further, in this embodiment, the bottom walls 141, 142 and the side walls 143 are movable by operating the vertical position adjuster 132 and the transverse position adjuster 133. Accordingly, the phone holder can hold various kinds of mobile phones T in conformity with the shape of the mobile phone T. Accordingly, the usability of the phone holder is further improved.

Moreover, the connector fixing member 131, the vertical position adjuster 132, and the transverse position adjuster 133 are all arranged near the connector module 120. Accordingly, the operator can efficiently adjust the position of the phone holder vertically and transversely while fixing the connector module 120 on the base 110.

Furthermore, the vertical position adjuster 132 is inserted in the mounting portion (ear portion 121b in FIG. 21) while the connector fixing member 131 is inserted in the ear portion 121a when the casing 121 is mounted in the first state (state of FIG. 21). On the other hand, the vertical position adjuster 132 is inserted in the ear portion 121a while the connector fixing member 131 is inserted in the ear portion 121b when the casing 121 is mounted in the second state. Accordingly, the mounting portion which is not used for fixing the holder connector can be efficiently used to prevent an erroneous operation of the vertical position adjuster 132.

This arrangement is also applicable to the transverse position adjuster 133.

Third Embodiment

Next, a third embodiment is described with reference to FIGS. 43 to 46.

This embodiment is substantially the same as the second embodiment except the following arrangements. Accordingly, a description of the same parts in this embodiment as the second embodiment is omitted herein.

In the second embodiment, an electric cord D is directly connected with the holder connector 123. In this embodiment, a connector 128 (hereafter referred to as a "cord connector") which is provided at a terminal of an electric cord D is provided separately. The cord connector 128 and the holder connector 123 are disconnectedly connectable. When the cord connector 128 is connected with the holder connector 123, and the mobile phone T is connected with the holder connector 123, the cord connector 128 is connected with the phone connector TC via the holder connector 123.

More specifically, a connecting portion 128a made of a conductive material is projected forward at a front end of the cord connector 128. The cord D is directly connected to the connecting portion 128a. A connection opening 123e to fittingly receive the connecting portion 128a is formed in a rear end of the holder connector 123. A connecting portion 123f made of a conductive material is formed at a rear end of the connection opening 123e. The connecting portion 123f and the connecting portion 128a are electrically connected via a group of conductive wires 123g embedded in the connector housing. When the connecting portion 128a of the cord connector 128 is inserted in the connection opening 123e, the connecting portion 128a is connected with the connecting portion 123f. When the mobile phone T is inserted in the phone holder in this connected state, the phone connector TC is connected to the cord D via the connecting portion 123a, the conductive wires 123g, the connecting portion 123f, and the connecting portion 128a.

A rod 123h (see FIG. 45) extending rearward is provided at a position above the cord connector 128 at a rear end of the connector housing. The holder connector 123 is biased forward in a casing 121 by a compressed coil spring 126' which is wound around the rod 123h. A connector insertion opening 121j (see FIGS. 44 and 45) is formed in a rear wall of the casing 121 to pass the cord connector 128.

Any known connecting means such as soldering is applicable to connect the connecting portions 123a, 123f with the conductive wires 123g. Alternatively, a single conductive member may be provided in the housing of the holder connector 123, and the phone connector TC and the cord connector 128 may be directly connected with opposite ends of the conductive member, respectively.

Also, in this embodiment, the connection and the disconnection of the holder connector 123 to and from the mobile phone T are performed in the similar operation as the second embodiment shown in FIGS. 19 to 23.

In the second embodiment, all the electric wires D are detached from the holder connector 123 and then connected with a new holder connector in the case where the holder connector 123 is worn out after repetitive connecting and disconnecting operations, and a replacement with a new holder connector is necessary. However, in this embodiment, merely disconnecting the cord connector 128 from the old holder connector 123 and connecting the cord connector 128 with a new holder connector replaces the worn out holder connector 123. Accordingly, maintenance of the phone holder is remarkably simplified.

Further, this embodiment can take the following modifications and alterations.

(1) In the second and third embodiments, the first and second mounting portions (ear portions 121a, 121b) are provided on the casing 121. As an altered form, a mounting portion such as an ear portion may be directly formed on a housing of the holder connector 123. However, the arrangement in the second and third embodiments where the mounting portion is provided on the casing 121 is advantageous in the aspect of productivity because the burden to shape the holder connector 123 considering the form of the ear portion is eliminated.

(2) In the foregoing embodiments, the phone ejector is provided as an element of the connector module 120. Alternatively, the phone ejector may be omitted. In this case, the holder connector is fixed on the holder main body, and ejection of the mobile phone T from the holder main body to disconnect the phone connector TC from the holder connector is manually performed without the phone ejector.

Figure 47:
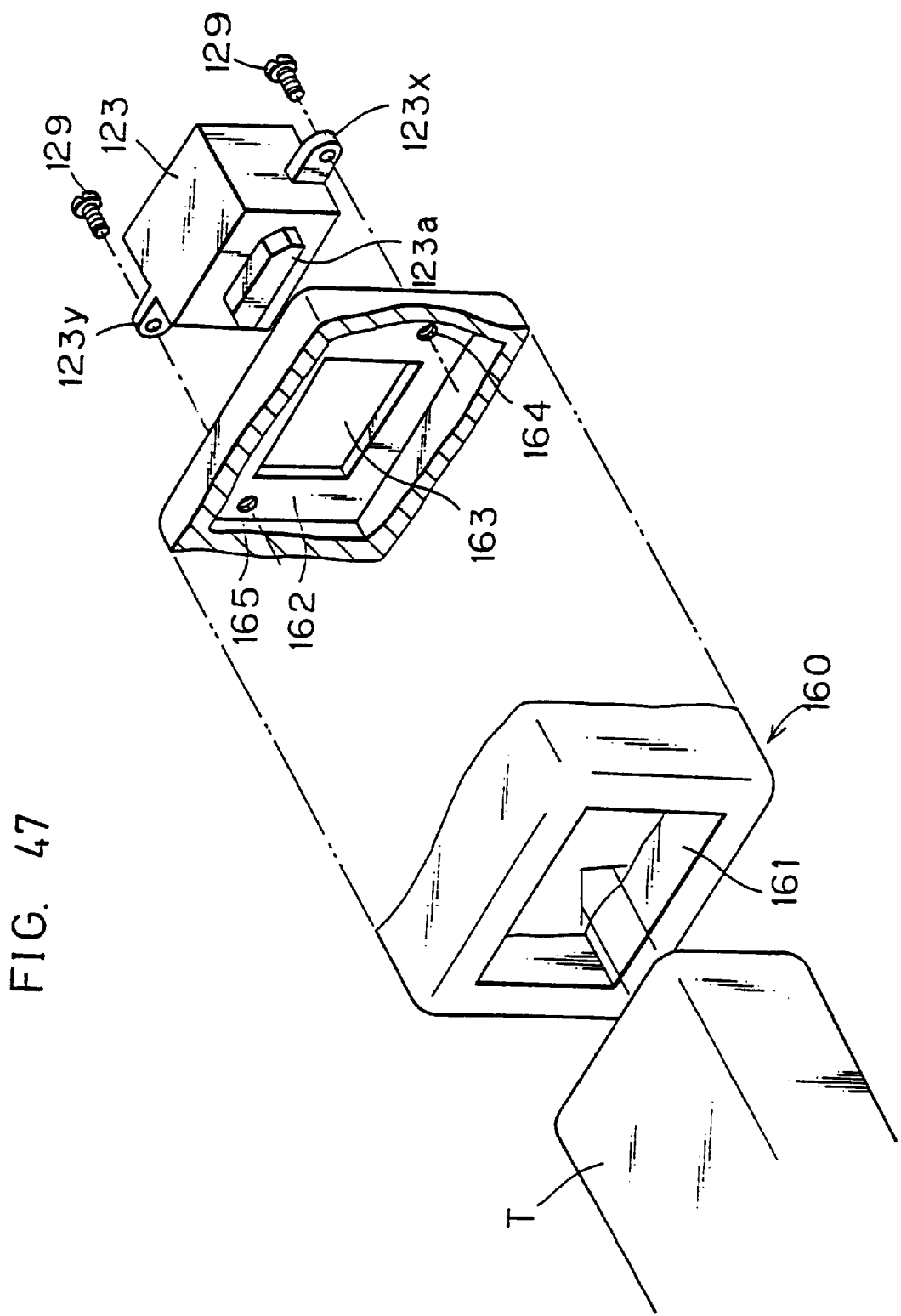
FIG. 47 is an exploded perspective view of a connector module of an altered form of the third embodiment.

(3) In the second and third embodiments, the hollow portion of the phone holder is opened upward, and the mobile phone T is set in the holder main body in a substantially horizontal state. This invention is applicable to a phone holder of an altered form shown in FIG. 47. In FIG. 47, a holder main body 160 is formed with an opening 161 at an end along lengthwise direction of the mobile phone T to insert the mobile phone T through the opening 161. A holder connector 123 is secured on a rear wall 162 of the holder main body 160.

In this altered form, ear portions 123x, 123y may be formed on the holder connector 123 at a symmetrical position to each other with respect to a center of the holder connector 123, and threaded holes 164, 165 corresponding to the respective ear portions 123x, 123y may be formed in the rear wall 162. Inserting a screw (fixing member) 129 (129) in a threaded hole of the ear portion 123x (123y) and the threaded hole 164 (165) enables setting of a holder connector (i.e., connector module) in a first state shown in FIG. 47.

On the other hand, inserting the screw (fixing member) 129 (129) in the threaded hole of the ear portion 123x (123y) and the threaded hole 165 (164) enables setting of the holder connector in a second state which is inverted from the first state shown in FIG. 47.

(4) In the above embodiments, the side wall and the bottom wall are movable. Alternatively, the side wall or the bottom wall may be movable, or these movable portions may be omitted.

(5) Further, this invention is applicable to any arrangement where a mobile phone T is held in the phone holder in a state that a phone connector is connected with a holder connector regardless of any specific use or purpose. For instance, this invention is applicable to a case where a mobile phone T is connected with an electronic device such as a personal computer for radio communication, as well as a case where a mobile phone T is connected with a speaker in a passenger compartment of a vehicle.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A phone holder comprising:
    a holder main body having a hollow portion adapted for inserting a mobile phone;
    a holder connector provided in the holder main body adapted to be connectable with a phone connector of the mobile phone when the mobile phone is inserted in the hollow portion; and
    position fixing means for adjusting a relative position of the holder connector to the holder main body in a direction normal to a connecting direction of the mobile phone and fixing the holder connector to the holder main body.

2. The phone holder according to claim 1, wherein the holder main body has an opening at one end thereof along a lengthwise direction of the mobile phone to hold the mobile phone therein, the holder connector is arranged in a bottom area of the holder main body to be connectable with the phone connector of the mobile phone, and the position fixing means adjusts the relative position of the holder connector to the holder main body in a direction normal to a phone inserting direction and fixes the holder connector to the holder main body.

3. The phone holder according to claim 1, wherein a side wall of the holder main body is formed with a bolt insertion hole to communicate inside and outside of the holder main body, the holder connector includes a holder connector screw portion formed with a threaded hole extending toward the bolt insertion hole, the holder main body includes a holder main body screw portion formed with a through threaded hole at a position corresponding to the bolt insertion hole and oriented in the same direction as the threaded hole of the holder connector screw portion, and the position fixing means includes a bolt which is engageable with the holder main body screw portion and the threaded hole of the holder connector screw portion.

4. The phone holder according to claim 1, wherein the holder connector is movable in a first direction normal to the phone connecting direction and a second direction normal to the phone connecting direction, the second direction being different from the first direction, and the position fixing means includes a first fixing member for positioning the holder connector along the first direction and a second fixing member for positioning the holder connector along the second direction.

5. The phone holder according to claim 4, wherein
    a side wall of the holder main body is formed with a first bolt insertion long hole communicable with inside and outside of the holder main body along the second direction and a second bolt insertion long hole communicable with inside and outside of the holder main body along the first direction,
    the holder connector including:
        a first holder connector screw portion formed with a threaded hole oriented toward the first bolt insertion long hole along the first direction, and
        a second holder connector screw portion formed with a threaded hole oriented toward the second bolt insertion long hole along the second direction,
    the holder main body including:
        a first holder main body screw portion formed with a through threaded hole at a position corresponding to the first bolt insertion hole and oriented in the same direction as the threaded hole of the first holder connector screw portion, and
        a second holder main body screw portion formed with a through threaded hole at a position corresponding to the second bolt insertion hole and oriented in the same direction as the threaded hole of the second holder connector screw portion,
    the first fixing member including a first bolt which is engageable with the first holder main body screw portion and the threaded hole of the first holder connector screw portion, and the second fixing member including a second bolt which is engageable with the second holder main body screw portion and the threaded hole of the second holder connector screw portion.

6. The phone holder according to claim 5, wherein the first holder main body screw portion and the second holder main body screw portion are formed independently of the holder main body, and the holder main body includes a first retaining portion for unrotatably holding the first holder main body screw portion to be movable along the second direction as to match the threaded hole of the first holder main body screw portion with the first bolt insertion long hole, and a second retaining portion for unrotatably holding the second holder main body screw portion to be movable along the first direction as to match the threaded hole of the second holder main body screw portion with the second bolt insertion long hole.

7. The phone holder according to claim 1, further comprising a connector housing for accommodating the holder connector to be movable along the phone connecting direction and a bias member for biasing the holder connector toward such a direction as to be connectable with the phone connector in the connector housing, the connector housing being movable in the direction normal to the phone connecting direction, and the position fixing means adjusts the position of the connector housing.

8. The phone holder according to claim 1, wherein the holder main body has a portion of a wall encasing the hollow portion which is movable toward and away from a plane parallel to the phone connecting direction, and a position adjuster for adjusting a position of the movable portion.

9. A phone holder comprising:

a holder main body including a hollow portion adapted for inserting a mobile phone; and a holder connector provided in the holder main body including a connecting portion to be connectable with a phone connector of the mobile phone when the mobile phone is inserted in the hollow portion, the holder connector is selectively set in the holder main body between a first state and a second state in such a manner as to face the connecting portion toward the phone connector of the mobile phone, and the orientation of the holder connector in the second state being inverted from the orientation of the holder connector in the first state.

10. The phone holder according to claim 9, wherein the holder connector has a first mounting portion formed with a through hole and a second mounting portion formed with a through hole, the first mounting portion and the second mounting portion are arranged at such a position as to set the holder connector in the first state when a fixing member is inserted in the through hole of the first mounting portion and to set the holder connector in the second state when the fixing member is inserted in the through hole of the second mounting portion.

11. The phone holder according to claim 10, wherein the holder main body has a casing for holding the holder connector, and the first mounting portion and the second mounting portion are provided on the casing.

12. The phone holder according to claim 10, wherein the holder main body is formed with a threaded hole opened outward to be meshable with the fixing member, the holder connector is set in the holder main body in the first state when the fixing member is inserted in the through hole of the first mounting portion and the threaded hole of the holder main body, and the holder connector is set in the holder main body in the second state when the fixing member is inserted in the through hole of the second mounting portion and the threaded hole of the holder main body.

13. The phone holder according to claim 12, wherein the holder main body has a portion of a wall encasing the hollow portion which is movable toward and away from the mobile phone when placed in the hollow portion, and a position adjuster for adjusting a position of the movable portion, the position adjuster and the fixing member are arranged near the holder connector in a mutually close position.

14. The phone holder according to claim 13, wherein the position adjuster is inserted in the through hole of the first mounting portion when the holder connector is set in the holder main body in the second state, and the position adjuster is inserted in the through hole of the second mounting portion when the holder connector is set in the holder main body in the first state.

15. The phone holder according to claim 9, wherein the holder connector is disconnectedly connected with a cord connector provided at a terminal of an electric wire to electrically connect the phone connector with the cord connector via the holder connector.

* * * * *